United States Patent [19]

Shah et al.

[11] Patent Number: 5,170,468
[45] Date of Patent: Dec. 8, 1992

[54] GRAPHICS SYSTEM WITH SHADOW RAM UPDATE TO THE COLOR MAP

[75] Inventors: Monish S. Shah; Andrew C. Goris, both of Ft. Collins, Colo.

[73] Assignee: Hewlett-Packard Company, Palo Alto, Calif.

[21] Appl. No.: 86,349

[22] Filed: Aug. 18, 1987

[51] Int. Cl.$^5$ .................... G06F 15/00; G09G 1/02
[52] U.S. Cl. .................. 395/166; 395/164; 395/162; 340/799
[58] Field of Search ........... 340/750, 798, 799, 800, 340/798–800, 750; 364/518, 561; 395/162, 164, 166

[56] References Cited

U.S. PATENT DOCUMENTS

| | | | |
|---|---|---|---|
| 4,325,063 | 4/1982 | Herman | 340/790 X |
| 4,580,134 | 4/1986 | Campbell et al. | 340/703 |
| 4,604,615 | 8/1986 | Funahashi | 340/798 X |
| 4,642,794 | 2/1987 | Lavelle et al. | 364/900 |
| 4,688,190 | 8/1987 | Bechtolsheim | 340/799 X |
| 4,736,239 | 4/1988 | Sprague et al. | 340/703 X |
| 4,742,350 | 5/1988 | Ko et al. | 340/799 |
| 4,769,637 | 9/1988 | Forrester et al. | 340/726 |
| 4,860,251 | 8/1989 | Bizjak et al. | 364/900 |
| 4,916,301 | 4/1990 | Mansfield et al. | 364/521 X |

OTHER PUBLICATIONS

Sippl, Computer Dictionary, Howard W. Sams and Co., 1985, p. 47.

Primary Examiner—Dale M. Shaw
Assistant Examiner—Kee M. Tung
Attorney, Agent, or Firm—Edward L. Miller

[57] ABSTRACT

A graphics system uses a programmable tile size and shape supported by a frame buffer memory organization wherein (X, Y) pixel addresses map into regularly offset permutations on groups of RAM address and data line assignments. Changing the mapping of (X, Y) pixel addresses to RAM addresses for the groups changes the size and shape of the tiles. A pixel data/partial address multiplexing method based on programmable tile size reduces the number of interconnections between a pixel interpolator and the frame buffer. A programmable pipelined shifter allows the dynamic alteration of the mapping between bits of the RGB intensity values and the planes of the frame buffer into which those bits are stored, as well as allowing those values to be truncated to specified lengths. Tiles are cached. Tiles for RGB pixel values are cached in an RGB cache, while Z values are cached in a separate cache. The Z buffer for hidden surface removal need not be a full size frame buffer, as a lesser portion of frame buffer is, if need be, used repeatedly. Updates to the color map are performed from a separate shadow RAM during vertical retrace. The shadow RAM is large enough to accommodate two copies of the color map, and can load them in automatic alternation, producing a blinking effect without the use of an additional plane of frame buffer memory.

1 Claim, 34 Drawing Sheets

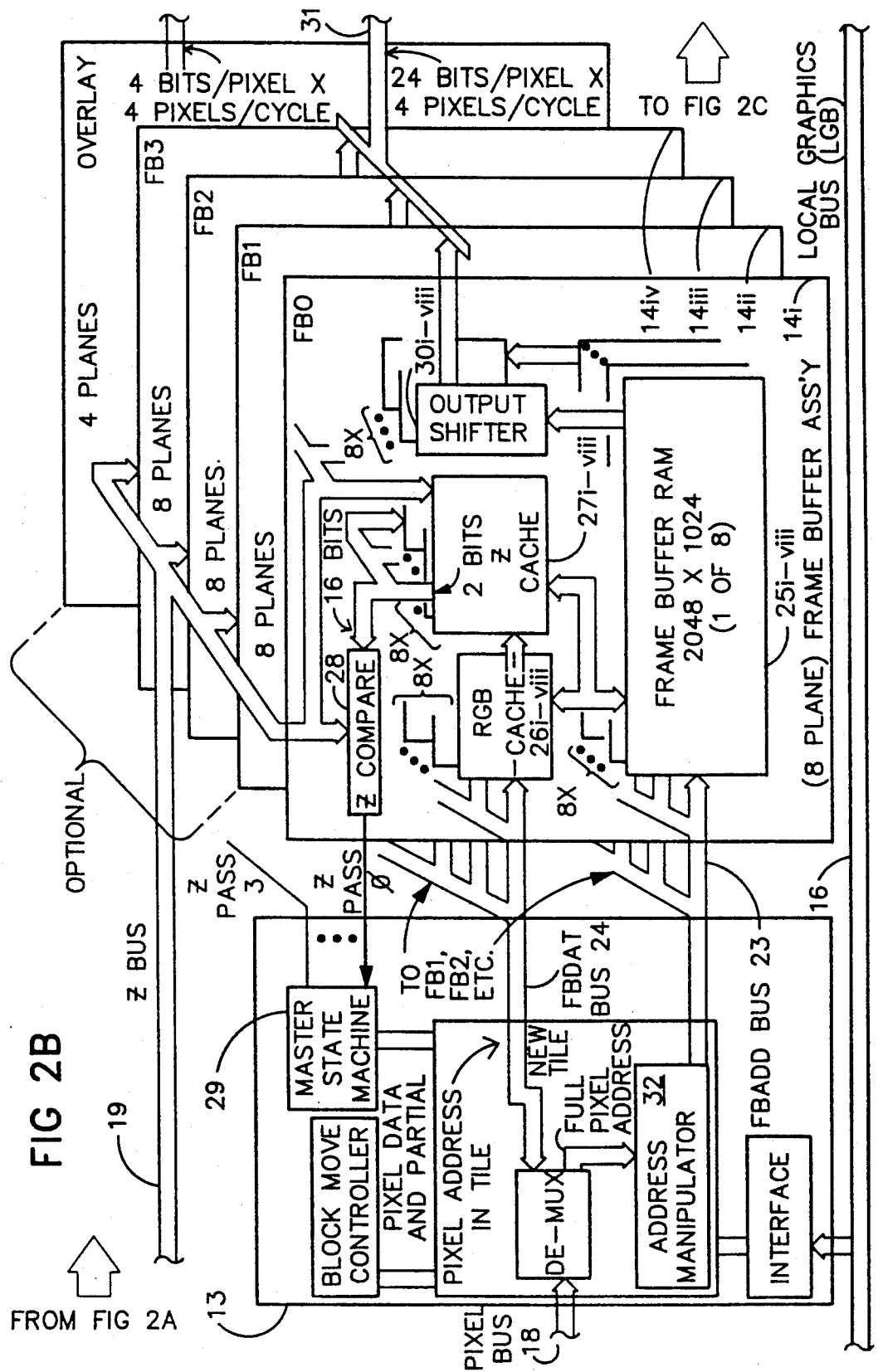

$2^{11}$=2048 PIXEL WIDE X $2^{10}$=1024 SCAN LINE FRAME BUFFER MEMORY ORGANIZATION USING 64K X 4 RAM'S

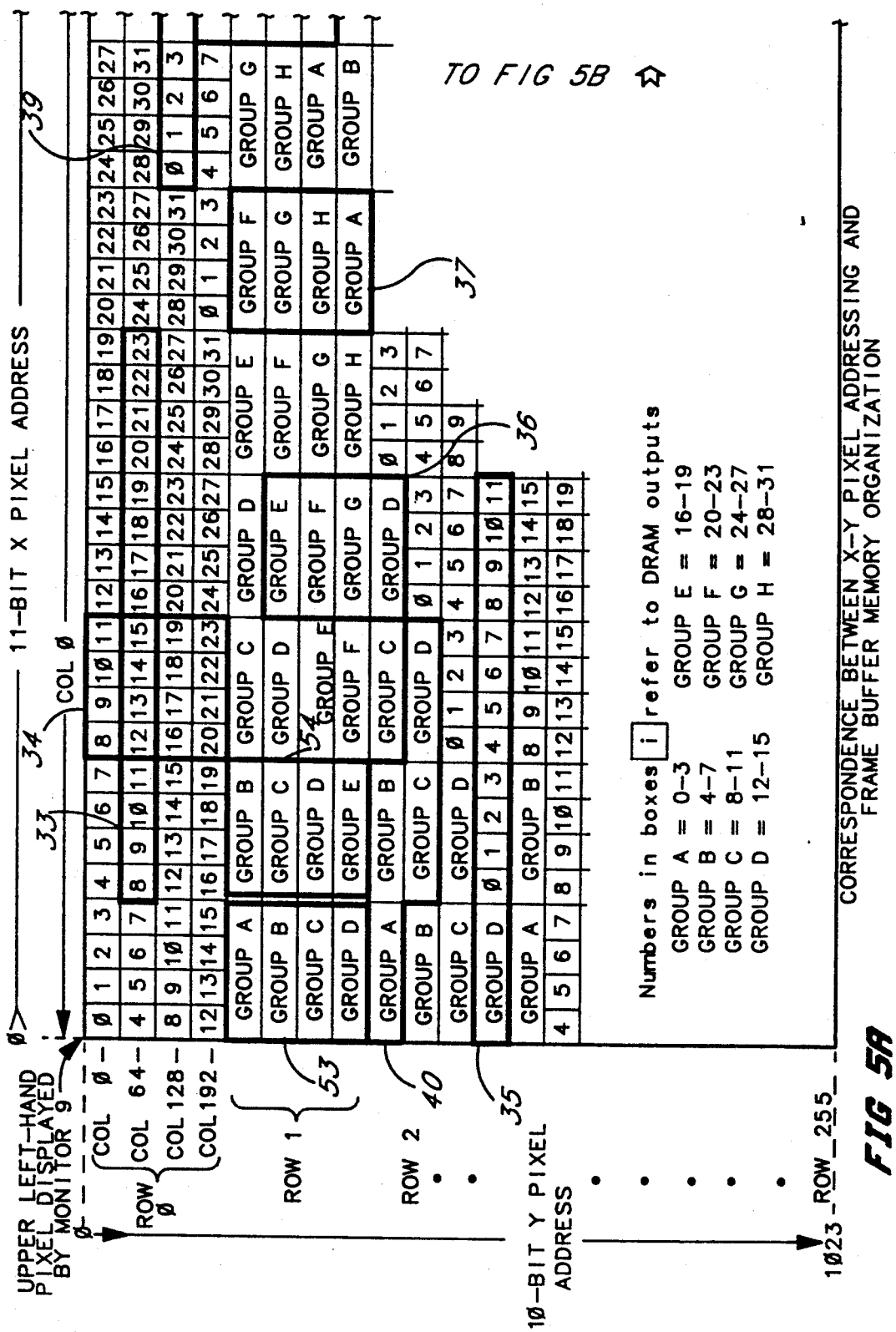

ADDRESSING 16 X 1 TILES

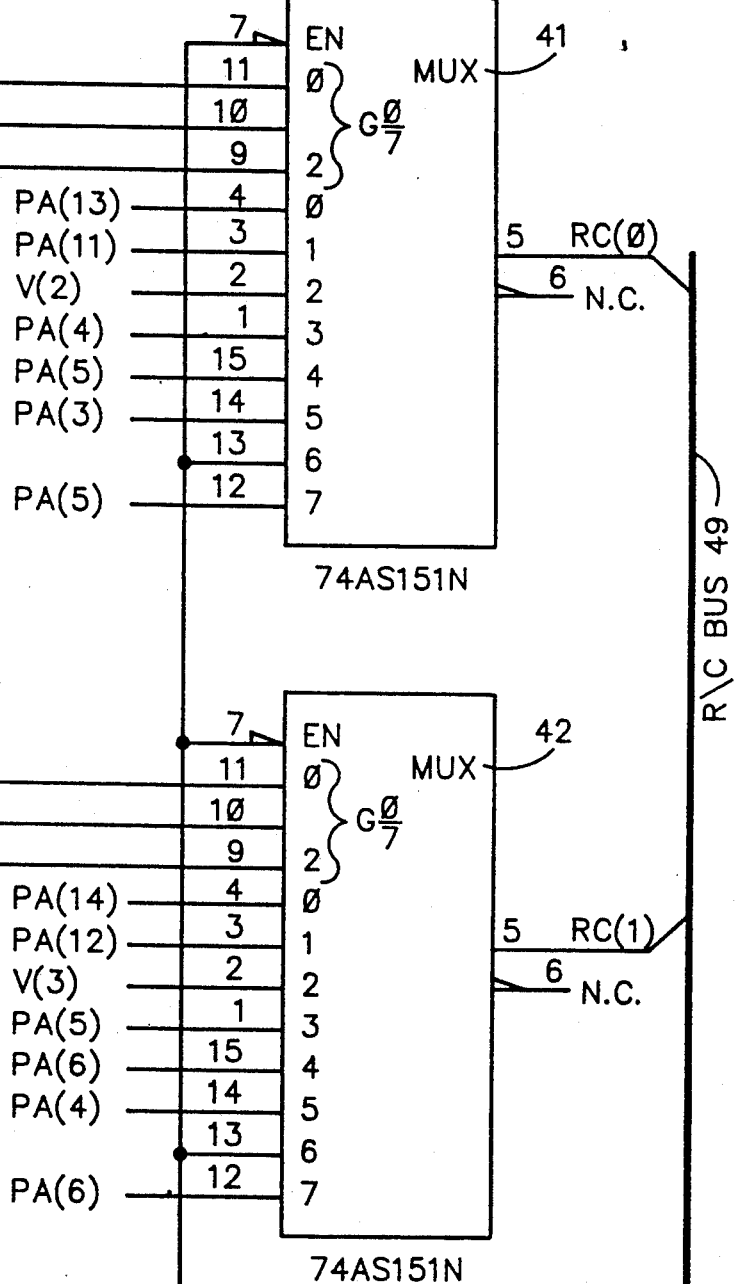
FIG. 10A₁

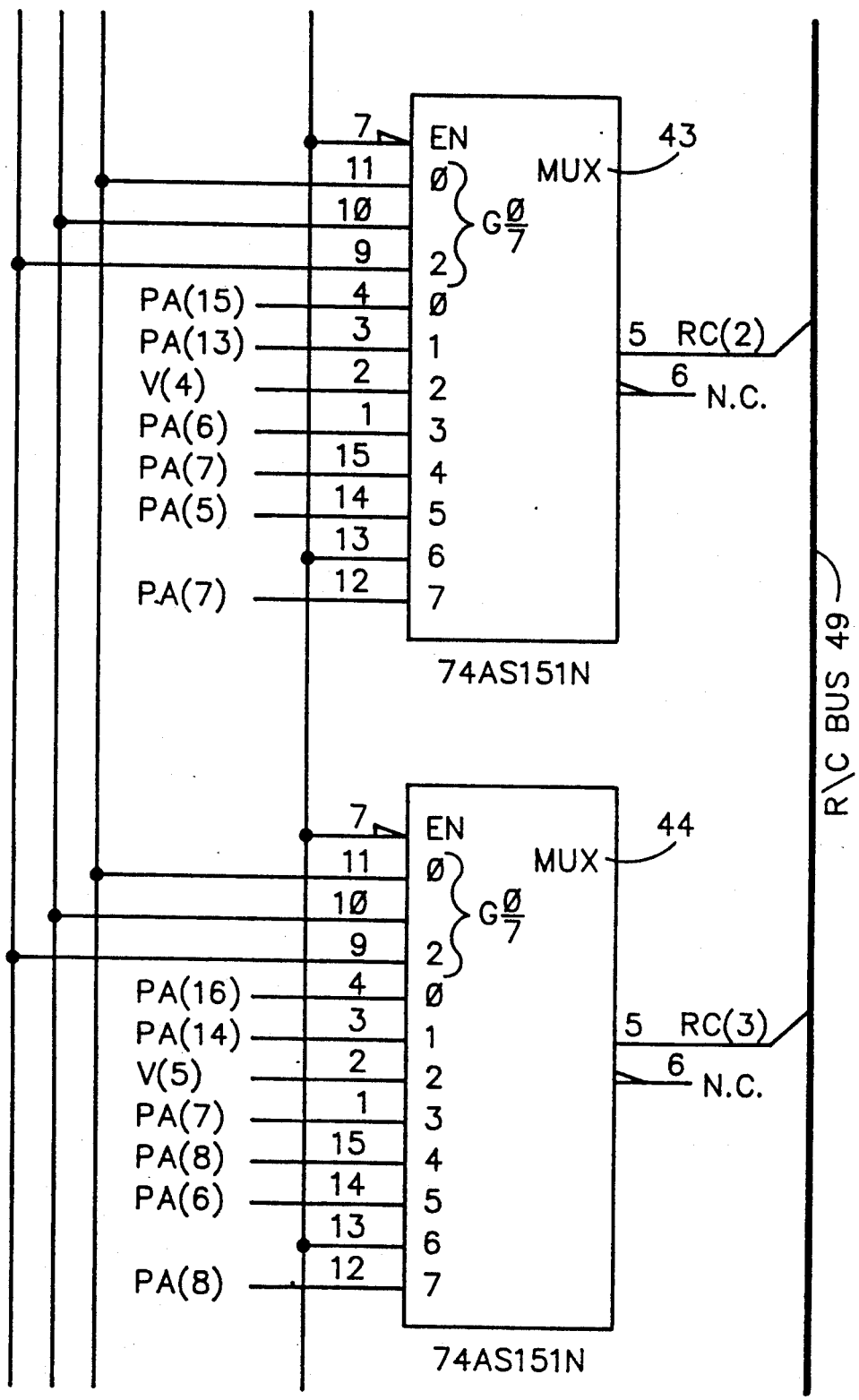
FIG. 10A₂

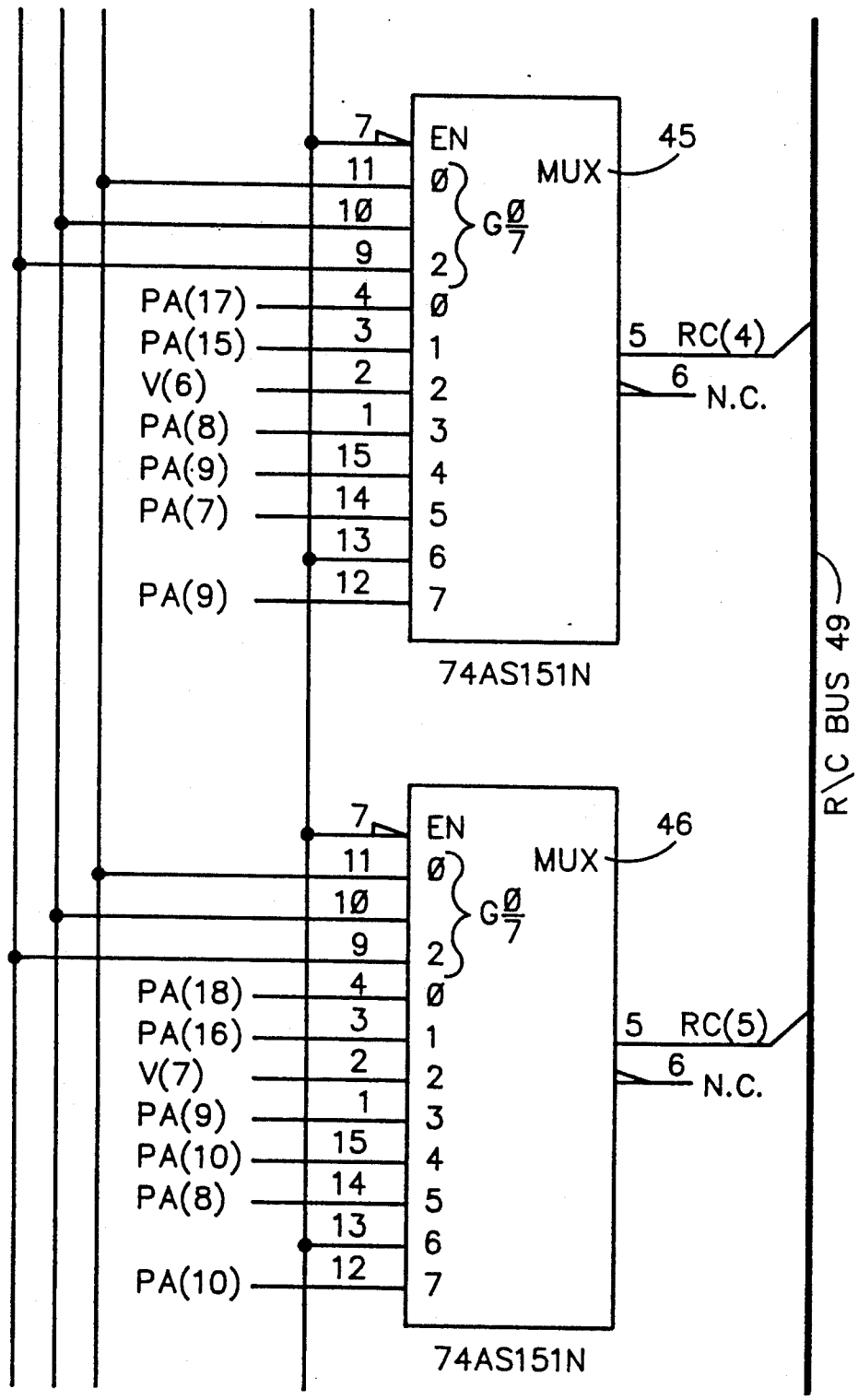
FIG 10B₁

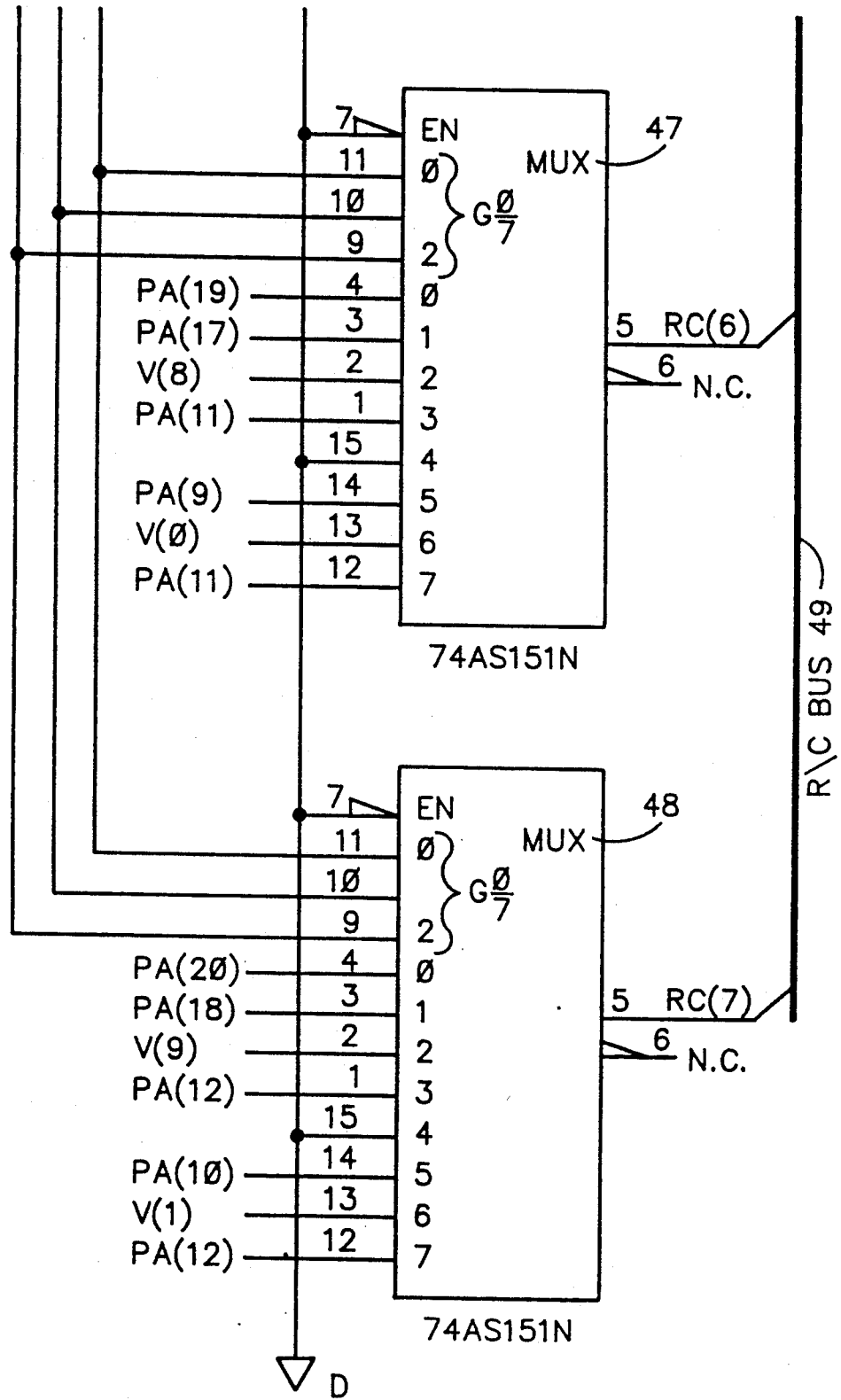
FIG. 10B₂

| TYPE OF ACCESS | | MODE | RC_SEL | Ca-Cb | COL_OFF | ZOFF |
|---|---|---|---|---|---|---|
| 4 X 4 PIXEL ACCESS | (ROW) | 0 | 0 | 0 | 0 | 0 |
| | (COL) | 0 | 4 | 0 | 0 | 0 |
| LGB | (ROW) | 1 | 1 | 0 | 0 | 0 |
| | (COL) | 1 | 5 | 0 | 0 | 0 |
| VIDEO/DYNAMIC REFRESH | (ROW) | 2 | 2 | 0 | 0 | 0 |
| | (COL) | 2 | 6 | 0 | 0,1,2,3 | 0 |
| Z ACCESS | (ROW) | 3 | 0 | 0 | 0 | AM9150 |
| | (COL) | 3 | 3 | 0 | 0 | AM9150 |
| 16 X 1 PIXEL ACCESS | (ROW) | 4 | 0 | 0 | 0 | 0 |
| | (COL) | 4 | 7 | 0 | 0 | 0 |
| BLOCK MOVER | (ROW) | 5 | 0 | 0 | 0 | 0 |
| | (COL) | 5 | 7 | 0,1 | 0 | 0 |

INPUTS TO ADDRESS MANIPULATOR: MODE, RC_SEL

INTERNALLY GENERATED SIGNALS: Ca-Cb, COL_OFF, ZOFF

FIG 10C₁

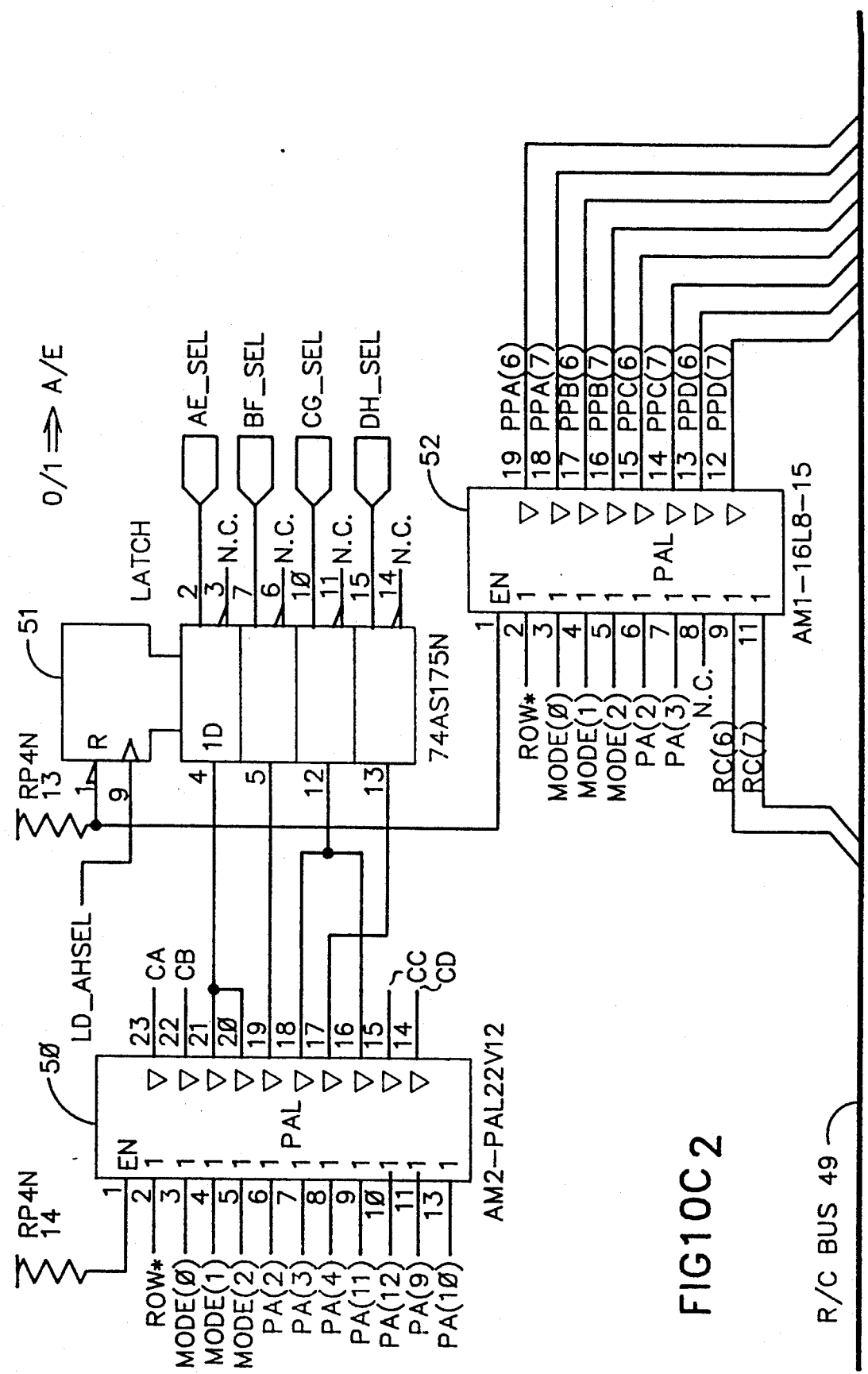
FIG 10C2

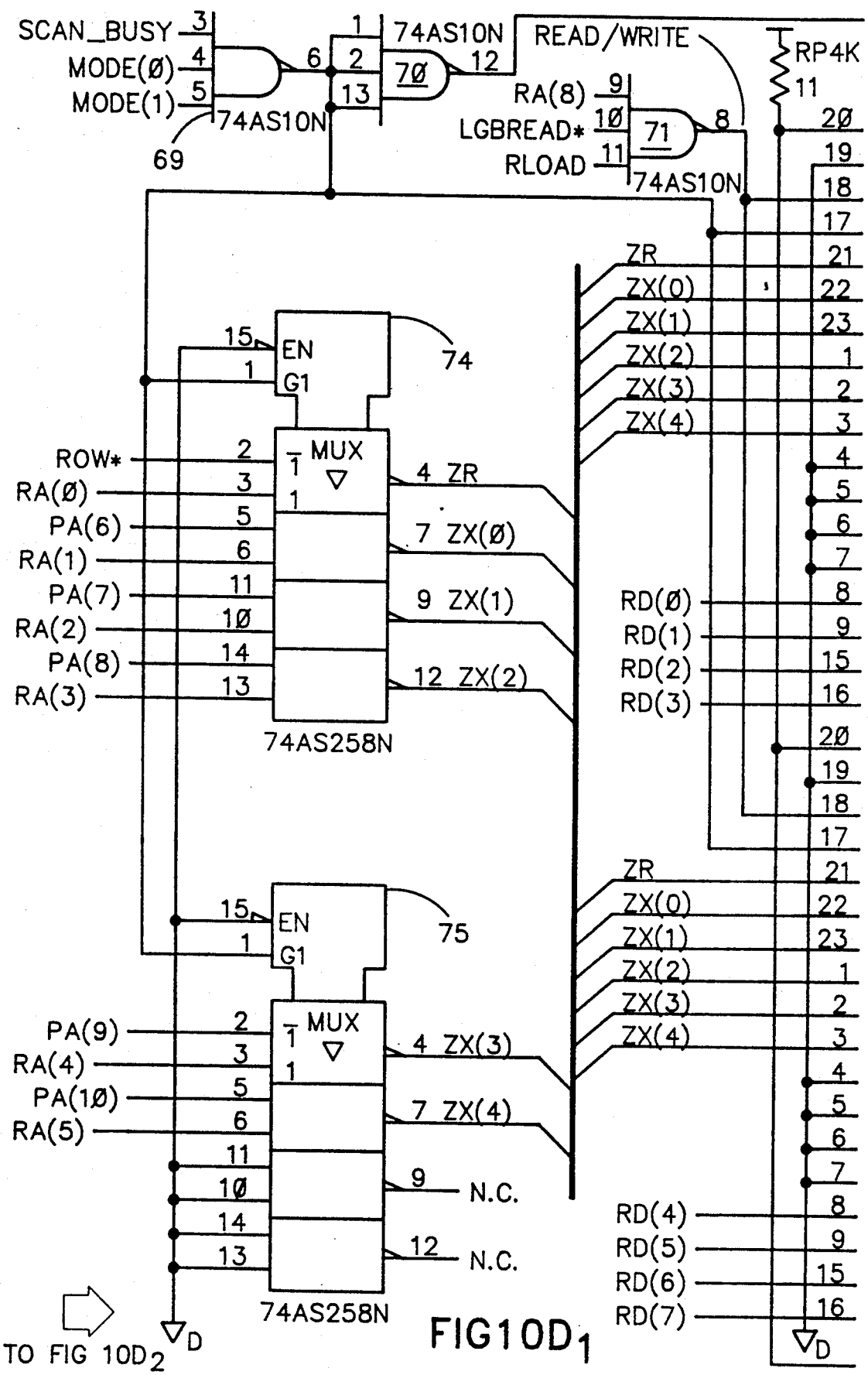

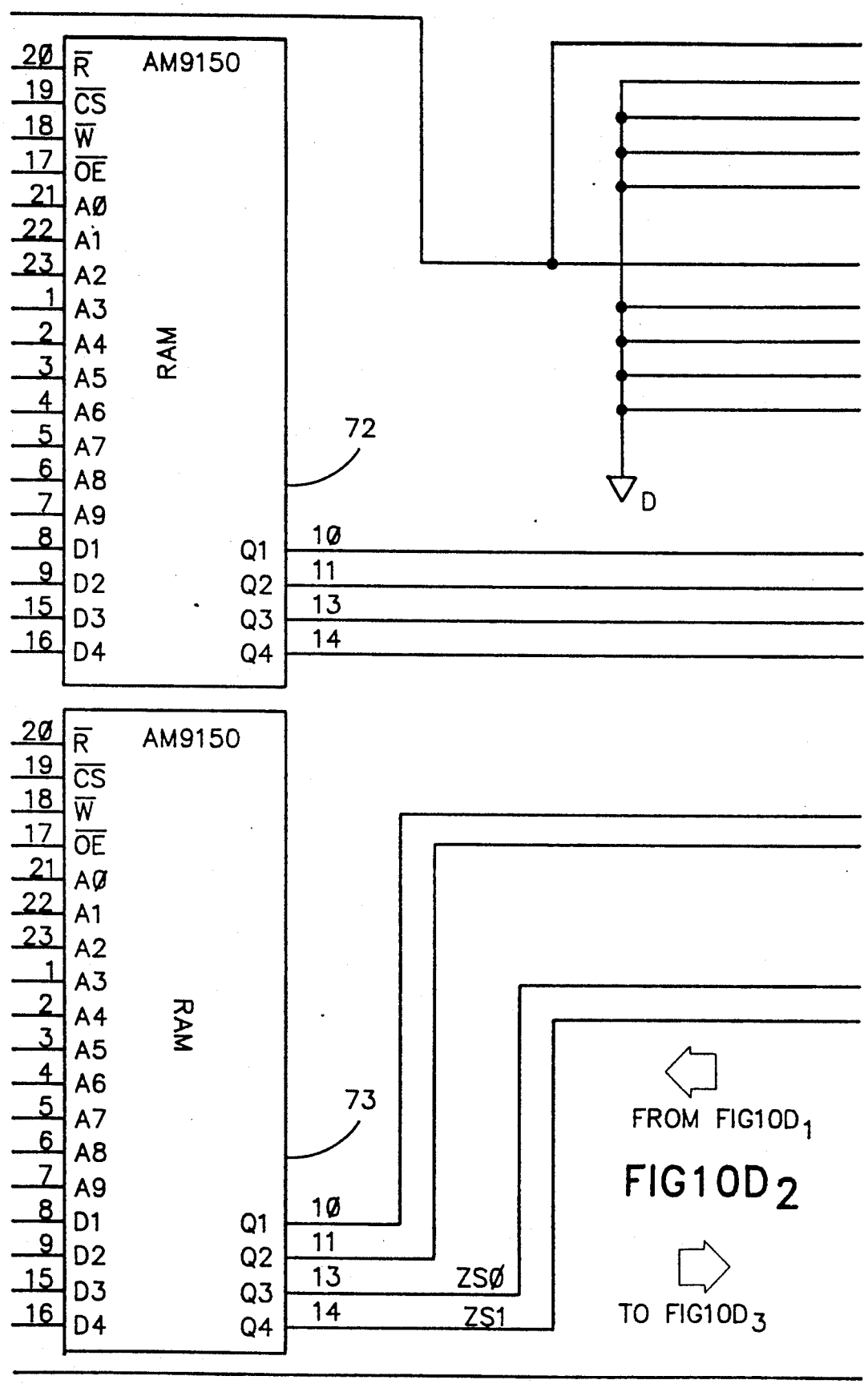
FIG10D₂

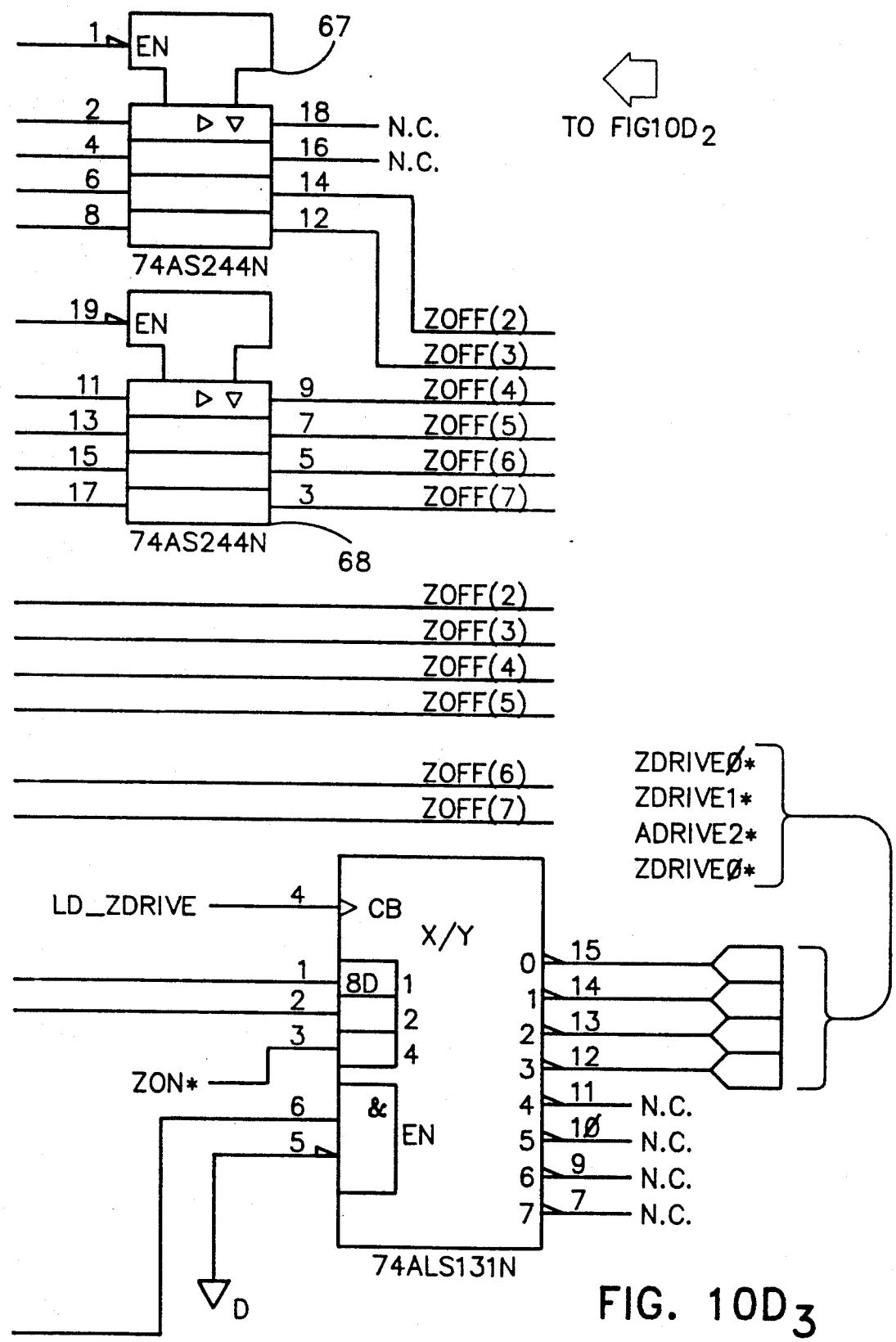
FIG. 10D₃

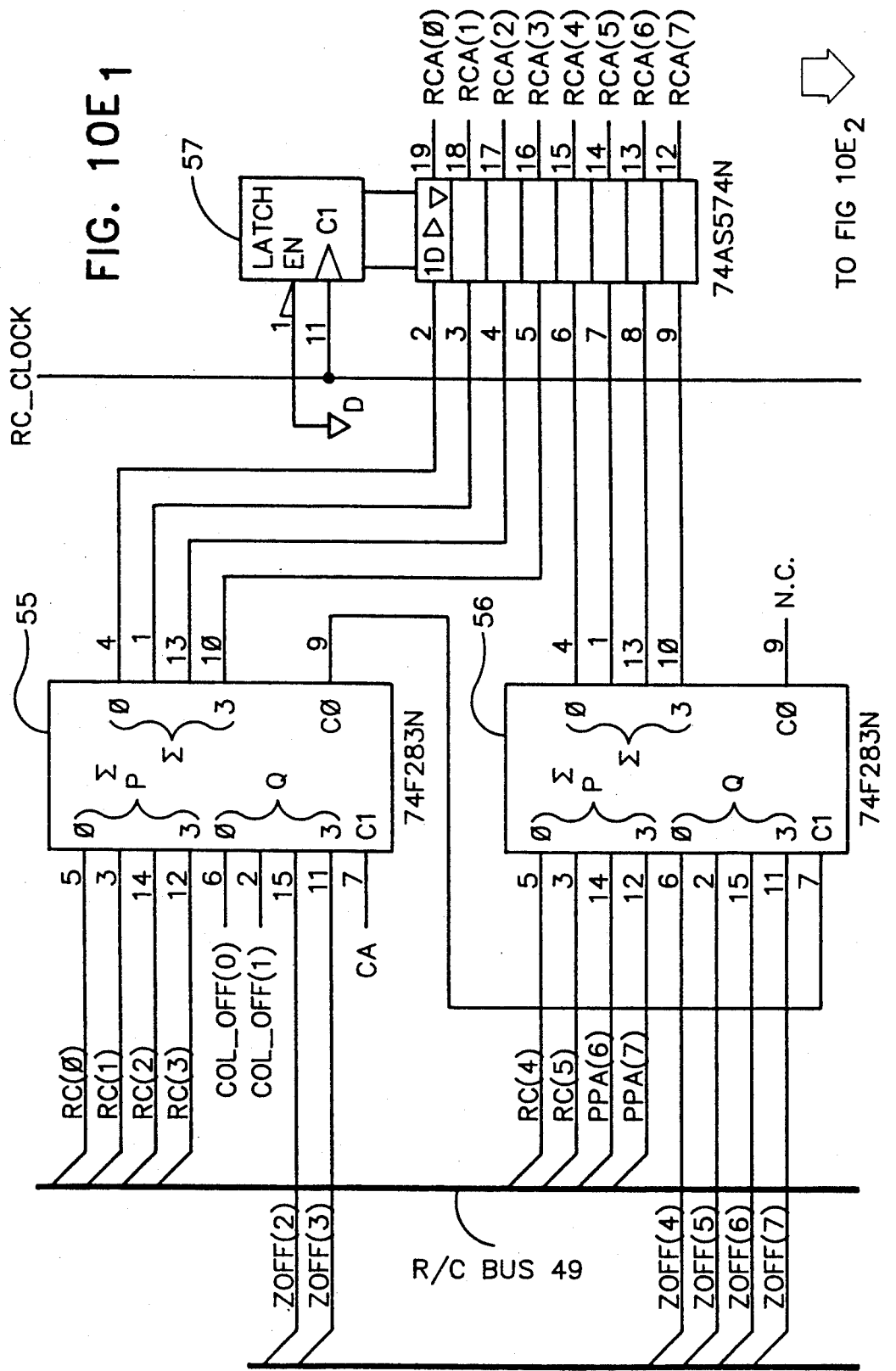
FIG. 10E₁

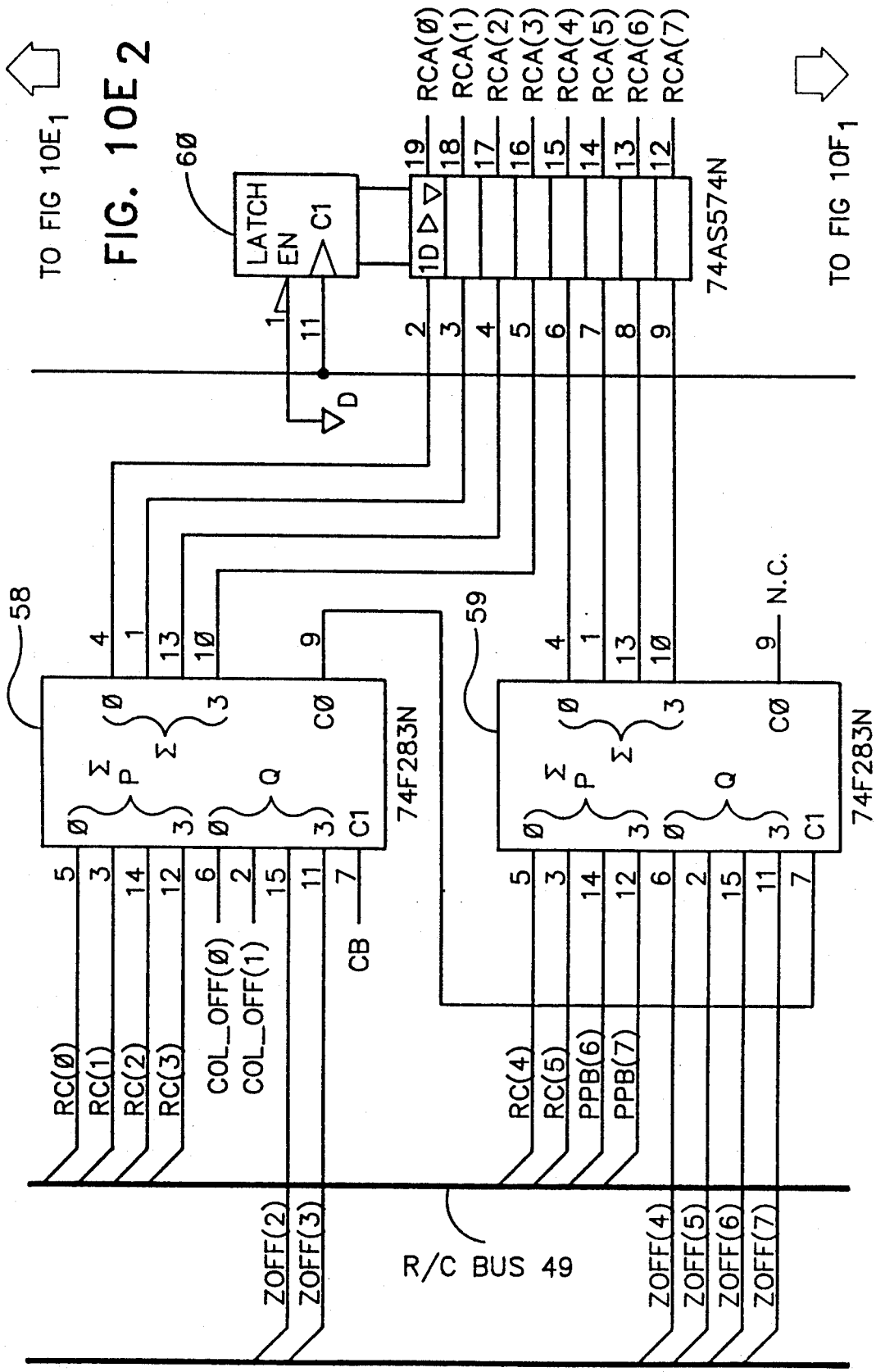

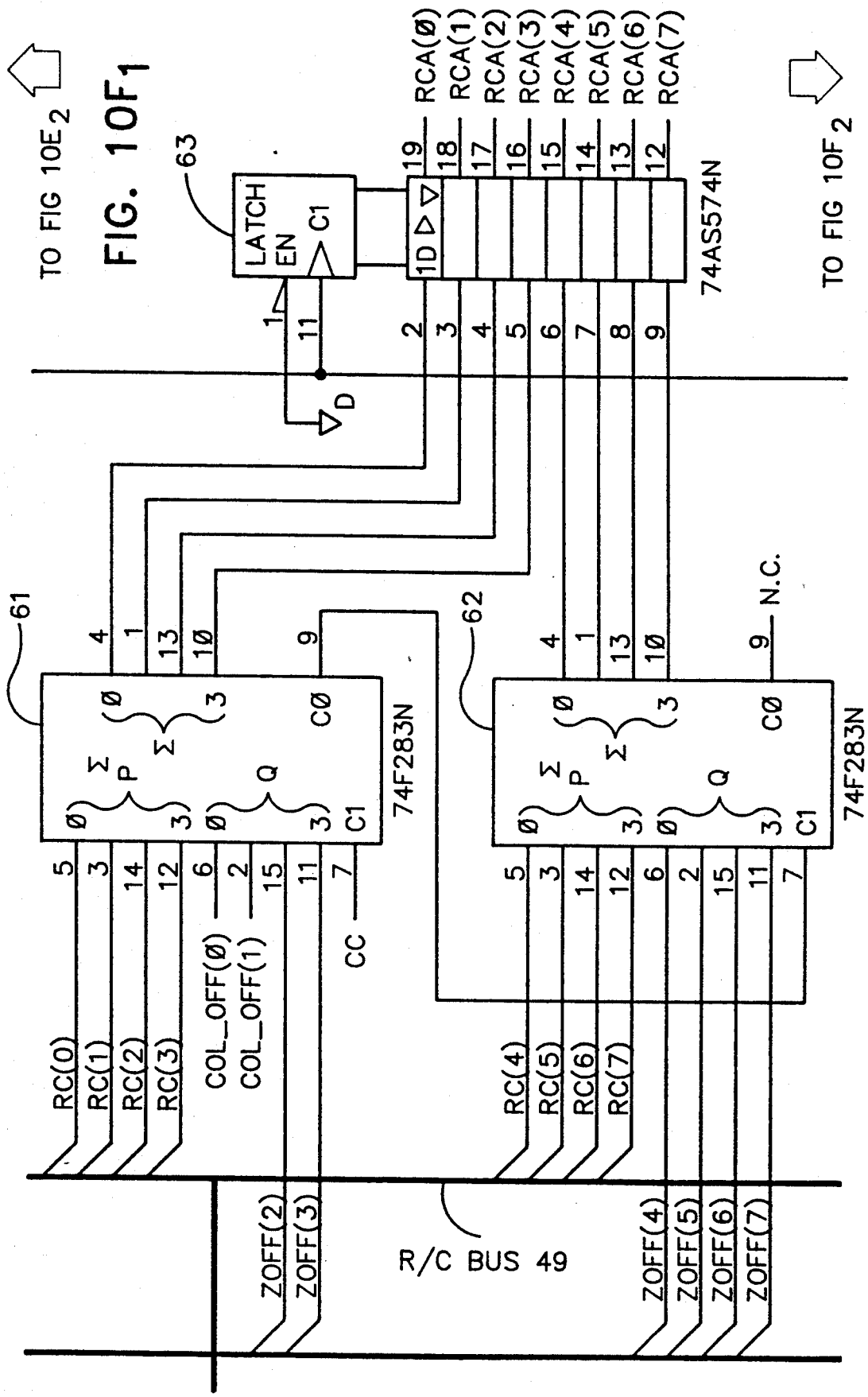

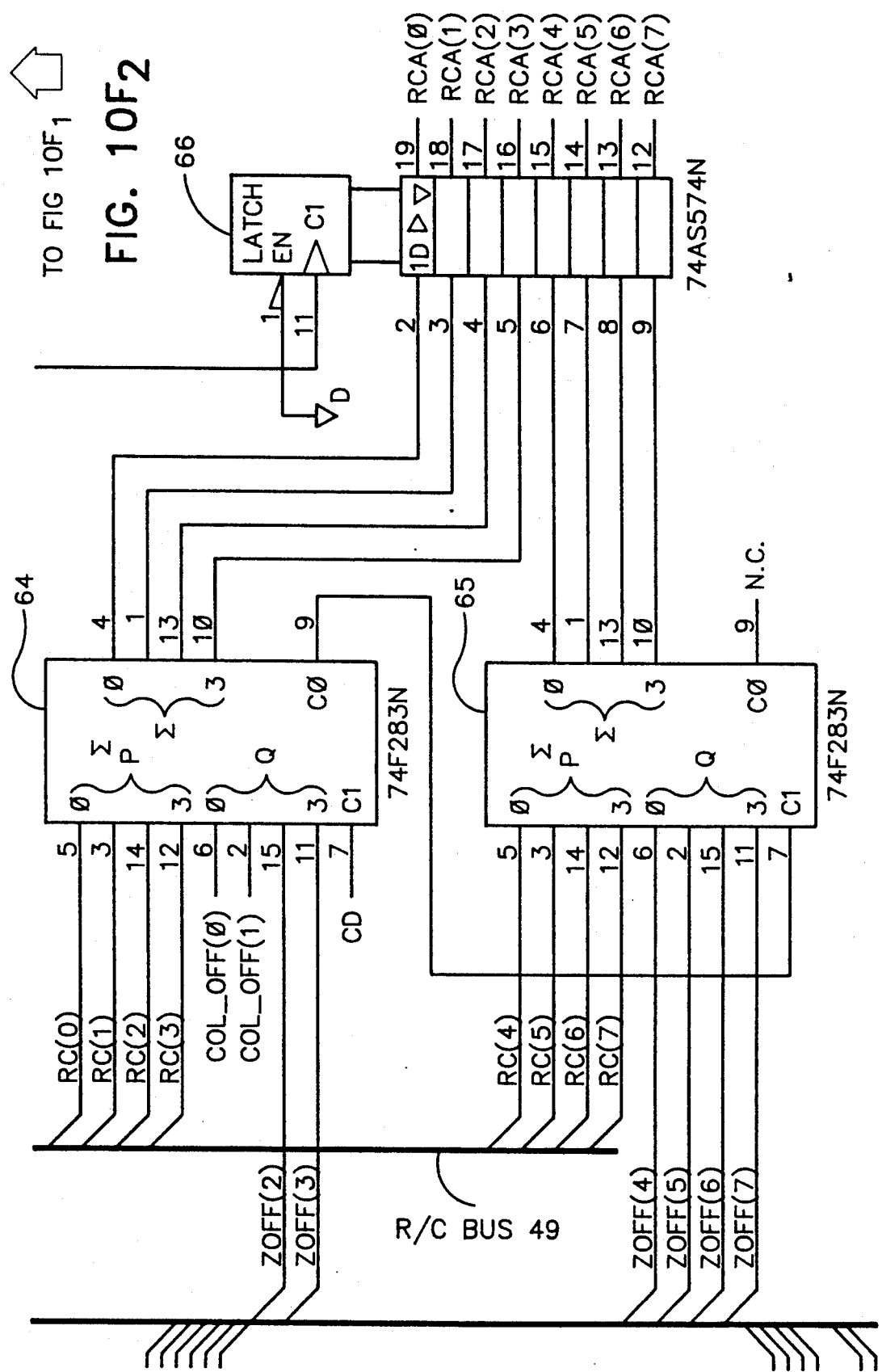

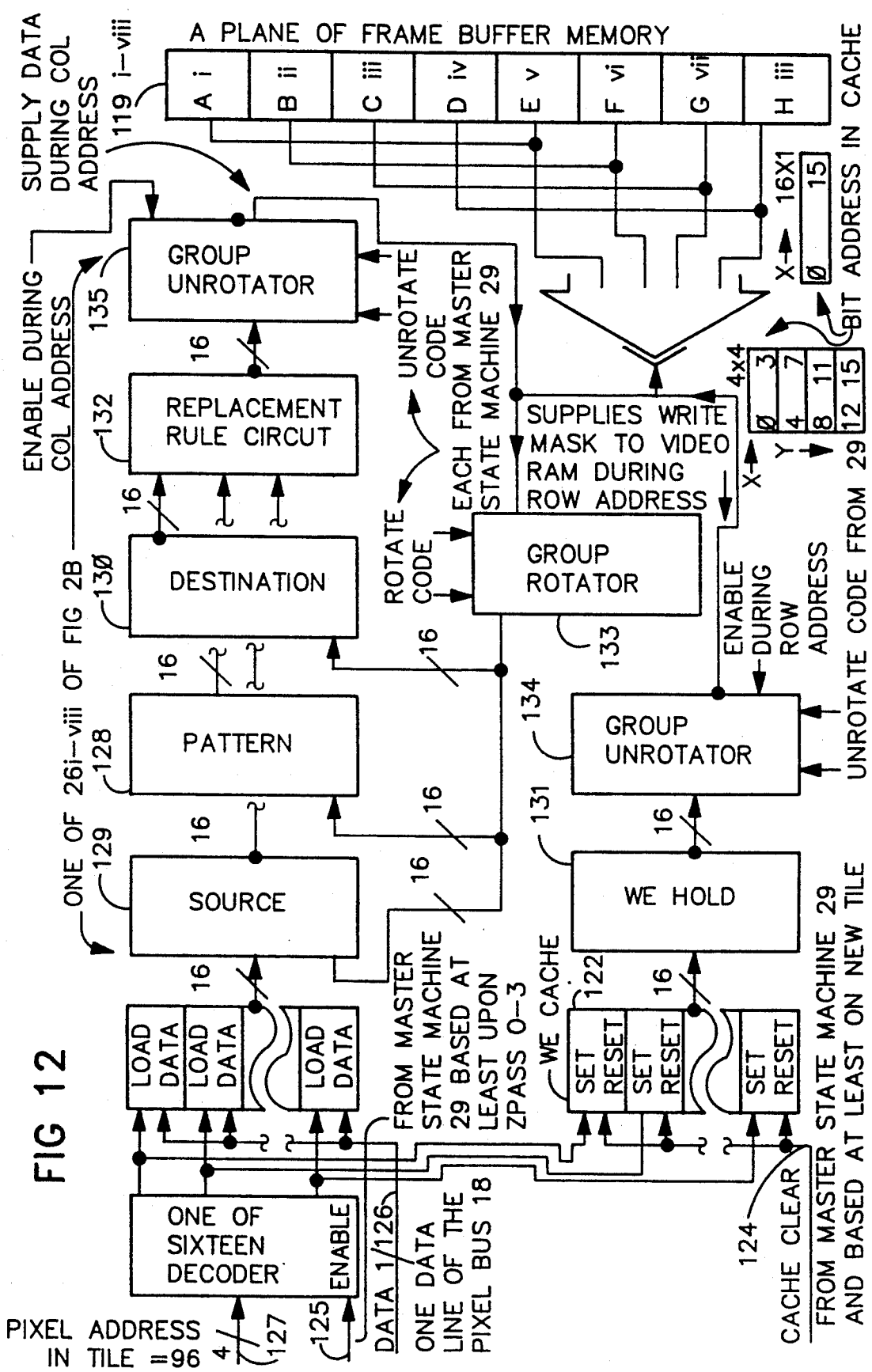

TO FIG13B

GRAPHICS SYSTEM WITH SHADOW RAM UPDATE TO THE COLOR MAP

BACKGROUND AND SUMMARY OF THE INVENTION

A modern high-performance graphics workstation suitable for solid modelling must incorporate a number of features to provide high speed rendering of objects while at the same time remaining affordable. Experience shows that the tasks to be accomplished are so numerous and often so complicated that special purpose dedicated hardware is a necessity if useful images are to be rendered and manipulated with adequate speed. Furthermore, it would be desirable if the feature set of the dedicated hardware were flexible and reconfigurable according to the firmware and software subtasks arising from the user's high-level activities. The techniques disclosed herein reduce costs, increase performance and add flexibility.

One major aspect of the invention involves the concept of cache memory. This is a technique often used in high-performance computer systems to increase the speed with which the CPU can access data stored in a main memory. The idea is to use a small high speed memory to replicate the contents of a selected region of the main memory. The CPU does its memory accesses to the cache, which either does or does not contain data representing the desired location in main memory. If the cache does contain the data for the desired location the fast access to the cache acts in the place of a slower access to the main memory. This is called a "hit." If, on the other hand, the cache does not contain data for the address to be accessed, then the contents of the cache must be changed to reflect that part of main memory that does contain the desired data. This is called a "miss," and involves writing the current contents of the cache back into main memory (unless the current content of the cache was never modified) and then loading the cache with data in the main memory taken from the vicinity of the new address of interest. To facilitate this architecture there is usually a wide data path between the cache and the main memory.

A hardware pixel processor in a graphics system is essentially a CPU that needs to write data into a memory. In this case the memory is called a frame buffer, and it has an address for each pixel component of the display. The frame buffer is also accessed by another mechanism that reads the contents of the frame buffer to create the corresponding pixel by pixel image upon a monitor. Typically, the monitor will be a color CRT with red, green and blue (RGB) electron guns whose intensities are varied by discrete steps to produce a wide range of colors. Accordingly, the frame buffer is divided into portions containing multi-bit values for each color of every pixel. The preferred way to do this is to organize the frame buffer into "planes" which each receive the same address. Each plane holds one bit at each address. Planes are grouped together to form multi-bit values for the attributes of the pixels they represent. Attributes include the RGB intensities, and in many systems ON and OFF for pixels in an "overlay" plane that is merged with data in other planes. For instance, an overlay plane might contain a cursor, and the presence of a bit in the overlay plane might force saturation intensity for all three electron guns, regardless of the actual RGB values for that pixel. In graphics systems with two-dimensional displays that are intended for use with solid modelling of three-dimensional objects, there is frequently another attribute that is stored for each pixel: its depth. Hardware storage of depth values greatly facilitates hidden surface removal, as it allows the hardware to automatically suppress pixels that are not upon the outer surface facing the viewer.

In accordance with what has been described above, it is not unusual to find graphics systems with between twenty-four and forty planes of frame buffer memory: perhaps three sets of eight for RGB values and sixteen or more for Z, or depth, values. Considering that the monitor could easily be 1280 pixels wide and 1024 pixels high, and that refreshing the display at a power line frequency of sixty Hertz is a requirement, it can be concluded that a new pixel of twenty-four or more bits (and possibly qualified for depth) must be obtained for the monitor from the frame buffer at a rate of approximately one pixel every nine nanoseconds. To some extent the advent of so called "video display RAM's" has made this easier to do. They have special high speed ports that read blocks of data at high speed for use by a shifter that, when grouped with the shifters of other planes for the same color, produce the multi-bit values for color intensity. These multi-bit values are applied to digital-to-analog converters (DAC's) that in turn generate the signals that actually drive the electron guns.

Despite the video RAM's, formidable problems remain concerning the task of getting the data into the frame buffer in the first place. In the long run, the graphics system will not be able to manipulate an image (draw it, rotate it, cut a hole in it, etc.) any faster than the image can be put into the frame buffer. The speed with which this can be done is one important aspect of "high performance" in a graphics system. Recalling the purpose for caching in a conventional computer system, it will be noted that there is a certain similarity. It would be desirable if a way could be found to cache pixels into a high speed memory and reduce the number of write operations made into the frame buffer. If this could be done without sacrificing other desirable features it would significantly increase the rate with which data could be put into the frame buffer. This is indeed desirable, since much work has been done to develop and perfect dedicated hardware to generate at high speed pixel values from a more abstract description of the image to be rendered.

In the invention to be described each plane of frame buffer memory is equipped with a corresponding plane of a pixel cache. The pixel rendering hardware stores computed pixel values into the frame buffer by way of the cache. Those familiar with pixel rendering mechanisms will appreciate that the order in which pixels are calculated is not necessarily related to the order they are accessed for use in driving the monitor, which is typically vertically by horizontal rows for a raster scanned CRT. Instead, pixels are apt to be generated in an order that makes sense in light of the techniques being used to represent the object. A wire frame model would rely heavily on the drawing of arbitrarily oriented vectors, while shaded polygons would rely heavily upon an area fill based on successive horizontal lines of pixels. For a curved surface the successive horizontal lines are apt to be fairly short, may be of varying lengths, and might not line up exactly above or beneath each other. Clearly, the preferred pixel rendering techniques are no respecters of sequentially addressed memory spaces! Yet the sequence of generated pixels are still strongly related by just more than being consecutive members in some order of pixel generation; their locations in the final image are physically "close" to each other. That is, sequentially generated pixels are apt to posses a shared "locality." That this is so has been noticed by others, and has been termed the "principle of locality." It seems clear that to maximize the number of hits, a cache for a frame buffer ought to operate in view of the principle of locality. But it is also clear that a different type of locality obtains for area fill operations than does for arbitrary vectors.

A "tile" is a rectangular collection of pixels. Various schemes for manipulating pixels in groups as tiles have been proposed. It would seem that what a pixel cache for a frame buffer ought to do, at least in part, is cache a tile. But again, the tile shape best suited for area fill operations would be one that is one pixel high by some suitably long number of pixels. The optimum tile shape for the drawing of arbitrary vectors can be shown to be a square. So what is needed then, is a pixel cache whose "shape" is adjustable according to the type of tile best suited for use with the type of pixel rendering to be undertaken.

That object can be achieved by a pixel cache, frame buffer controller and frame buffer memory organization that cooperate to implement a cache corresponding to a tile of adjustable rectangular dimensions. The frame buffer memory organization involves dividing the frame buffer into a number of separately addressable groups. Each group is composed of one or more bits. Along the scan lines of the raster groups repeat in a regular order. Successive scan lines have different starting groups in the pattern of repetition. Thus, whether a tile proceeds horizontally along a scan line, or vertically across successive scan lines, different groups are accessed for the pixels in that tile. This allows the entire tile to be fetched with one memory cycle. In such a scheme adjacent pixel addresses do not necessarily map into adjacent frame buffer addresses, as in conventional bit-mapped displays. Instead, an address manipulator within the frame buffer controller converts a pixel address (screen location) into a collection of addresses (one for each group) according to rules determined by the shape of the tile to be accessed.

Each plane of the frame buffer memory includes a sixteen-bit plane of an RGB pixel cache and a sixteen-bit plane of a Z value cache. (It will be understood, of course, that the number sixteen is merely exemplary, and is not the only practical size of pixel cache.) For each bit in a pixel's RGB values, the pixel's (X, Y) location on the monitor is mapped into the proper location of the plane of the RGB cache associated with that bit. If there is a hit, then the pixel is written to the cache. If there is a miss, then the cache is written out to the frame buffer in accordance with a replacement rule similar to those used with so-called "line movers" or "bitblts." The replacement rule uses sixteen-bit registers named SOURCE, DESTINATION and PATTERN. There is one of these registers for each plane of frame buffer memory. At the time of the preceding miss, each DESTINATION, and not the cache, was loaded with a copy of that region (tile) of the frame buffer that the cache was then to represent. Data was then written to the cache until there was a miss. Then the frame buffer controller simultaneously copied all of the bits of each plane in the cache into each SOURCE; this frees the cache for immediate use in storing new pixel values.

The frame buffer controller proceeded to combine each SOURCE with its associated DESTINATION according to the desired rule (OR, AND, XOR, etc.). The result was further modified by the associated PATTERN, which can be used to impose special deviations upon the pixel data. For example, PATTERN might suppress a regular succession of pixels to create "holes" into which might later be placed pixels of another object, thus creating the illusion of transparency. However achieved, the result is written, all sixteen bits in parallel, for each plane, to the frame buffer. The mapping of pixel addresses into the cache and the parallel write into the frame buffer (i.e., the mapping of the cache contents back into frame buffer addresses) are automatically adjusted according to the size and shape of the tile being handled. Thus, one aspect of the invention to be disclosed is a pixel cache memory that accepts programmatically variable tile sizes. It will be further understood as the description proceeds that the tiles may be aligned on selected pixel boundaries, and that those boundaries need not be permanently fixed in advance.

A second major aspect of the invention concerns what is commonly referred to as the Z buffer. In a conventional graphics system the Z buffer is a memory, separate from the frame buffer, holding the Z (depth) value of each pixel. In a high-performance graphics system the Z values are typically sixteen-bit integers. Thus the conventional Z buffer would, like the frame buffer, have an address for each pixel. The second major aspect of the invention allows a more efficient use of memory by making each plane of the frame buffer larger than is necessary merely to hold the RGB values for pixels. Each plane of frame buffer memory contributes memory that can be associated with other such contributions to form all or a portion of a Z buffer. Furthermore, entire planes of what might otherwise be frame buffer memory can be allocated to the Z buffer. At root, what is taught is a very flexible division of available frame buffer memory into an RGB buffer portion and a Z buffer portion. Said another way, the Z buffer can be made any size and located anywhere in the frame buffer memory through the use of a Z buffer mapping.

If it should be the case that the amount of available memory for the Z buffer is less than enough to hold a sixteen-bit integer for each pixel (and in a preferred embodiment this is frequently the case), then hidden surface removal is performed in sections. For example, if there has been only enough memory allocated to the Z buffer to correspond to one fourth of the frame buffer, then the rendering of an image is divided into four similar activities. First, an initial fourth of the display is created. This might be a top-most horizontal strip, or a left-most vertical strip, or any suitable fourth of the display. Pixels that are to reside in the selected fourth of the display are rendered. As the RGB values for those pixels are calculated, so are their Z values.

The existence of a hidden surface implies that there are some addresses in the frame buffer to which more than one RGB value corresponds; each pixel is associated with a different surface (or at least a different portion of the same surface). Absent any special control to the contrary, the various pixels will be calculated in some order related to the way the object has been described to the graphics system's software and the rendering algorithms in use. As each of the multiple pixels corresponding to an address is rendered its RGB and Z values would overwrite the previous values. Hidden surface removal at the hardware level with a Z buffer compares the Z values of the conflicting pixels and allows the one with the least depth to prevail. That is, the Z value of a new pixel in hand for a certain address is compared with the Z buffer value for the pixel already in that address. An old pixel's values are overwritten by the new values if the old pixel is on a hidden surface to be removed, as indicated by the comparison of the Z values. An additional feature of the invention in this connection is the ability to programmatically decide what to do in the event the new and previous Z values are equal.

To continue with the example, the above process is carried out for all pixels in the fourth of the display being generated. Following that, the Z buffer is allocated to represent the next fourth of the display, and the process is repeated until the entire display has been created afresh. This process might take several seconds if the image is extremely complicated and there is but a very small Z buffer. On the other hand, it only has to be done once for each presentation of a new image to the frame buffer, and not once for each refresh of the image from the frame buffer to the monitor.

The above described technique for hidden surface removal with a Z buffer that corresponds to less than the full frame buffer is termed "strip Z buffering." Strip Z buffering requires some cooperation from the software that tells the graphics hardware what to draw. It will be appreciated that the image to be rendered is described in a data structure called a display list and resembling a data base. A simplified description of the graphics system software is that it interacts with the user to get into the form of a display list an object he desires to display and then manipulate. The display list describes the object in the abstract. Any particular view of the object must be derived from that abstract description through specifying from were to view it, where the clip limits are, where the light sources are, etc. This information is used to decide what pixels are needed to form the image on the monitor. If strip Z buffering is in use, then the software that makes that decision (the derivation mentioned above) must also know what region of the screen corresponds to the location of the Z buffer (i.e., where the "strip" is). During the traversal of the display list it must decline to generate pixels for regions not in the strip. Then it must traverse the list again with the new strip, and so on until the entire object has been rendered. In a preferred embodiment the software already knows where the Z buffer is because it controls that, too; the Z buffer may be programmatically located anywhere in the frame buffer.

When hidden surface removal is in effect the pixel processing mechanism that creates individual RGB values for pixels also simultaneously creates the Z value. The Z values need to be stored into the frame buffer at the same overall rate as the RGB values. The Z values are stored via a sixteen-bit cache memory (with one plane per plane of frame buffer memory) that are very similar to the one that caches the RGB values. Recalling that the Z values are themselves sixteen-bit values, one might be tempted to conclude that all sixteen bits of a Z value are stored in the same plane of (excess) frame buffer memory, and that when that is full then the next Z value goes into the excess portion of the next plane. That is not done since it would require the addresses of the Z values to map into various planes of the Z cache, which is a major architectural feature not having a counterpart in the RGB cache. Since the cache mechanism is part of a VLSI chip, two instances of the same architecture is far more desirable than two separate ones. Another important consideration involves the number of planes of frame buffer memory fabricated in a frame buffer memory assembly. The available number of planes of frame buffer memory will be a multiple of that number, which in the preferred embodiment is eight. The preferred embodiment to be described adopts a Z buffer mapping into the excess portions of the frame buffer that spreads the sixteen bits of each Z value out across eight planes of frame buffer memory. This mapping must be flexible and programmatically determinable, since the total number of planes of frame buffer memory can vary (in increments of eight) according to the way the user configures the graphics system (recall the discussion of strip Z buffering).

To cache Z values, the one or more groups of eight planes of frame buffer memory are allocated to the Z buffer. Entire planes can be allocated, or just the "excess" not used as RGB buffer. A minimum of one group of eight must be allocated, implying that a minimum system configuration must include eight planes of frame buffer memory. (This is certainly no impractical requirement for a color system; a typical system would have twenty-four planes of frame buffer memory, although less is possible.) A group of eight planes of frame buffer memory used for the Z buffer can be either eight "excess" portions not used as RGB buffer, or eight full planes used solely for the Z buffer.

Each sixteen-bit plane in a Z buffer cache in a group of eight receives two bits at a time from a Z value. In this way the entire sixteen-bit Z value is cached in eight two-bit portions of Z buffer cache memory. When there is a miss each plane of the Z cache is written out to an associated Z WRITE register, from whence it is written to the Z buffer. The Z WRITE registers may have to contend with the SOURCE registers for access to the frame buffer (the Z cache fills at a rate twice that of the RGB cache, so sometimes there will be contention, other times not). Thus, the transfer from the Z cache to the Z WRITE registers frees the Z cache to begin accepting new Z values immediately.

The display list will previously have been divided into portions that correspond to the one or more groups of eight planes of frame buffer memory. The display list portions are required to remain within the boundaries of their associated strips. As the portions of the divided (and perhaps even regrouped) display list are traversed, Z values are written into the Z buffer. The order of these write operations is display list dependent; some Z buffer locations may never be written to, while others may be written into more than once as hidden surface removal proceeds. Eventually, the traversal of the display list portion is complete. If there is another strip to construct, the mapping of the one or more groups of eight is changed to reflect the next strip and the next portion of the display list is traversed; otherwise the entire display has been constructed and the strip Z buffering process has been concluded.

Another aspect of the invention concerns a programmatically variable mapping between the pixel interpolator and the planes of frame buffer memory. It is desirable in a system with three color interpolators but with only a minimum number of planes in the frame buffer to be able to select between one interpolator computing shades of gray and three interpolators independently computing red, green and blue values. In addition, to facilitate double buffering it is desirable to control the mapping of pixel data bits into the frame buffer. Such a controlled mapping can be obtained through the use of a pipelined data shifter controlled by a register partitioned into values encoding the number of shifts to be performed at each level of the pipeline. In a related aspect of the invention the pipelined shifter allows the programmatic selection of the number color intensity bits for each color that will be stored in the frame buffer.

Still another aspect of the invention concerns the way the color map is updated. A color map is used to create an arbitrary (or nearly so) correspondence between the R, G and B values stored in the frame buffer and the digital values actually sent to the R, G and B DAC's. This allows, for example, a four-plane R value to be mapped into any sixteen of the $2^8$ values the DAC can accept. The total number of red values has not increased, but they have been dispersed over the range of color resolution available. This would be desirable in systems that either didn't have very much frame buffer memory in the first place, or where not very many different red colors were wanted, and frame buffer memory was de-allocated from R value duty and used to advantage somewhere else.

From time to time the graphics system changes the color map. In conventional systems this is accomplished without any special concern for when it is done. This can cause display artifacts in two ways. First, the read activities of most RAM's are disturbed during write operations. This causes loss of the mapping action during the update, temporarily resulting in arbitrary colors in random locations. Second, some rather peculiar (albeit transient) colorizations can result if the color map is changed within the duration of a raster presentation; part of the screen would be mapped one way while part of the screen would be mapped another way. This is almost sure to be the case because of the difficulty in synchronizing the activities of the graphics system's CPU with raster generation by the monitor. In the preferred embodiment the color map and the overlay map are periodically updated from a shadow RAM during vertical retrace, whether or not the shadow RAM has been changed. The graphics system updates the shadow RAM in place of the conventional updates to the color and overlay map RAM's, which are then subsequently updated from the shadow RAM during vertical retrace.

In a further aspect of the invention the shadow RAM comprises first and second portions, each of which is large enough to update both the color map and the overlay RAM. After a certain number of frames of raster generation, (say, eight) the color map and overlay map are updated from the first portion. After eight more frames they are automatically updated from the second portion. After another eight they are again updated automatically from the first portion, and so on. Now suppose that the first and second portions contain certain symmetrically different information. A cursor in an overlay plane could be made to blink between any two colors by the change to the overlay RAM. Or, some object in the RGB planes could be made to blink by having alternating colors assigned to it by the first and second portions of the color map. If the first and second portions of the shadow RAM are made identical then no blinking is induced by the overlay or color maps.

BRIEF DESCRIPTION OF THE DRAWINGS

FIGS. 2A–C are a simplified block diagram of a portion of the computer graphics system of FIG. 1.

FIGS. 5A–B illustrate the correspondence between pixel locations on the monitor according to pixel addresses and their location in the frame buffer memory in accordance with the memory organization of FIG. 4.

FIGS. 10A–F are an abbreviated schematic diagram of an address manipulator used in implementing the frame buffer memory organization of FIGS. 6–9.

FIG. 12 is a simplified block diagram of the RGB cache of FIG. 2B.

DESCRIPTION OF A PREFERRED EMBODIMENT

Introduction

Figure 1:
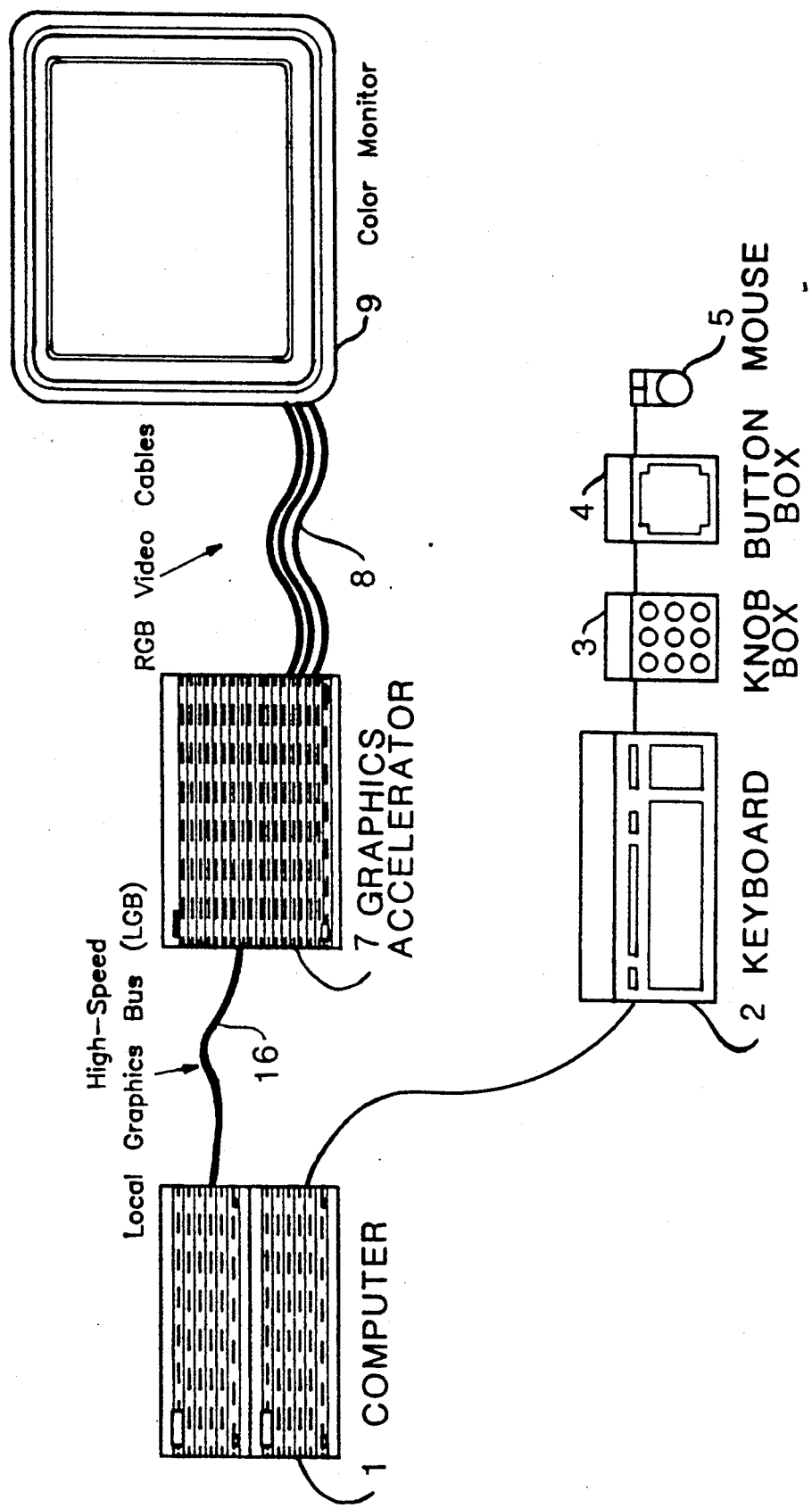
FIG. 1 is a simplified pictorial representation of a computer graphics system incorporating the principles of the invention.

Refer now to FIG. 1, wherein is shown a pictorial representation of an actual graphics system embodying various aspects of the invention. In particular, the graphics system includes a computer 1 (which may be a Hewlett-Packard Model 9000 Series 320 Computer), a keyboard 2, knob box 3, button box 4, mouse 5, graphics accelerator 7 (which may be a Hewlett-Packard Model 98720A) and a color monitor 9. The computer 1 executes the software of the graphics system. That software includes the user interface and the preparation of the display list, which might be based either upon a B-spline description of the surface to be displayed or upon a wire frame model. The computer 1 is coupled to the graphics accelerator 7 through a high speed local graphics bus 16. The graphics accelerator 7 is in turn coupled to the color monitor 9 through three coaxial cables for carrying the Red, Green and Blue (RGB) video signals.

To render an image that has been described to the graphics system, the graphics software traverses the display list and sends values representing surface patches in a parameter space and/or vector endpoints to the graphics accelerator 7. In the case of a B-spline description the transmitted values are processed by microcode in the graphics accelerator 7 to obtain the (X, Y, Z) locations and colors for the vertices of polygons that approximate each patch. It is then the job of a pixel interpolator within the graphics accelerator to calculate and write into the frame buffer all of the pixel values describing the entire polygon surface, including multi-axis interpolation of the colors for shading during the fill operation, and including Z axis interpolation and hidden surface removal. In the case of a wire frame model the tasks are similar, except that (1) the parameter space description is absent in favor of vector end points in (X, Y, Z) space, and (2) instead of generating filled polygons the graphics accelerator creates a continuous and color-interpolated vector. In either case, as the calculated pixel values are written into the frame buffer they become visible upon the monitor 9.

The frame buffer that is divisible into RGB and Z buffer portions, the RGB pixel and Z buffer caches, circuitry for implementing the different tile sizes, the Z mapping circuitry, and the shadow RAM, are all located in the graphics accelerator 7. The graphics accelerator 7 is, of course, the item with which we shall be principally concerned throughout the remainder of this Specification.

Figure 2A:
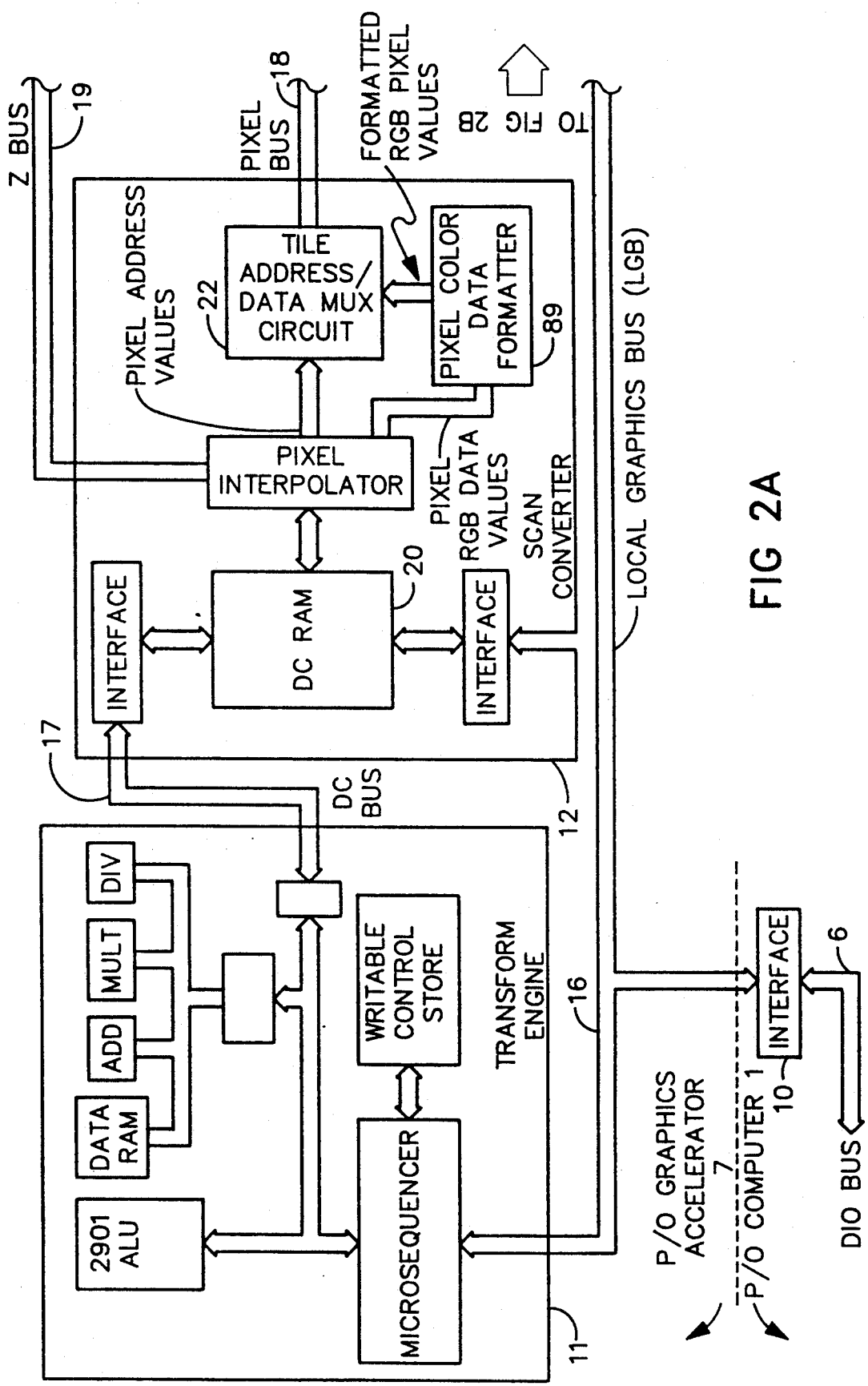
Figure 2C:
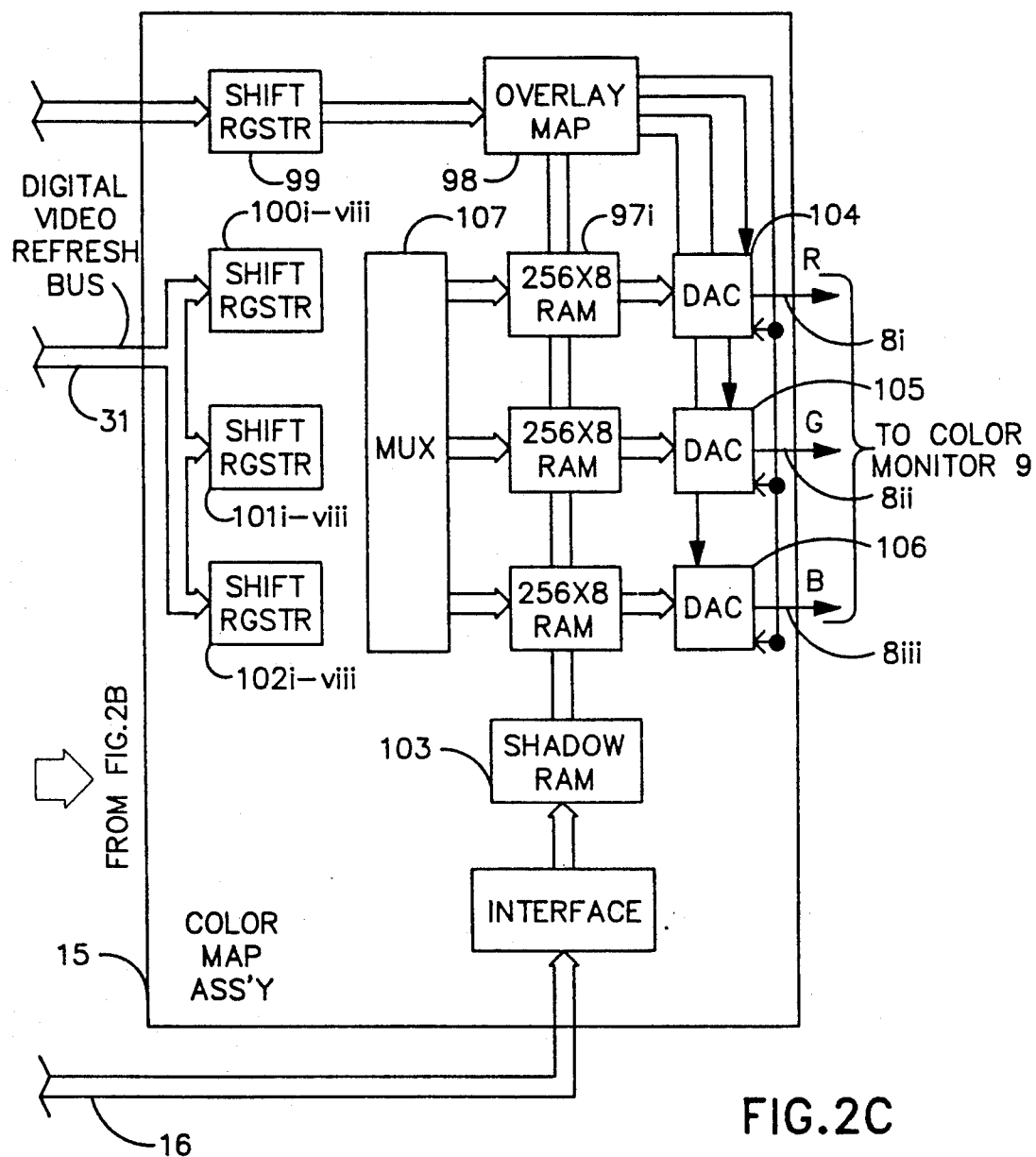

FIGS. 2A-C show a simplified block diagram of the graphics accelerator 7. A Data Input Output Bus (DIO Bus) 6 within the computer 1 is coupled to an interface 10, from whence it emerges as a Local Graphic Bus 16 (LGB). The LGB is a communication path for data and instructions between the computer 1 and the graphics accelerator 7, and between the various mechanisms within the graphics accelerator 7. Among the mechanisms within the graphics accelerator 7 are a transform engine 11, a scan converter 12, a frame buffer controller 13, one or more frame buffer assemblies 14i-iv, and a color map assembly 15. The output of the color map assembly 15 is the three RGB video signals 8 that drive the color monitor 9.

The purpose of the transform engine 11 is to receive sections of the display list as it is traversed by the graphics software executing in the computer 1 and convert those into sequences of device coordinates. Basically, these are pixel values (X, Y, Z, R, G, B) for either vector endpoints or polygon vertices. These device coordinates are output upon a device coordinate bus 17 that is coupled to the scan converter 12.

The purpose of the scan converter 12 is to calculate by interpolation additional pixel values for pixels between vector endpoints or along the edges and within polygons. To this end the device coordinates are buffered in a Device Coordinate (DC) RAM 20, from which they are available to a high-speed pixel interpolator 21. The resulting sequence of Z values is separated and output on a Z bus 19. The RGB color values are compressed and formatted by a color data formatter circuit 89, whereupon they pass via a tile address/data MUX circuit 22 onto a pixel bus 18 that carries in multiplexed form both pixel data values and pixel address values.

The pixel color data formatter 89 allows the programmatic steering of a selected number of red pixel value bits, a selected number of green pixel value bits, and a selected number of blue pixel value bits into corresponding planes of the frame buffer memory. This programmability is combined with the necessary conversion of the high precision pixel color values down to the precision that will actually be used in controlling the electron guns in the CRT.

The tile address/data MUX circuit 22 is programmable to recognize different tile sizes and shapes. By its multiplexing action it reduces the number of lines needed in the pixel bus 18, without significantly increasing the number of bus cycles. It also helps the frame buffer controller (discussed below) in the tasks of implementing the variable tile sizes and shapes that can be used in accessing the frame buffer memory, and in managing the operation of the pixel cache.

The pixel bus 18 is coupled to the frame buffer controller 13, where it is first de-multiplexed back into separate busses. One of those is the FBDAT bus 24, which is essentially the pixel data values augmented by the partial pixel address in tile bus 96 and the signal NEW PIXEL 87. The information on the FBDAT bus is valid whenever NEW PIXEL is exerted. The FBDAT bus 24 is used in accessing the RGB cache memories 26i-viii. The other bus is essentially the full pixel address and the signal NEW TILE. That bus contains valid information whenever NEW TILE is exerted. These full pixel address values for new tiles are coupled to an address manipulator 32 within the frame buffer controller 13.

The frame buffer controller 13 has several functions, of which the one most of interest at this point is implementing the programmability of tile sizes. To do this the address manipulator 32 cooperates with a master state machine 29 to generate different modes of addressing for frame buffer memory accesses. The different modes correspond to sixteen by one tiles, four by four tiles, mapped Z buffer access and video refresh. In cooperation with the different modes of addressing and with the notion of pixel caching for RGB and Z values, the frame buffer controller 13 generates addresses on a frame buffer address bus 23 (FBADD) and frame buffer data on a frame buffer data bus 24 (FBDAT). These are coupled to one or more eight-plane frame buffer assemblies 14i-iv.

For each installed frame buffer assembly 14i-iv FBADD 23 is applied to each of eight planes of $2048 \times 1024 \times 1$ RAM 25i-viii. There are the actual planes of frame buffer memory that are divisible into RGB and Z buffer portions. Those portions of the frame buffer RAM planes 25i-viii receive their data from the separate pixel caches for RGB values and Z values; i.e., from eight planes of RGB cache 26i-viii for the RGB buffer portion and from eight planes of the Z cache 27i-viii for the Z buffer portion. The eight planes of the RGB cache 26i-viii receive their data from the FBDAT bus 24, while the eight planes of the Z cache 27i-viii receive theirs from the Z bus 19, which also supplies two bits of the new Z value to a Z compare circuit 28. The current contents of the Z cache is also made available to the Z compare circuit 28. The Z compare circuit for each eight planes of frame buffer generates a ZPASS signal. The collection of ZPASS signals informs master state machine 29, which can then easily determine if the new Z value is to replace the old one.

The video refresh ports of the RAM's in each plane of frame buffer memory 25i-viii are coupled to an associated one of eight output shifters 30i-viii whose outputs form a digital refresh bus 31. The digital refresh bus 31 is in turn coupled to the color map assembly 15. There color map RAM's 97i-iii and an overlay map RAM 98 are applied to the RGB values of the frame buffer 14i-iv, as determined by the contents of a shadow RAM 103. The resulting values are converted by DAC's 104–106 into the video RGB signals 8 sent to the color monitor 9.

We turn now to detailed examinations of selected topics introduced in the Background and Summary and that were described in general in connection with FIGS. 2A–C. The mechanism needed for programmable tile size are discussed first, followed by a description of how programmable tile size is implemented with a pixel cache memory. Next, the operation of the strip Z buffering mechanisms are described. After that, the operation of the shadow RAM for the color map is explained.

There is a certain relationship between tile size and caching. To begin with, the existence of tiles could be implemented without caching. One could, for example, simply compute in parallel all the bits for all the values of several pixels. These would then be stored in a frame buffer whose addressing structure was based on recurrent memory accesses in units those same several pixel groups, and that had a wide data path to match. If the size or shape of the tile changes, however, the frame buffer memory addressing organization must change also. Indeed, how to do that programmatically is an important problem that must be solved if tile size is to be dynamically varied.

Caching, on the other hand, of necessity implies some sort of tiling. The cache is, after all, some subset of the entire frame buffer, and can be said to hold a tile comprised of that subset. (That would still be true even if one didn't recognize or use the notion of tiles anywhere else in the system.) Clearly, if caching is implemented in a system that does use tiles for their own sake, then the cache ought to hold a tile. In a more complicated system the cache might hold several tiles. And if the size or shape of the tiles can be varied, then the cache needs to operate efficiently with each possible tile configuration. It is because of this effect of tiling upon caching, and because caching implies a tile (whether used to advantage or not), that the programmable tile size mechanisms are discussed first, followed by their effect upon caching.

Programmable Tile Size and Shape

In the preferred embodiment under examination two tile sizes are implemented for RGB pixel values. The Z values of pixels are also cached, implying a tile size for them, too. It turns out that the Z tile size is the same shape as one of the other two, although a different protocol is used in giving meaning to the bits. (The bits in a Z tile are paired, so that they represent eight two-bit pieces of eight different Z values, rather than sixteen one-bit pieces of sixteen different Z values. By and large, this protocol is invisible to the mechanism for accessing the frame buffer with tiles, since it needs only to access a tile of a certain shape without concern for what the bits therein actually mean.) In the present embodiment all tiles have the same number of pixels, although systems that support tiles with differing numbers of pixels are possible. As the explanation proceeds it will become clear that the RGB cache and the Z cache are each essentially a tile repository with as many planes as the frame buffer assembly 14i-iv. Each plane of each cache needs to contain enough bits to accommodate an integral number of one or more tiles.

Figure 3:
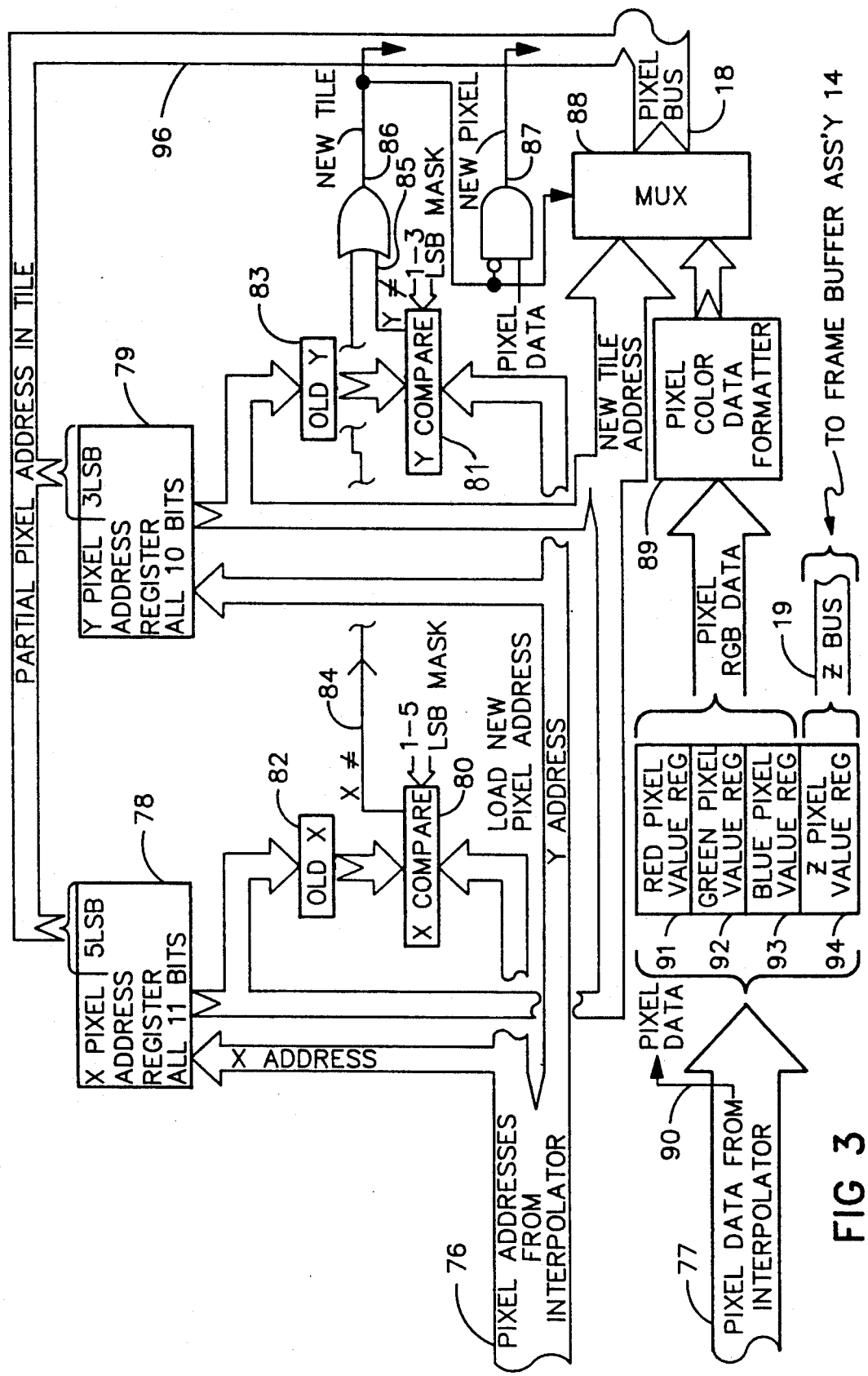
FIG. 3 is a simplified block diagram of a tile address/data MUX circuit of FIG. 2A.

To begin the discussion, refer to FIG. 3. This figure is an expansion of the tile address/data MUX circuit 22 of FIG. 2A. The pixel interpolator 21 produces both X and Y pixel address information 76 and RGBZ data values 77. To do this it uses six separate interpolation circuits. Considering that the pixel interpolator 21 is made up of one integrated circuit, and that its output must be brought outside the chip, anything that reduces the number of pins needed to connect it to the frame buffer controller 13 of FIG. 2B is welcome. One purpose of the tile address/data MUX circuit 22 is to do just that, by taking advantage of the principle of locality to reduce the number of address lines needed while still supplying both RGBZ values and local address values in parallel. One could, of course, multiplex in time the full pixel address and their RGBZ values; that would also save lines. However, it would also double the number of cycles on the interconnecting bus. Instead, notice is taken of which type of tile size and shape is in use, and even more particularly, which exact tile contains the (X, Y) pixel addresses being generated by the pixel interpolator 21. At the start of a new tile a control line NEW TILE 86 is made true and the entire (X, Y) pixel address is transmitted over the pixel bus 18. Then NEW TILE 86 is made false and NEW PIXEL 87 is made true. At this time the RGBZ values for the address just sent are placed onto the pixel bus 18. Now, let another set of RGBZ pixel values emerge from the pixel interpolator, and assume that they are still within the same tile as the previous pixel. The only address information that needs to be sent over the pixel bus 18 is enough least significant bits of the (X, Y) pixel address to distinguish (within this tile) the new pixel from the previous one. That is, if two pixels are in the same tile, then the majority of their most significant bits of (X, Y) pixel address will remain the same. What is done, then, is to put the necessary X and Y LSB's (as determined by tile size and shape) onto dedicated address lines (the partial pixel address in tile bus 96), merge that data into a parallel presentation with the associated RGBZ values, and cycle NEW PIXEL. The condensed mode of presentation continues until a next pixel falls outside the current tile, whereupon a new complete pixel address is transmitted.

Tile size and shape is, of course, variable. The tile address/data MUX circuit 22 can be programmed to operate over a wide range of tile sizes and shapes, and by its NEW TILE signal 86 assists the address manipulator 32 and the pixel cache mechanisms in performing tile-by-tile operations. In the actual preferred embodiment the X dimension of the tile can be zero to five of the least significant bits of the X pixel address, while the Y dimension can be zero to three least significant bits of the Y pixel address.

Here is a detailed description of the operation of the tile address/data MUX 22. The pixel address 76 and pixel data 77 are captured in respective register collections. The individual RGB values are captured in associated registers 91–93, respectively. The pixel address is separated into its X and Y component signals and captured in registers 78 and 79, respectively. Those X and Y addresses are subsequently transferred to registers 82 and 83, respectively. A comparator 80 compares the contents of the two registers 78 and 82. A similar comparator 81 compares the contents of registers 79 and 83. Each of comparators 80 and 81 can be programmed to ignore a selectable number of least significant bits. The X comparator 80 can be told to to mask zero to five least significant bits, while the Y comparator can be told to mask zero to three least significant bits. Each comparator produces a signal indicative of an inequality between the things being compared. These are the X unequal signal 84 and the Y unequal signal 85. These are OR'ed together to produce the signal NEW TILE 86. (A controlling state machine that is not shown arranges these things. It responds to the power-on indications, and automatically issues the NEW TILE signal 86 since there are no old X and Y values to compare with subsequent ones.)

An instance of the signal NEW TILE 86 is inverted and AND'ed with a signal PIXEL DATA that means that valid RGBZ values are on bus 77. The result of the AND operation is a signal NEW PIXEL 87. Signals NEW TILE 86 and NEW PIXEL 87 are incorporated into the partial pixel address bus 96, where they join the output of MUX 88 to form the pixel bus 18.

The complete tile address and the formatted RGB values are coupled to a MUX 88 whose normal state is to convey RGB values to the pixel bus 18 when NEW PIXEL 87 is true. When NEW TILE is true the MUX 88 conveys the complete new tile address.

The Z value stored in register 94 is the origin of the Z bus 19 that is sent to the frame buffer assembly 14.

We now continue our discussion of programmable tile size with an examination of how the RAM's of the frame buffer memory are organized. With that understanding we shall pursue some examples of how various tiles are stored and retrieved from the frame buffer. That will prompt an appreciation of what functions the address manipulator 32 must perform. Next, we will examine the examine the internal nature of the address manipulator 32. Finally, we shall examine what effect the frame buffer memory organization for programmable tile size has on video refresh of the monitor 9, and how that effect is handled by the output shifters 30i–viii.

Figure 4:
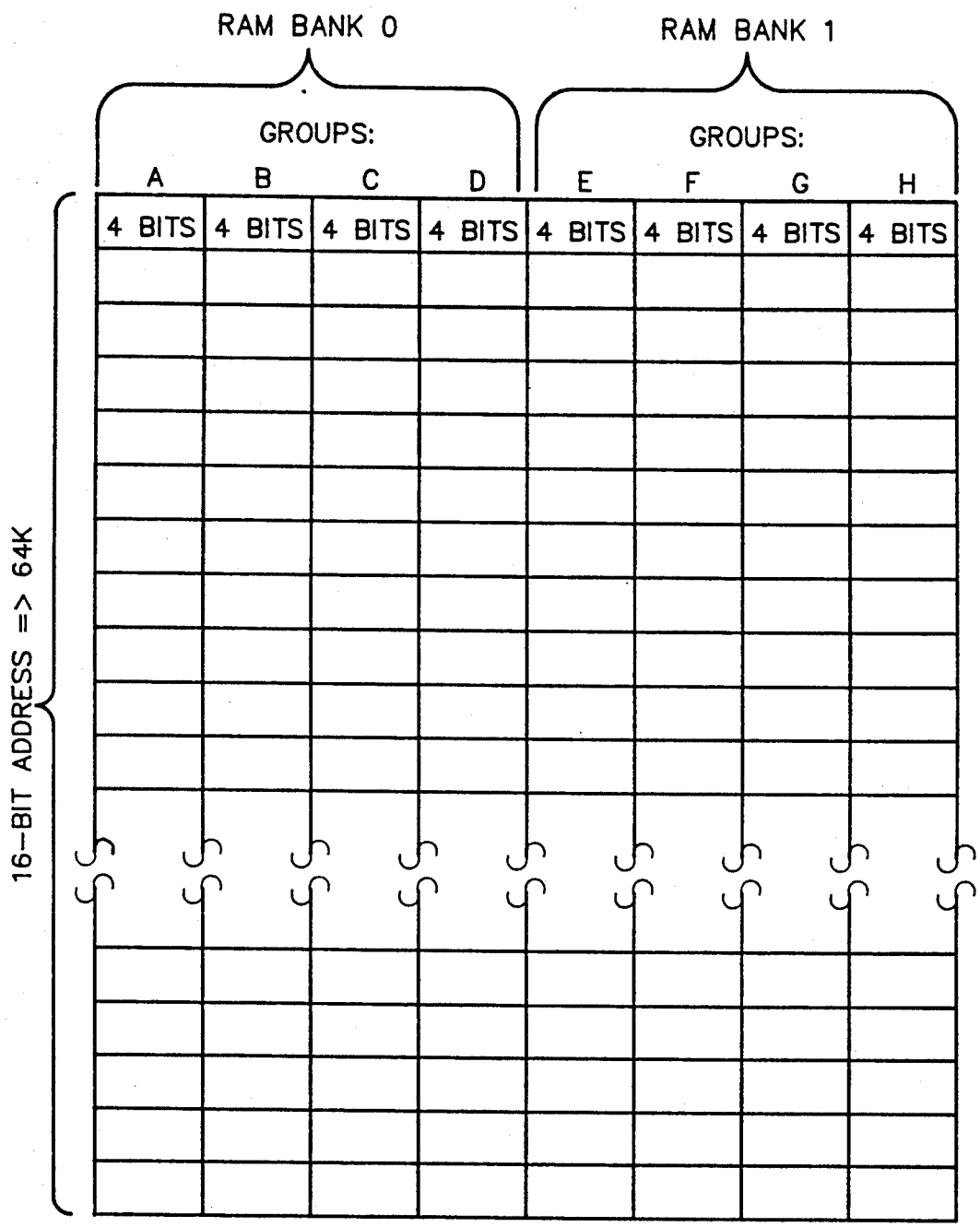
FIG. 4 is a representation of a frame buffer memory organization used in implementing programmable tile sizes.

Refer now to FIG. 4, wherein is shown the organization of one plane of the frame buffer memory 25. As shown in FIG. 4, each plane of frame buffer memory is organized into eight four-bit groups A-H. Each group A-H is 64K addresses deep. This particular organization arises from using RAM's that are 64K by four bits; the frame buffer 25 could also be organized as thirty-two groups of 64K by one-bit RAM's. The practical difference between the two organizations is this. With 64K×4 RAM's a tile can be allowed to start on any four-bit boundary (i.e., with any group). With 64K×1 RAM's a tile could start on any bit, although the address manipulator 32 becomes more extensive. (It doesn't get more complicated in principle, it just has four times more of the same stuff that it had before.)

The groups A-D are shown as collected into RAM bank 0, while groups E-H are collected into another RAM bank 1. This business of RAM banks will turn out to be of interest given the particular way the preferred embodiment actually got built. It has to do with a cost benefit analysis of the cache mechanism suggesting that a sixteen-bit cache was, (at that time, anyway) more economical than one of thirty-two. The design of the programmable tile size mechanism accommodates tiles up to thirty-two bits, and was easily made compatible with sixteen-bit tiles (and with certain other cost effective simplifications) by the addition of the bank mechanism. The most general case would dispense with the notion of RAM banks. We shall endeavor to explain it both ways, else some rather rude adjustments will be needed before beginning the discussion of the cache system.

Finally, we shall discuss one other contingent feature of the organization of the frame buffer memory 25. The RAM's used are low cost dynamic video RAM's. The addressing of these RAM's involves sending multiplexed row and column addresses. Each is eight bits, is applied to the same addressing lines, and is distinguished by an associated strobe. In particular, the RAM's may be uPD 41264 VRAM's from NEC. The invention does not require the use of such dynamic RAM's, but their use does have a certain impact on how the invention is implemented.

Throughout the remainder of this disclosure, and in the drawings, the terms "row," "col" and "row/col" refer to an addressing convention used by the video RAM's. Those terms are not to be confused with any organization of the pixels in the display into ordinary rows and ordinary columns. Indeed, we shall never speak of row or columns when referring to the spatial location of a pixel; we shall use the term pixel address instead. There is a relationship between the two sets of terms, but it is sometimes difficult to see, and will be the subject of considerable explanation in the pages that follow.

To summarize then, FIG. 4 shows a memory organization that allows a word of thirty-two bits to be read from a memory 64K words deep. The tile of interest could be that entire thirty-two bits, or some subset thereof. It will be noted that, because the memory is organized into groups A-H, each group can be separately addressed (i.e., receive its own row and column address). This is very important, as it allows us to devise a further refinement of what is shown in FIG. 4 to allow both sixteen by one (or thirty-two by one) and four by four (or eight by four and four by eight) pixel tiles wherein: (a) the entire tile can be read from memory in one memory cycle; which requires that (b) none of the groups A-H contains more than one four-bit portion of any one tile; and wherein (c) different shape tiles can be intermixed at will. As to (c), keep in mind that the notion of tiles imposes an organization for locating pixels in the separate RAM's of a frame buffer; pixels have no way of knowing what type of tile they happen to belong to at the moment. A given pixel might be initially stored as part of a tile of one shape and later retrieved as part of another tile of a different shape. The pixels themselves are still bit-mapped onto the monitor, although as we shall see in the next figure, that mapping is far from conventional.

Figure 5B:
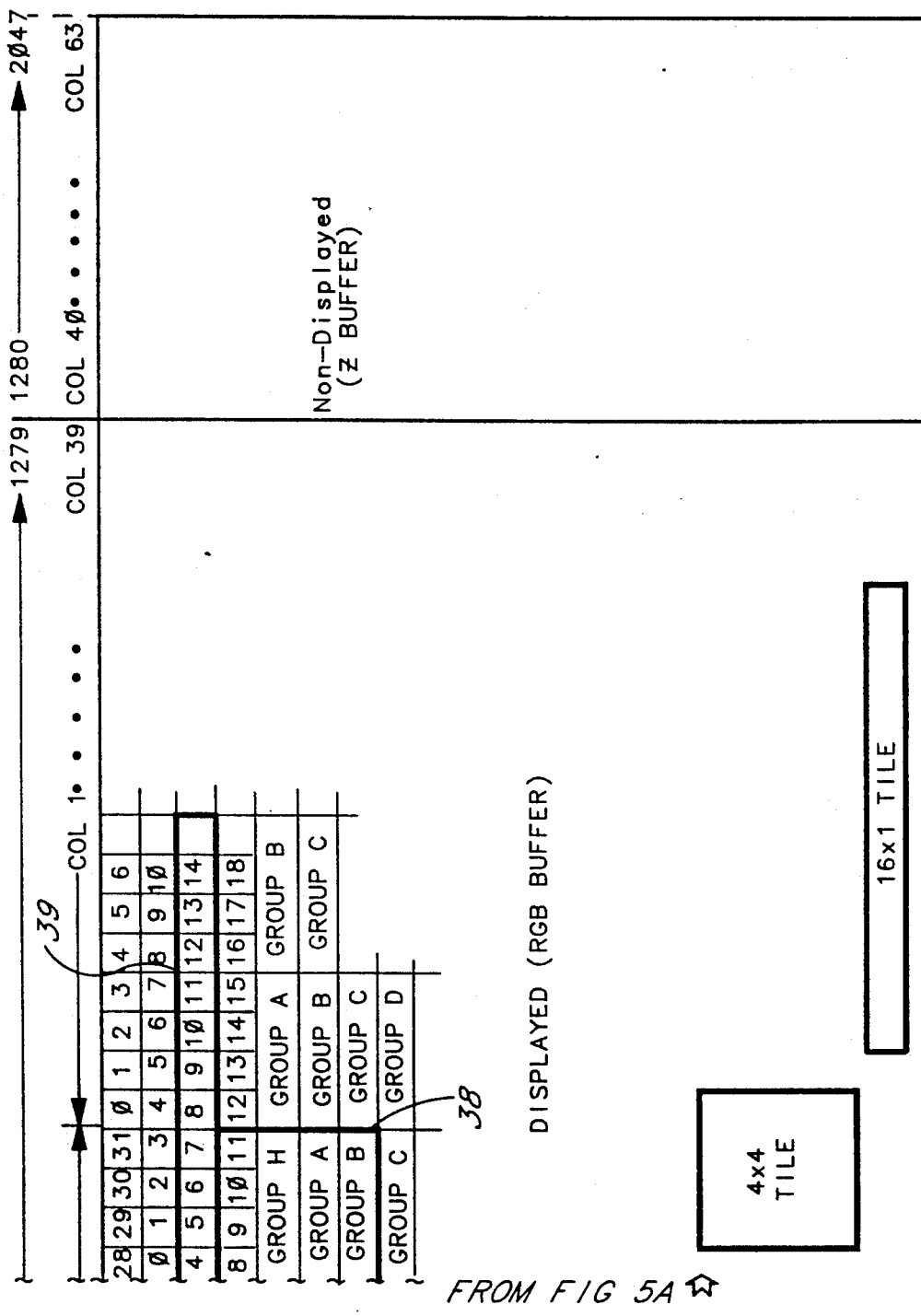

Refer now to FIGS. 5A-B. These figures show the correspondence between the (X, Y) pixel address locations on the monitor and frame buffer memory addresses. Across the top (increasing from left to right) are the 2048 different X pixel addresses. These are the horizontal dimension of the monitor 9, although only the left-most 1280 of these are visible; X pixel addresses 1280 through 2047 are in the nondisplayed portion of the frame buffer. That region is typically used as the Z buffer, although images can be drawn into that area also; such images are not themselves displayed but, once drawn there, can be rather quickly copied into the displayed region. The X pixel address is an eleven-bit binary integer.

Pixel locations are identified vertically by the Y pixel address, which is a ten-bit binary integer. Those addresses represent the 1024 scan lines that make up the raster for the color monitor 9. The direction of increasing addresses is from top to bottom. Thus, the pixel address (0, 0) represents the upper left-hand corner of the display.

Also across the top of FIGS. 5A-B are indications of column addresses for the frame buffer memory organization of FIG. 4. Beginning in the upper left-hand corner are col's 0, 1, 2, ..., and so on, until the end of col. 63 at the upper right-hand corner. These columns are associated with the eight-bit column address for the dynamic video RAM's in the frame buffer memory 25. Since eight bits address 256 things, there are more columns than just 0 through 63, and these are found in the next three scan lines: col's 64-127, 128-191, and 192-255. The top four scan lines of pixel addresses comprise 256 column addresses for row address zero of the dynamic RAM's in the frame buffer 25. The next four lines down (i.e., those whose Y addresses are 4-7) are the same repeated sequence of column addresses, but with a row address of one, and so on, until the sequence of column addresses has been used with a row address of 255. This describes a rather straight-forward correspondence between the pixel address and the row/col address for a 32-bit word of memory located in eight 64K by four-bit RAM's.

Before turning to the more complex issue of which groups of RAM's respond to the various pixel addresses, consider the various example tiles illustrated by the heavy dark lines. The squares are 4×4 tiles, while the rectangles are 16×1 tiles. Consider the X pixel address upon which tiles may start (assuming they "start" at the left and "go" to the right). In a system such as the preferred embodiment where the RAM's have four bits at each address ($2^nK \times 4$ RAM's) a tile can start on every fourth X pixel address, beginning at zero. If $2^nK \times 1$ RAM's were used then a tile could start on any X pixel addresses.

Now consider the Y pixel address upon which tiles may start (assuming they "start" at the top and "go" toward the bottom). A sixteen by one tile can start upon any Y pixel address. Conceptually, a four by four tile could do so as well. However, for the preferred embodiment that actually was constructed it was decided that four by four tiles should begin on only every fourth scan line, beginning with the top one. Thus, tiles 34 and 37 are possible in the actual preferred embodiment, while tiles 36 and 38 are quite possible in another system having a more extensive address manipulator.

Recall that the RAM's of FIG. 4 were arranged into eight groups, A-H. Within each group are four data lines: group A has lines 0-3, group B has lines 4-7, group C has lines 8-11, etc. These data line identifiers appear in the small square boxes in FIGS. 5A-B. In another part of those figures the same information is shown by omitting the data line identifiers and substituting therefor rectangles bearing the associated group identifier. Thus, beginning at the upper left-hand corner of the display and going to the right along the top scan line would correspond to groups A, B, C, ..., G, H, A, B, ..., and so on. Beginning at the same place, but now proceeding straight down, the order of the groups along the left edge of the display is A, B, C, D, A, B, ..., and so on. Instead of repetition on A-D it could also have been repetitions of the entire pattern A-H, A-H, etc. Again, it is principally a question of complexity in the address manipulator 32 versus the benefit obtained.

Now consider the sixteen by one tile 33. It is located in row 0, col 64. The sixteen-bit address of row=0-/col=64 will, if applied to groups C-F, access exactly the tile 33. Note that it is not the case that the same row/col address must always be applied to each group. Consider tiles 37 and 39. In tile 37 each of groups F, G, H, and A receive row addresses of 1, but col addresses of 0, 64, 128, and 192, respectively. In tile 39 groups A and B are in row 0, col 128, while groups C and D are in row 0, col 129. (Just a reminder: don't forget that what we are examining here has to happen for each plane of the frame buffer memory that contributes to the values of the pixels in the tile. Our discussion here, if taken in isolation, might lead one to believe that a sixteen by one tile is an arrangement of pixels one bit deep. Not so. The tiles are as deep as the pixel values, and come in exactly as many bits of depth.)

We have been considering sixteen-bit tiles. At this point it is clear that tiles up to 32-bits can be accessed in a single memory cycle provided only that: (a) the tile starts on a group boundary; (b), there is a way to compute the row/col address for each group contributing to the tile; and, (c) no group contributes more than once. Thus, a tile four pixels across and eight pixels down would require the alternate A, B, C, ..., H, A, ..., vertical repetition mentioned above. Tiles eight pixels wide by four pixels down would not. The requirements (a)-(c) above even permit, in principle, certain non-rectangular tiles, such as tile 40.

It will be noted that we have not introduced the notion of a tile address. That could, of course, be done. But given the different sizes and shapes of tiles that are useful, and the ability to begin a tile in incremental units smaller than the size of the tile itself (i.e., by every four pixels instead of by an entire tile of sixteen pixels), it seems more productive to simply continue addressing the frame buffer with (X, Y) pixel addresses, and access tiles of the selected shape that contain the addressed pixel. This raises another issue: for a given size of tile (to be specified in advance), exactly which tile will correspond to a particular pixel address? For four-bit RAM's and sixteen by one tiles there are, in general, four different tiles that could legally be associated with any addressed pixel. Assuming (as with the actual preferred embodiment) that four by four tiles cannot cross rows, then a pixel address does specify a unique tile. If four by four pixel tiles could cross rows, then each pixel would again be legally associated with four different tiles, or if the more general vertical group repetition of A, B, C, D, E, F, ... were used, with eight different tiles. What to do?

Rather than resort to a separate address space for tile addressing and burden the software and display list processing mechanisms with another layer of overhead, it was recognized that there is often a predominant order of events in display list processing. That order may change as different graphics operations are undertaken. What is desirable is the ability to specify what rule of correspondence is used to select a tile as a function of pixel address. Call the selected tile a "justified" tile. For block moves and for left-to-right and top-to-bottom pixel processing it is a good choice of justified tiles if the hardware fetches a tile where the addressed pixel is in the left-most group, top-most group, or upper left-hand group of the tile. Realizing that tiles are to be cached, this scheme will also serve to maximize hits into the cache.

The rule set out above is a good one, and is used in the actual preferred embodiment for block moves of all tiles and for writing RGB values to 4×4 tiles. But there is another less complicated rule for selecting the justified 16×1 tile to be associated with a particular pixel address. This other rule is nearly as efficient for hits in the cache, and is very easy to implement. The rule is simply to select as the justified 16×1 tile the bank of four groups containing the addressed pixel. This simplified rule was used in the actual preferred embodiment for writing RGB values to 16×1 tiles.

To summarize, then, what is wanted is a mechanism that can be told in advance what size and shape tile to use, what rule to use for the selection of a justified tile, and that will convert a pixel address to a collection of row and col addresses for the proper groups describing the justified tile. Such a mechanism uses sixteen bits of addressing out of the twenty-one supplied. That is, row and col are each eight bits, while the X and Y pixel addresses are eleven and ten bits, respectively. The remaining five bits of the original pixel address will ultimately be used to access the individual pixels in the thirty-two bits identified by the row and col address; i.e., address a bit in the tile once it has been accessed and fetched into the cache.

To anticipate somewhat the explanation of the address manipulator 32 (whose job it is to do all of this), an initial row/col address is found for the pixel address given. Then according to the tile shape in use, three other row/col addresses are computed by incrementing the initial row/col address in different ways. If four-bit RAMs were used to implement 32-bit tiles then seven succeeding addresses would be computed. This is done in parallel by very high-speed adders and logic circuitry, so that the memory cycles for each group in the tile may proceed in unison.

Figure 6:
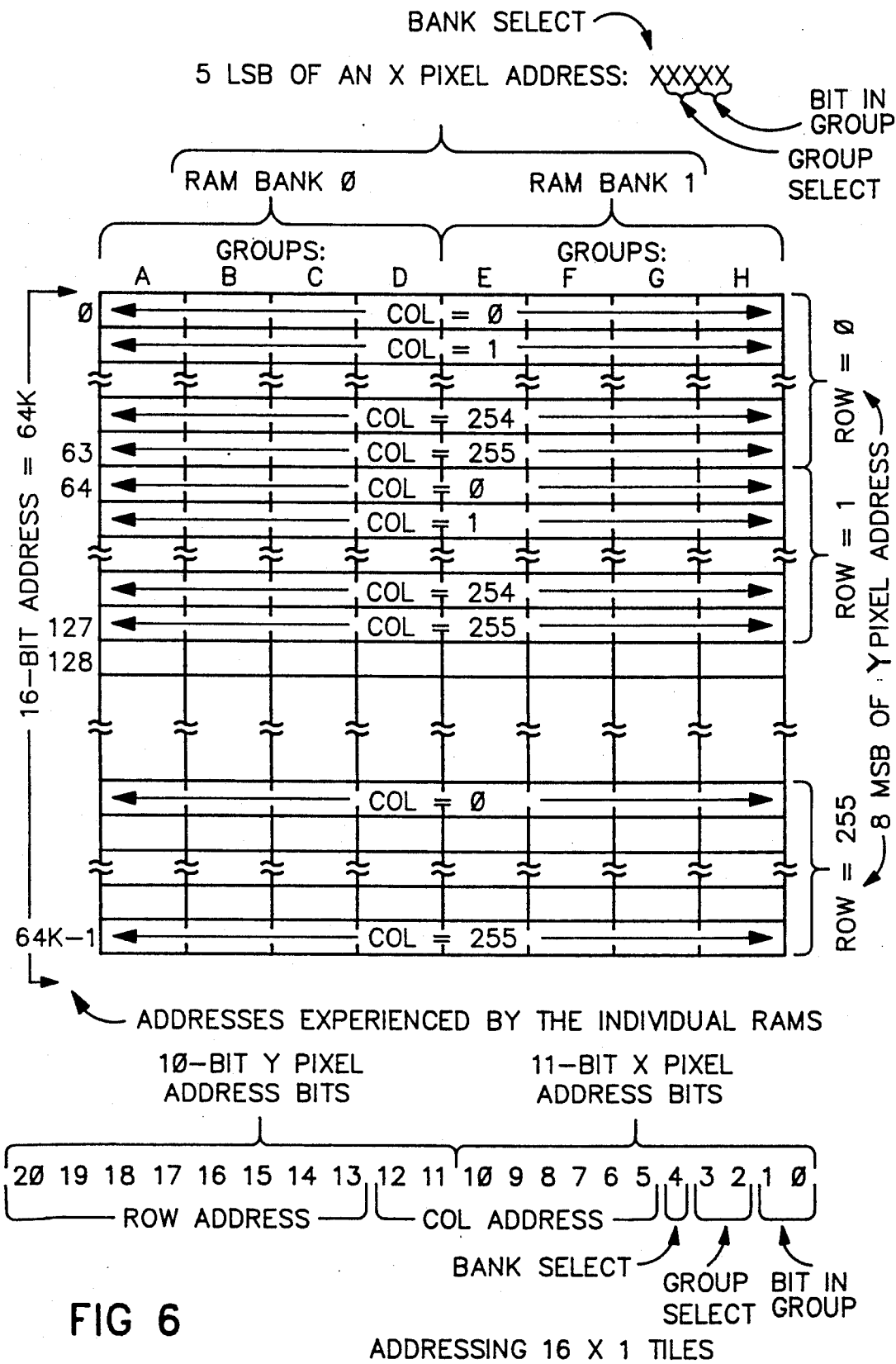
FIG. 6 is a diagram illustrating how the organization of the frame buffer memory accommodates 16×1 tiles.

Refer now to FIG. 6, wherein the rules for converting a pixel address to an initial row/col address and the succeeding incremented addresses is illustrated for sixteen by one tiles. These rules are specific to the actual preferred embodiment, in that they mention a bank select bit; a more general system might dispense with bank select. The two group select bits and the two bit-in-group bits are there to suggest what use may be made of them once the tile is in the cache. For now, remember that what is desired is the particular justified tile associated with the supplied pixel address. Suppose, for example, that tile 33 of FIG. 5A-B were to be accessed. It starts with group C. That is in bank 0, so the bank select bit is set accordingly. To access the entire tile the group will be incremented from C to D, from D to E, and from E to F. The increment from D to E changes the bank select bit for the remaining groups, so that groups E and F come out as E and F rather than as A and B. Another way to think of this is that: (1) address bits 2, 3 and 4 are simply a three-bit field that addresses one of eight groups (A-H); (2) whose initial value is captured and then incremented and captured three more times; and (3) whose left-most bit also happens to be the bank select bit.

The initial row/col selection performed in the actual preferred embodiment occurs in the tile address/data MUX circuit 22. It generates the signal NEW TILE whenever a new initial row/col address is needed, and supplies a full pixel address to be latched into the address manipulator 32.

Figure 7:
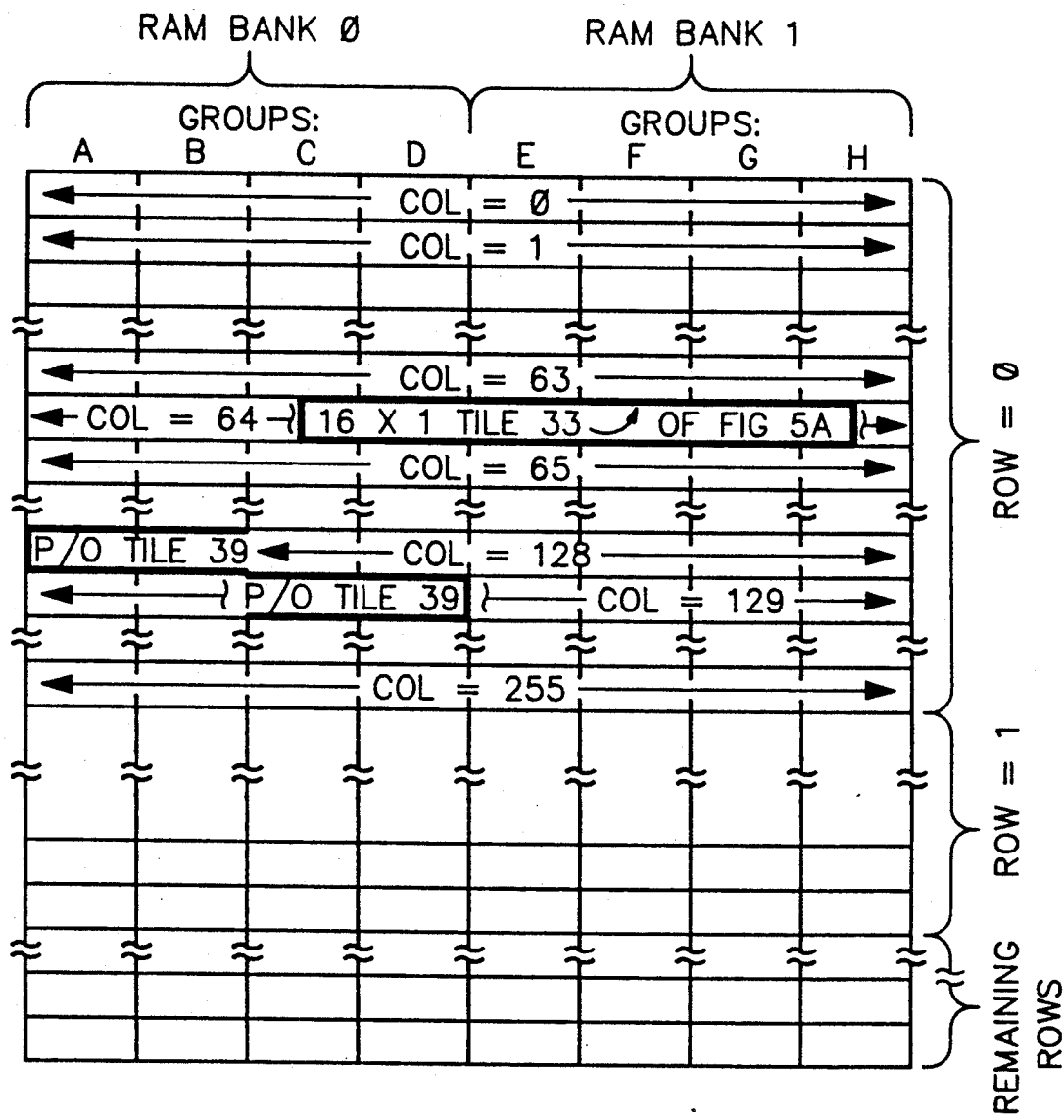
FIG. 7 is an example of how a specific 16×1 tile is stored according to the frame buffer memory organization of FIG. 6.

FIG. 7 shows the location of the sixteen by one tile 33 of FIGS. 5A-B in an expanded portion of row zero of the frame buffer memory 25. Notice how the tile 33 is mapped into four consecutive groups C, D, E and F. In this example the groups are all in the same row, although they would not need to be, as in the case of tile 39 of FIGS. 5A-B.

Figure 8:
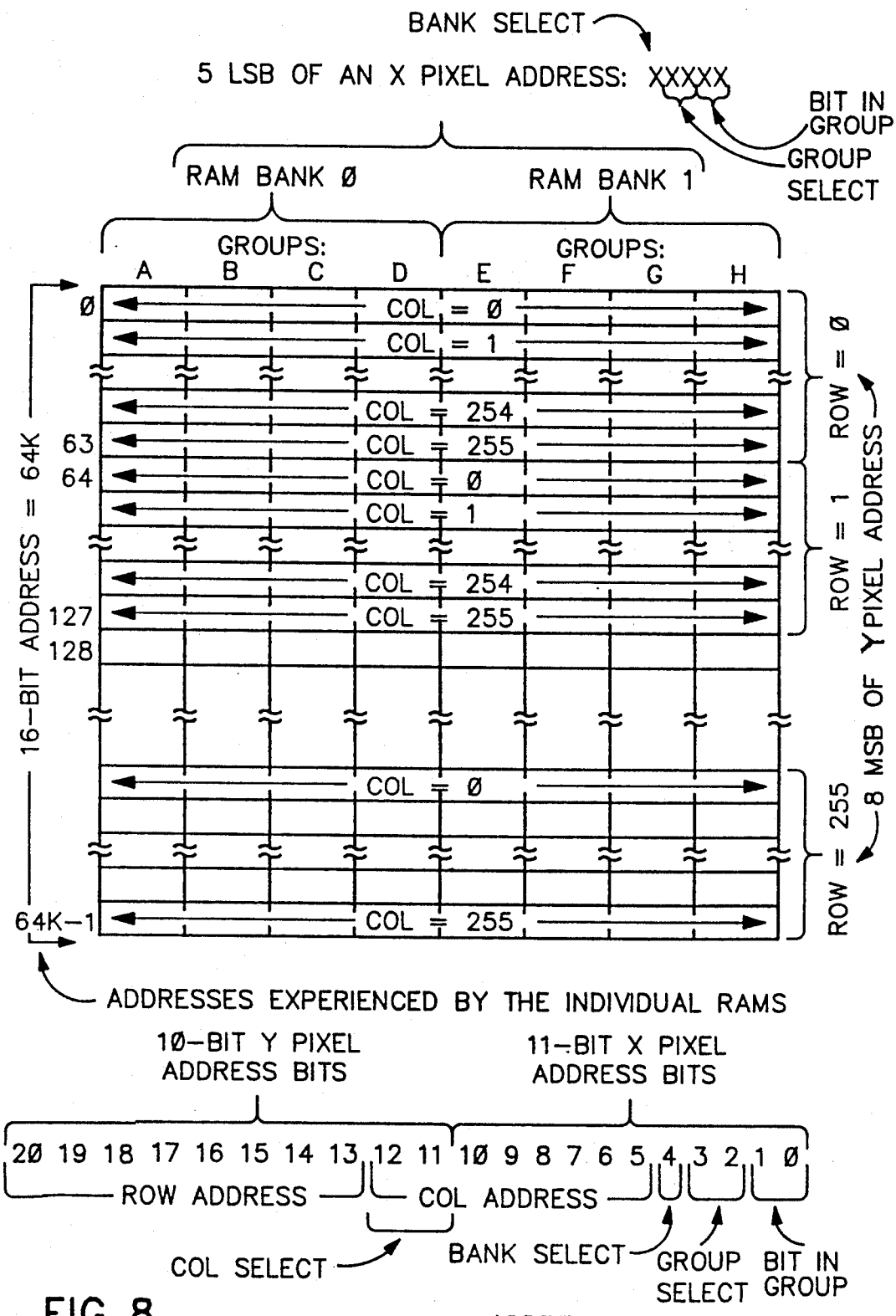
FIG. 8 is a diagram illustrating how the organization of the frame buffer memory accommodates 4×4 tiles.
Figure 9:
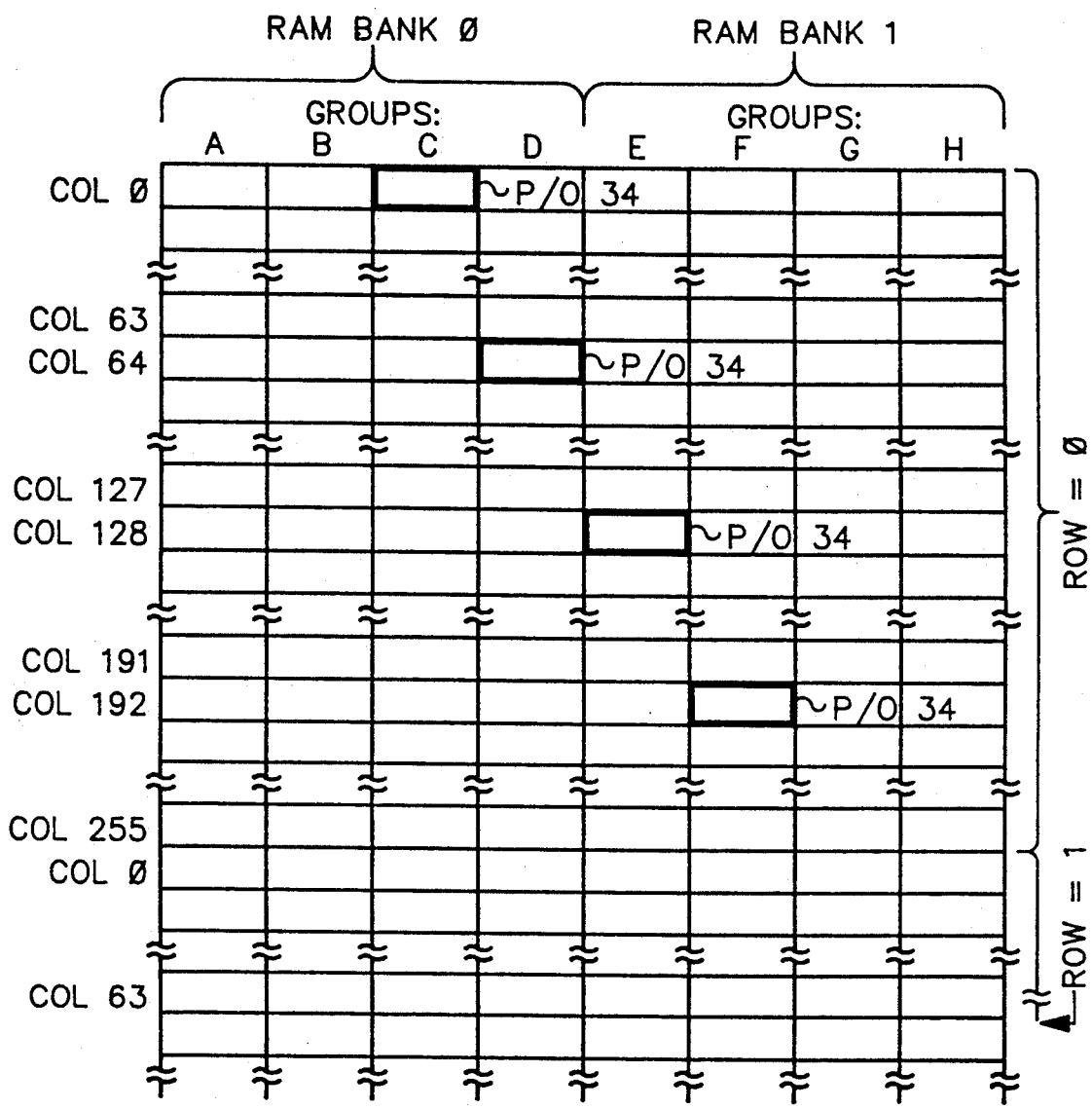
FIG. 9 is an example of how a specific 4×4 tile is stored according to the frame buffer memory organization of FIG. 8.

A different rule is used to convert pixel addresses into initial row/col addresses when four by four tiles are in use. There is also a different rule used for incrementing the initial row/col address. FIG. 8 illustrates the rules used. As to incrementing the initial row/col address, the same remarks apply to the bottom five bits 0-4 of the address. Now, however, something extra needs to be said about address bits 11 and 12; they do double duty in that they get incremented as well. This becomes clear through an inspection of FIG. 9, wherein is shown how the four by four tile 34 of FIGS. 5A-B is stored. It is also stored as groups C, D, E and F, but notice that they are each in different columns. That is, in this case the col address also has to increment as part of the calculation of the four addresses to access the tile. That is the meaning of the legend "col select" under address bits 11 and 12 in FIG. 8.

Initial row/col selection for four by four tiles is performed by the tile address/data MUX circuit 22, just as it is for sixteen by one tiles. The only difference is in how circuit 22 is programmed to recognize a tile boundary crossing.

Refer now to FIGS. 10A-E, which are an abbreviated schematic representation of the electronic circuitry of the address manipulator 32. As shown in FIG. 2B, the address manipulator 32 receives pixel addresses demultiplexed from the pixel bus 18. Pixel addresses appear in FIGS. 10A-B as the various PA[n] lines that are inputs to MUX's 41-48. These MUX's 41-48 implement the rule for converting the upper sixteen-bit portion (PA[5-20]) of the pixel address to row/col addresses, as shown at the bottom of FIGS. 6 and 8. They do this by selectively passing individual PA[n] bits onto the Row/Col Bus (R/C Bus) 49 in response to the various tile access modes. First the row address is formed (and incremented), and then as a separate and succeeding action, the col address is formed and incremented. The tile access mode is specified by the three lines RC_SEL(0-2). These control lines are produced by the master state machine 29 in response to (a) whether a row or col address is being formed, and (b) configuration information indicating the type of tile to be accessed. Configuration is specified by writing into configuration registers that are coupled to the Local Graphics Bus 16, but which, for the sake of brevity, are not shown in the Figures.) The vertical rows of numbers 0-7 in each of the MUX's 41-48 indicate, for each value of the RC_SEL lines, which of the corresponding PA[n] lines is selected by each MUX to contribute to the R/C Bus 49. A table in FIG. 10C indicates the meanings of the various binary values that the RC_SEL lines may assume during the different modes of tile access to the frame buffer memory 25. Not all of these modes and their meanings are of interest here, but do note the modes of 16×1 pixel access, 4×4 pixel access, and Z access.

Referring now to FIG. 10C, the R/C Bus 49 is coupled to an address refinement mechanism comprised of PAL's 50 and 52, and of latch 51. The term "PAL" refers to Programmable Array Logic, and describes a circuit that produces, according to pre-encoded logical rules, a pattern of levels upon its outputs determined by the combination of input signals. The address refinement mechanism described below has three basic functions.

The first function of the address refinement mechanism is bank selection. Recall that in the actual preferred embodiment the frame buffer 25 is organized into banks zero (groups A-D) and one (groups E-H). In this organization the pairs of groups A/E, B/F, C/G and D/H each receive their own address and bank select lines. The pairs rely upon the bank select lines to distinguish between otherwise identical addresses that might be sent to a pair. For example, to access the 16×1 tile 33 of FIGS. 5A and 7, simultaneous memory cycles to groups C and D of bank 0 and to E and F of bank 1 are required. This situation will produce at the output of latch 51 zeros for the signals CG_SEL and DH_SEL, and ones for the signals AE_SEL and BF_SEL. Those signals are the bank select lines actually used by the frame buffer memory 25.

The second function of the address refinement mechanism is carry generation. In the preceding example concerning the 16×1 tile 33 no carries were required in computing the group addresses from the given pixel address, because all groups ended up having the same row/col address (i.e., row 0/col 64). Now consider the 16×1 tile 39. Suppose the supplied (X, Y) pixel address had an X value in the range $24 <= X <= 27$ and a Y value of 2. The start of the tile 39 is in group A of row 0/col 128. That is followed by a group B that is also in row 0/col 128. But the next group in tile 39 is a group C at row 0/col 129; the col address had to increment from 128 to 129. The PAL 50 supplies the needed increments in the form of signals CA, CB, CC and CD, which are applied as carry-in's to certain adders discussed below. In the actual preferred embodiment the carry-in signals only apply to col addresses. If 4×4 tiles such as 36 and 38 were to be supported, then additional equations for carry generation on row addresses would be incorporated into the operation of PAL 50.

The third function of the address refinement mechanism pertains to col address generation for 4×4 tiles. Consider the 4×4 tile 53 of FIG. 5A. This tile is entirely in row 1, but occupies parts of four different col's. For tile 53, group A is in col 0, group B is in col 64, group C is in col 128 and group D is in col 192. Now consider the adjacent 4×4 tile 54 immediately to the right of tile 53. It is also entirely in row 1, and occupies parts of the same col's: 0, 64, 128 and 192. The difference is this. In tile 53 group A is addressed by col 0 and group B by col 64, while in tile 54 group B is addressed by col 0 and group C by col 64, etc. What has to be done to achieve that shift is this. The col address sent to the groups must vary as a function of the X pixel address. Referring again briefly to the addressing rule at the bottom of FIG. 8, the col select bits PA[11-12] need to vary as a function of the group select bits PA[2-3]. Bank selection proceeds as usual.

The inputs to PAL 52 include tile mode information signals MODE[0-2] and address signals PA[2-3] and R/C[6-7]. The outputs include the 7th and 8th permuted PA[n] bits for the pairs of groups A/E through D/H. These are the lines PPA[6-7] through PPD[6-7]. To do a row address R/C[6] maps straight through to each of PPA[6] through PPD[6], and R/C[7] maps straight through to each of PPA[7] through PPD[7]. When doing a col address for a 4×4 tile R/C[6-7] are ignored, and the outputs determined as a function of PA[2-3]. The four cases that can occur are shown in the following table:

| PA[2] | PA[3] | PPA[6-7] | PPB[6-7] | PPC[6-7] | PPD[6-7] |
|-------|-------|----------|----------|----------|----------|
| 0     | 0     | 00       | 01       | 10       | 11       |
| 0     | 1     | 11       | 00       | 01       | 10       |
| 1     | 0     | 10       | 11       | 00       | 01       |
| 1     | 1     | 01       | 10       | 11       | 00       |

Having described how information is stored and retrieved in the frame buffer under the control of the address manipulator 32, we now turn to a description of an activity that is also affected by the frame buffer memory organization: the refreshing of the image upon the monitor 9. For addressing tiles to be cached the address manipulator 32 uses the "random" port of the 64K by 4 video RAM's that comprise the frame buffer. For video refresh the addresses manipulator uses the "serial" port, but is nevertheless influenced by the A-H groupings and the (X, Y) pixel address to row/col mapping of FIGS. 5A-B.

A good place to start in appreciating this is with a brief discussion of how the video RAM's are organized with respect to their serial ports. For the sake of discussion, consider that the 64K by 4 RAM's are composed of four "sheets" of 64K by 1 RAM. (A block diagram of the innards of the 64K by 4 RAM's would tempt one to say that it had four planes, but we have already used that word. It takes eight 64K by 4 RAM's to make what we have called a plane, and so to avoid confusion, we resort to "sheet.") A sheet is a square array one bit deep addressed by eight bits of row address and eight bits of col address. Each of the four sheets is addressed by the same row/col address, thus producing the four bits of memory data that were used in connection with the description of random port operation.

To produce output at the serial port the video RAM's are addressed with a row/col address as before, and a serial output memory cycle is initiated by exerting the appropriate control lines. For each sheet, the 256-bit contents of the entire addressed row is loaded into an associated 256-bit output register. The meaning of the col address is now some location in each of those output registers. The col address is stored in a counter, whose output goes to four (one per sheet) 1-of-256 MUX's each coupled to one of the 256-bit output registers. The output of the MUX's is applied to four tri-state buffers responsive in unison to a signal Serial Output Enable (SOE). Thus, the col address (from the counter) applied to the MUX's determines which col bit from each sheet appears at the serial output. A signal SCLK increments the col address in the counter, so that the output at the serial port can be made to (circularly) traverse the entire row.

Recall now that there are eight such video RAM's in each plane, and that for every plane, each row/col address produces thirty-two bits. Some arithmetic and a reference to FIGS. 5A-B will reveal that a serial memory cycle for the eight groups of a plane captures (that plane's slice of) four entire scan lines. However, what is about to be described will be repeated once per scan line; the RAM's themselves are refreshed during horizontal retrace.

Now return to FIGS. 5A-B and consider the top scan line. To refresh the screen from left to right with that scan line a serial memory cycle is initiated, for all eight groups A-H, with a row/col address of 0/0. This action loads the output registers of group A with data for pixel addresses 0-3, the output registers of group B with data for pixel addresses 4-7, the output registers of group C with data for pixel addresses 8-11, and so on. Those are also the values present at the serial outputs, since the col address sent was zero. Furthermore, it also loads the output registers of group A with data for pixel addresses 32-35, the output registers of group B with data for pixel addresses 36-39, the output registers of group C with data for pixel addresses 40-43, and so on. These addresses are, of course, at a col address of one. The other col addresses are in there, too, waiting to be shifted out by application of SCLK.

The first point to be made is this. If the groups A-H are simply scanned in order (A, B, C, . . . ), with the four bits of each group considered in the obvious order as the group is scanned, then the pixel values obtained increase in pixel address by one in the X dimension, starting from zero. If this is done simultaneously for each plane of RGB values, then the desired sequence of multi-bit values is obtained for the scan line. In short, scan line zero works as you would want it to. The second point to be made is that this isn't what happens for the next scan line.

The same strategy fails for the next scan line (Y=1), because when the col address is sixty-four group A comprises pixel addresses 28-31, and not 0-3; this is because that scan line starts with group B. There has been a one group offset in the correspondence between pixel addresses and the groups A-H, and it applies to the other groups as well, all the way across the scan line. For scan line two the offset increases again by one group; for a row/col address of 0/128 group A comprises pixel addresses 24-27, group B accesses pixel addresses 28-31, etc. What to do?

It will be noted that the offset is limited in its effect to the thirty-two bits for the eight groups A-H of a particular col address. That is, if those thirty-two bits are considered as a unit, all the necessary information is present in the unit, albeit in an order that cannot be immediately used for video refresh. In other words, it is never necessary for one col address to borrow information from another. That is good, because it allows col increments to occur and then be processed as compartmentalized operations without interaction between col's. It will be further noted that the data line identifiers in a collection of thirty-two having an offset still increase by one from left to right, except for the modulo increment from thirty-one to zero.

What is needed is a way to scan the groups in the same order as before (A, B, C, D, . . . , G, H, A, B, . . . ), but with a starting point within the order that is a function of which scan line is to be formed. Since it can be seen by inspection of FIGS. 5A-B that for the actual preferred embodiment the offset happens the same way for every row address (which is another way of saying that each row address of four scan lines is the same), the starting point within the group order for beginning the scan is really just a function of the col address. In another system having a more extensive vertical repetition pattern for the groups (e.g., A, B, C, D, E, F, G, H, A, B, . . . , down the left-hand edge of the screen), then the scan starting point in the group would be a function of the scan line number, and not just one of the col address.

Figure 11A:
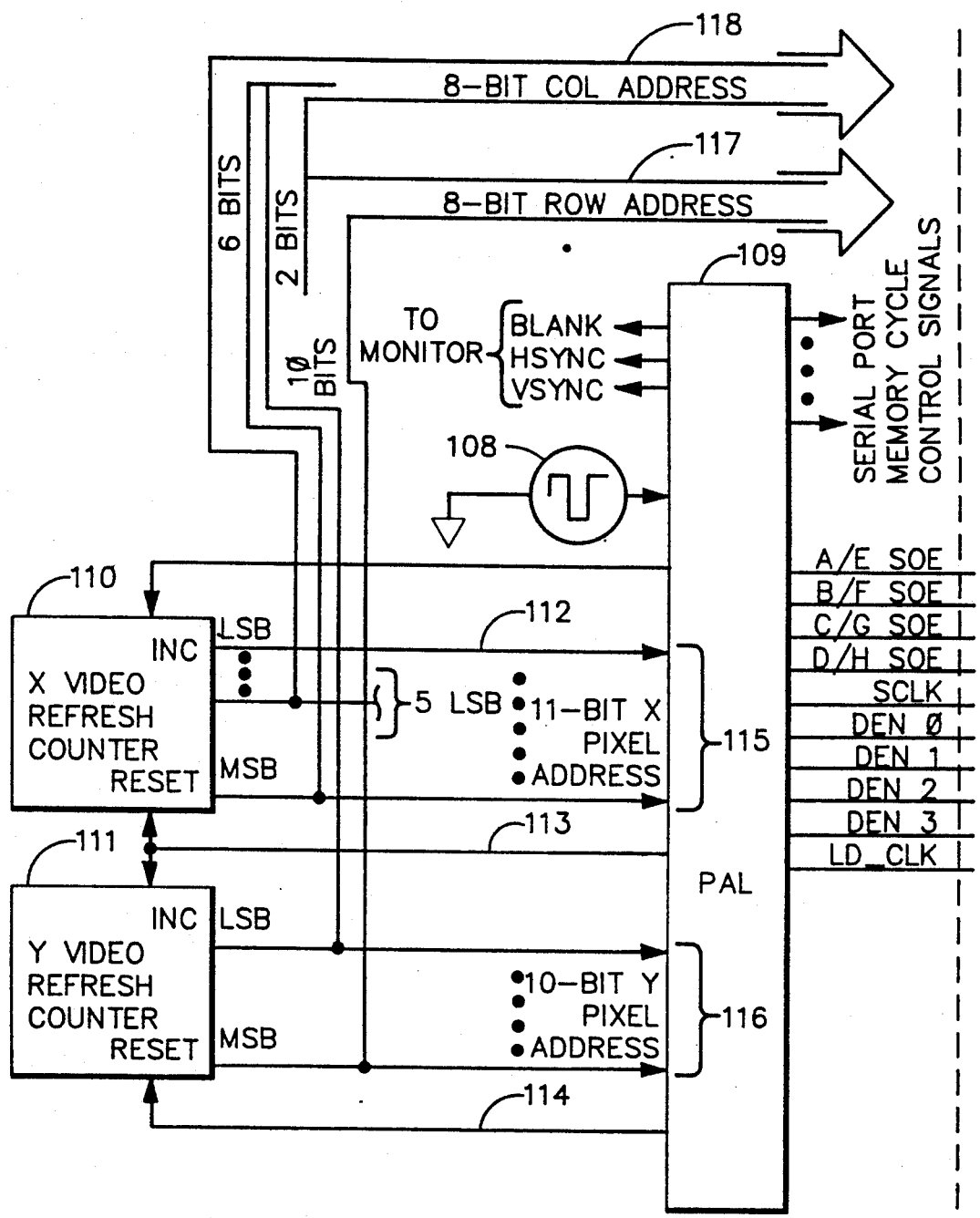
FIGS. 11A–B are a simplified block diagram of the mechanism used to refresh the monitor of FIG. 2C from the frame buffer memory organization of FIGS. 5A–B.
Figure 11B:
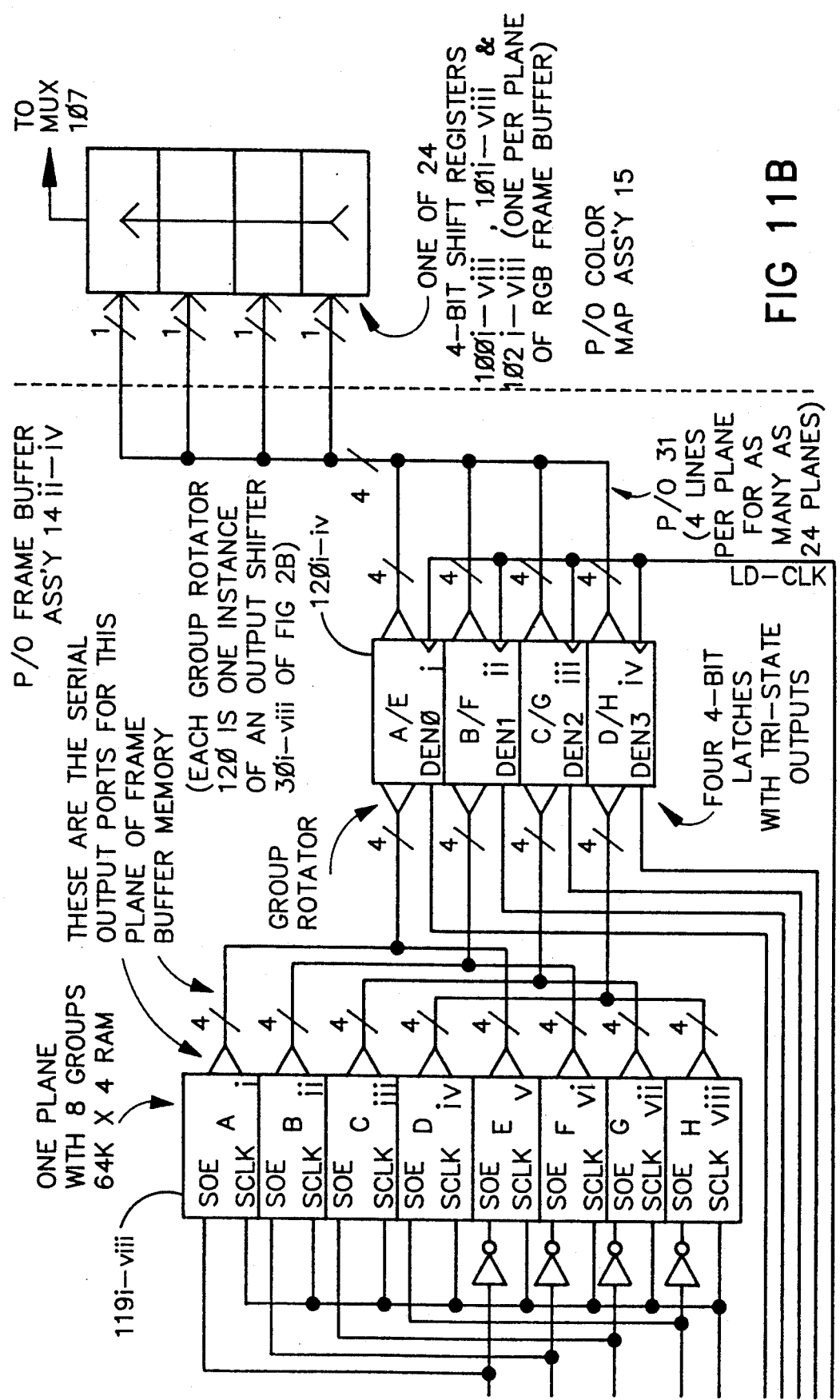

FIGS. 11A-B are a simplified block diagram of circuitry for implementing the variable starting point in group scanning performed for video refresh of the monitor 9. The circuitry shown in FIG. 11A exists just once, while that on FIG. 11B exists in multiple instances of one instance of one instance per plane of RGB frame buffer memory. The group rotator circuitry is part of the output shifter 30 within the frame buffer 14, while the shift registers 100-102 are part of the color map assembly 15.

Turning now to FIG. 11A, a clock generator 108 supplies a clock signal to a PAL 109. A state machine could also be used in place of PAL 109. In response to the clock signal and other inputs, the PAL 109 generates an increment signal 112 for an X video refresh counter 110. This is an 11-bit counter whose function is to create a cyclical X pixel address to be used in addressing the frame buffer for video refresh.

To dwell on the X video refresh counter 110 for a moment, the PAL 109 increments counter 110 from zero to 1279 at a rate whose average is equal to the rate of pixel application to the gun of the CRT. This forms the basis for pixel value extraction from the frame buffer memory as the beam of the CRT is deflected horizontally. Pixel addresses above 1279 are not displayed, and the count must start over, although not without some delay to allow horizontal retrace and synchronization. The PAL 109 generates the signals BLANK and HSYNC at appropriate times as the count in the X video refresh counter continues to rise above 1279. BLANK turns off the CRT beams. HSYNC initiates horizontal retrace, starts the next horizontal sweep, and then unblanks the beams. At that time the PAL 109 also issues the signal 113 which resets the X video refresh counter 110 and increments a 10-bit Y video refresh counter 111.

Counter 111 indicates which scan line is to be refreshed. To that end it counts through its entire 10-bit cycle, although it needs to be reset by signal 114 at least at turn-on. Thus, it can be seen that clock signal generator 108, PAL 109, and counters 110 and 111 comprise a mechanism for generating a sequence of (X, Y) pixel addresses that increase to the left along each scan line, and that specify a vertically descending sequence of scan lines beginning with the top one. Another way to say it is that the described mechanism generates all of the pixel addresses in the raster in the order that they will be needed.

Recall that a complete pixel address is twenty-one bits, and that a row/col address for the frame buffer memory is only sixteen bits. (The five-bit difference goes with the thirty-two bits obtained from the eight groups A-H during a memory cycle.) During each horizontal retrace a next row/col address will be applied to the RAM's of the frame buffer and a serial (video refresh) memory cycle is performed for the serial ports of those RAM's. All that is required in the way of addressing to do this are the top sixteen bits of the complete twenty-one-bit (X, Y) pixel address, properly partitioned, of course. This partitioning is shown as row address 117 and col address 118. Since the col address changes the most rapidly (forty times per visible portion of each scan line), it is derived from the X pixel address, less its five least significant bits (a col returns thirty-two bits, remember). That, however, is only six bits; the other two come from the two least significant bits of the Y video refresh counter. It has ten, so that leaves the top eight to serve as the more slowly incrementing row address (recall that there are four scan lines per row).

To this point we have described a mechanism that performs a serial port memory cycle with the following row/col address sequence: 0/0, 0/64, 0/128, 0/192, 1/0,

1/64, 1/128, 1/192, 2/0, etc. At the end of the sequence (i.e., the increment back to 0/0 from having counted up to 255/255) the signal VSYNC is issued to coordinate vertical retrace, and the monitor awaits HSYNC to begin the next raster. According to what was said earlier about the video RAM's, each memory cycle to the serial port put an entire row (for four sheets) into four output registers and selected bits in those registers to be initially output according to the col address. SCLK advances the col address, and SOE makes the four-bit output available at otherwise tri-stated terminals.

We now describe the signals the PAL 109 generates to get the thirty-two bits available at each plane of frame buffer memory rearranged into the proper order for transmission to the monitor 9. That process is the circular scanning by groups with a starting point in the circular sequence that is a function of col address, as explained above.

In FIG. 11B the plane of frame buffer memory of interest (any one of the twenty-four RGB planes that might be installed) is labelled as 119i-viii. The eight groups of RAM A-H are i through viii, respectively. Observe the four signals A/E SOE through D/H SOE, and assume that an SCLK has just been issued. The PAL 109 will exert the proper collection of SOE signals, based upon the pixel address. For example, to start the third scan line the sequence of groups needed is C, D, E, F, G, H, A, B, C, etc. The PAL 109 generates the signals C/G SOE, D/H SOE, NOT A/E SOE, and NOT B/F SOE. In this connection, note the inverters coupling the various SOE signal to the groups E-H of memory 119. This scheme works because of the tri-state outputs of the RAM's; when group A is driving group E is not, and vice versa.

A group rotator 120 i-iv comprised of four four-bit latches is coupled to the serial outputs of the RAM's 119i-viii. Four-bit latch 120i is for the A/E groups, and is coupled to 119i and 119v. Similarly, four-bit latch 120ii is for the B/F groups, and is coupled to 119ii and 119vi, and so on. The latches 120i-iv are loaded when LD_CLK is exerted by the PAL 109. In the example begun in the previous paragraph, this would happen at the same time C/G SOE through NOT B/F SOE are exerted. Thus, sixteen bits of the available thirty-two are captured in the latches 120i-iv. For this example, these would be the sixteen bits for groups C, D, E, and F.

The PAL 109 then issues the signal DEN2 (Data Enable #2). This clocks the four bits of group C into an associated one of twenty-four four-bit shift registers on the color map assembly 15 (one per plane of RGB frame buffer memory). From there the four bits are clocked out to take their place in the multi-bit pixel values that are (ultimately) applied to the DAC's 104-106. After group C has been shifted out DEN3 is exerted to load the four bits of group D into the shift register, and then they are then shifted out. Then DEN0 loads group E, which is shifted out, to be followed by group F.

After group F the contents of the group rotator 120i--iv are exhausted. At this time the PAL 109 complements the values of each of the SOE lines and LD_CLK is exerted once again. This puts the other sixteen bits into the bank rotator 120i-iv, whereupon another sequence of DEN2, DEN3, DEN0 and DEN1 will put, four at a time, those bits into the shift register. At this point the entire sequence described is repeated again to retrieve the next thirty-two bits from this plane for video refresh.

Observe that the process of rotating the bits also partially serialized them. That is, there are thirty-two bits at the output of the RAM's of the frame buffer, but only four bits at the output of the group rotator. As a unit, the four bits change values at a rate eight times that of the unit of thirty-two, of course. The serialization provided by the group rotator is beneficial, in that it must be done anyway for the CRT, and because it eliminates the need for extra hardware to accomplish the serialization. Also, partial serialization at this point in the data flow within the graphics accelerator 7 reduces the number of signal interconnections that must be made between assemblies.

RGB And Z Pixel Caching

We turn now to the pixel cache, and begin that explanation with a brief reference back to FIG. 2B. Note that the RGB cache 26i-viii is coupled to two things: the FBDAT bus 24 and the frame buffer RAM's 25i-viii. Recall that the FBDAT bus 24 is essentially the union of the signal NEW PIXEl 87, the partial pixel address in the tile, and the RGB pixel data. Turn now to FIG. 12. In FIG. 12 the eight groups of frame buffer memory A-H are denoted by reference numerals 119i-viii, just as in FIG. 11, except that the data paths shown now connect to the random ports of those RAM's, and the memory cycles of interest will be random port memory cycles. Thus it can be seen that FIG. 12 is an expansion (for one plane of frame buffer memory) of the RGB cache 26i-viii of FIG. 2B.

To adequately explain the operation of the cache we must also take into account certain aspects of the address manipulator 32 and master state machine 29 in the frame buffer controller 13 of FIG. 2B. Rather than refer to additional figures we shall simply include these additional aspects in narrative form as they are needed.

Suppose that the pixel interpolator 21 generates values for a pixel that lies outside the tile then in the RGB cache. The values for that pixel would not be placed into the RGB cache immediately; the cache would first be written to the frame buffer by a process that is explained beginning in a few paragraphs. Furthermore, and in contrast with conventional cache systems for general purpose computers, the RGB cache is not then loaded with the justified tile for the new pixel address that caused the miss and the writing of the cache to the frame buffer. As the explanation proceeds it will become clear why that is unnecessary. Instead of such an immediate load, the address manipulator 32, under control of the master state machine 29, stores away the tile description (row/col addresses and the tile access mode, the latter indicating tile size and shape). This description is saved until it is time to write the RGB cache out to that tile.

The actual RGB cache mechanism itself comprises two sixteen-bit registers 121 and 122. The RGB cache 121 receives in D-type latches the data to be written to the cache, while the WE cache (Write Enable cache) records in Set-Reset latches indications of which locations in the RGB cache 121 have been written to, and must subsequently be used in updating the associated tile in the frame buffer. When a tile boundary is crossed, but after the contents of the cache have been safely sent on their way, the WE cache 122 is cleared. This is done by issuing from the master state machine 29 a CACHE CLEAR signal that applies a reset to each of the latches in the WE cache 122. Note that no such clearing occurs for the RGB cache 121.

Now consider the input address and data supplied to the cache registers 121 and 122. The input address is four bits 127 that are the same as the partial pixel address in tile bus 96 generated in FIG. 3. It will be recalled that the partial pixel address in tile 96 can be programmed to be as many as eight bits. However, in the actual preferred embodiment there will always be only four bits of such partial pixel address information. With an understanding of how the programmable tile size mechanism of the frame buffer memory operates, it will be appreciated that when sixteen by one tiles are in use the four bits 96/127 are the least four significant bits of the X pixel address. When four by four tiles are in use the lower two bits of the four-bit partial pixel address 96/127 are the two LSB's of the X pixel address, while the upper two bits are the two LSB's of the Y pixel address.

The partial pixel address describes the bit location in the tile of interest. It is coupled to a one-of-sixteen decoder 123, whose outputs are respectively connected to the sixteen different LOAD inputs of the sixteen latches in the RGB cache 121. The decoder 123 receives an enable signal 125 from the master state machine 29. The generation of this enable signal 125 is based at least upon the signals ZPASS0-ZPASS3, which have to do with hidden surface removal. If the data bit presented to the RGB cache is part of a pixel value that is to replace one on a hidden surface being removed, then the enable signal 125 is issued, and the decoder 123 exerts one of the sixteen LOAD inputs for the RGB cache 121; otherwise no activity occurs. Notice that the sixteen outputs of the decoder 123 are also coupled to the sixteen SET inputs of the WE cache 122. There is a definite correspondence here; the LOAD input for the least significant bit of the RGB cache 121 and the SET input for the least significant bit of the WE cache 122 are driven by the same output decode line from decoder 123. Each decoder output line goes to a different pair of corresponding RGB/WE cache latches. And although the correspondence between the binary pattern of the partial pixel address in tile bus 127 and which paired latches in the RGB/WE caches get the corresponding decode line might, perhaps, be arbitrary, in a preferred embodiment it is the obvious correspondence. That is, all zeros on bus 127 selects the least significant bits of the cache registers 121/122, and all ones selects the most significant bits. The relationships between the bit locations in the RGB cache and the (X, Y) pixel addresses for the different size tiles is depicted in the lower right-hand corner of FIG. 12.

At this point it is perhaps useful to point out that the same partial pixel address in tile information is sent to the RGB cache register 121 for each plane. The data line that arrives at each plane, however, is unique to that plane. This, of course, follows from the notion of a bit-plane of frame buffer memory per bit of pixel data values.

The arriving data bit 126 is simply that data line of pixel bus 18 that is associated with the particular plane of frame buffer memory under consideration. That arriving data line 126 is coupled to each DATA input terminal of the sixteen latches of the RGB cache 121. Which of the latches actually stores that data bit's value is, of course, determined by which latch receives the LOAD signal from the decoder 123.

We may summarize at this point by saying that when the signal NEW PIXEL 87 occurs, the partial pixel address determines which latches within the RGB/WE caches 121/122 receive bits. The RGB cache register 121 gets the actual data value, while the WE cache register 122 gets a set to the corresponding latch, thus indicating which latches of the RGB cache 121 contain valid data bits to be used in a later write to the frame buffer memory. During that later write those latches of RGB cache 121 that do not contain valid information will be ignored, and will not contribute to updating the associated plane of the frame buffer. This is why the CLEAR CACHE signal 124 needs only to reset the latches in the WE cache 122. The RGB/WE cache may be written to once, or many times, before the next NEW TILE signal occurs. Likewise, the same bit location in the RGB/WE cache may be written to more than once.

Eventually, there will be a NEW TILE signal. At that time the RGB cache 121 is immediately transferred, in parallel, to a SOURCE register 129. At the same time the WE cache 122 is transferred, in parallel, to a WE HOLD register 131. Next, the WE cache 122 is cleared. These actions free the RGB/WE cache registers 121/122 for immediate use with the next tile. Meanwhile, the SOURCE register 129, in combination with the WE HOLD register 131, is used to update the contents of the frame buffer memory at the tile whose description was saved in the address manipulator 32 back at the beginning of the cache cycle (i.e., when the previous NEW TILE was issued).

At this point the data in the source register 129 is applied to a replacement rule circuit 132, which, depending upon the replacement rule to be used, may also receive data from a destination register 130 and also possibly from a pattern register 128. If either of the destination register 130 or the pattern register 128 are required, they will be loaded at this time at the behest of the master state machine 29. Each will, if required, use a memory cycle to the random port of the frame buffer plane 119 to access the needed tile. The functions of a pattern register and a destination register in combination with a source register for replacement rule operation are known in themselves, and need not be discussed in any detail here, save to note that what is in the replacement rule circuit 132 are barrel shifters and a lot of combinational logic.

What is worthy of note concerning the pattern register 128 and the destination register 130 is that during the memory cycles that load them the data must pass through a group rotator 133 similar in function to the group rotator 120 discussed in connection with FIGS. 11A-B and video refresh. If this is not done, then the individual bits of the cache 121/122 will not always correspond to the proper pixel addresses in the tile appearing on lines 127, but will instead be a function of the particular row/col address employed. It is the job of the group rotator 133 to fix things so that the correspondence is always the same. Note that the particular rotation needed will, in general, be different for the load of the destination register 130 than that needed for the load of the pattern register 128. In general, their tiles will probably not start with the same groups. This certainly is not a problem, as they are each rotated to the same type of reference orientation: that of the cache 121/122, as shown by the bit-in-tile/pixel address diagrams in the lower right-hand corner of FIG. 12. Furthermore, note that the rotation needed for loading the destination register 130 is determined by the pixel address that produced the preceding NEW TILE signal, and that was latched into the address manipulator 32.

Figure 13A:
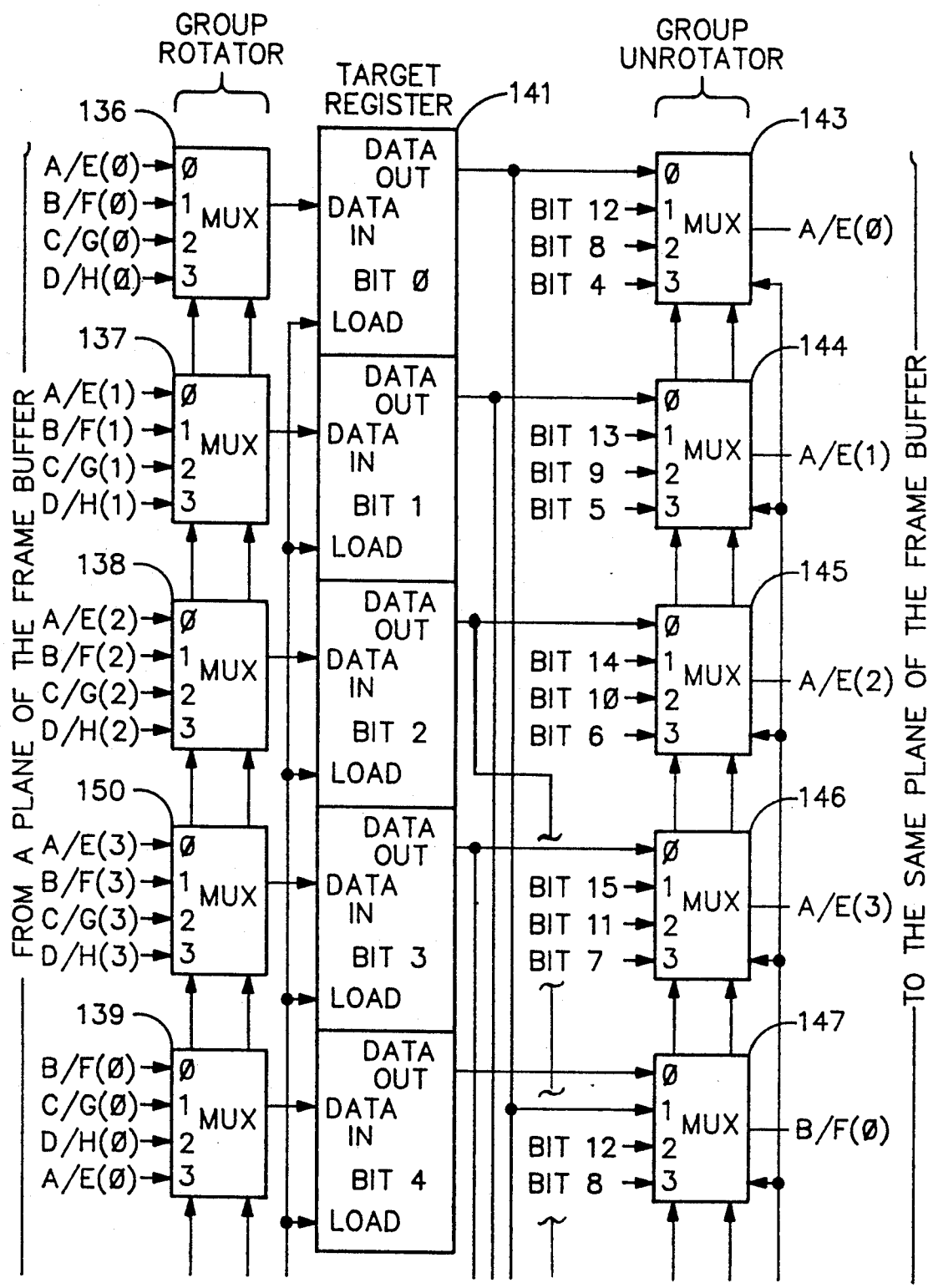
FIG. 13 is a block diagram illustrating the operation of group rotator and unrotator circuits used in the block diagram of FIG. 12.
Figure 13B:
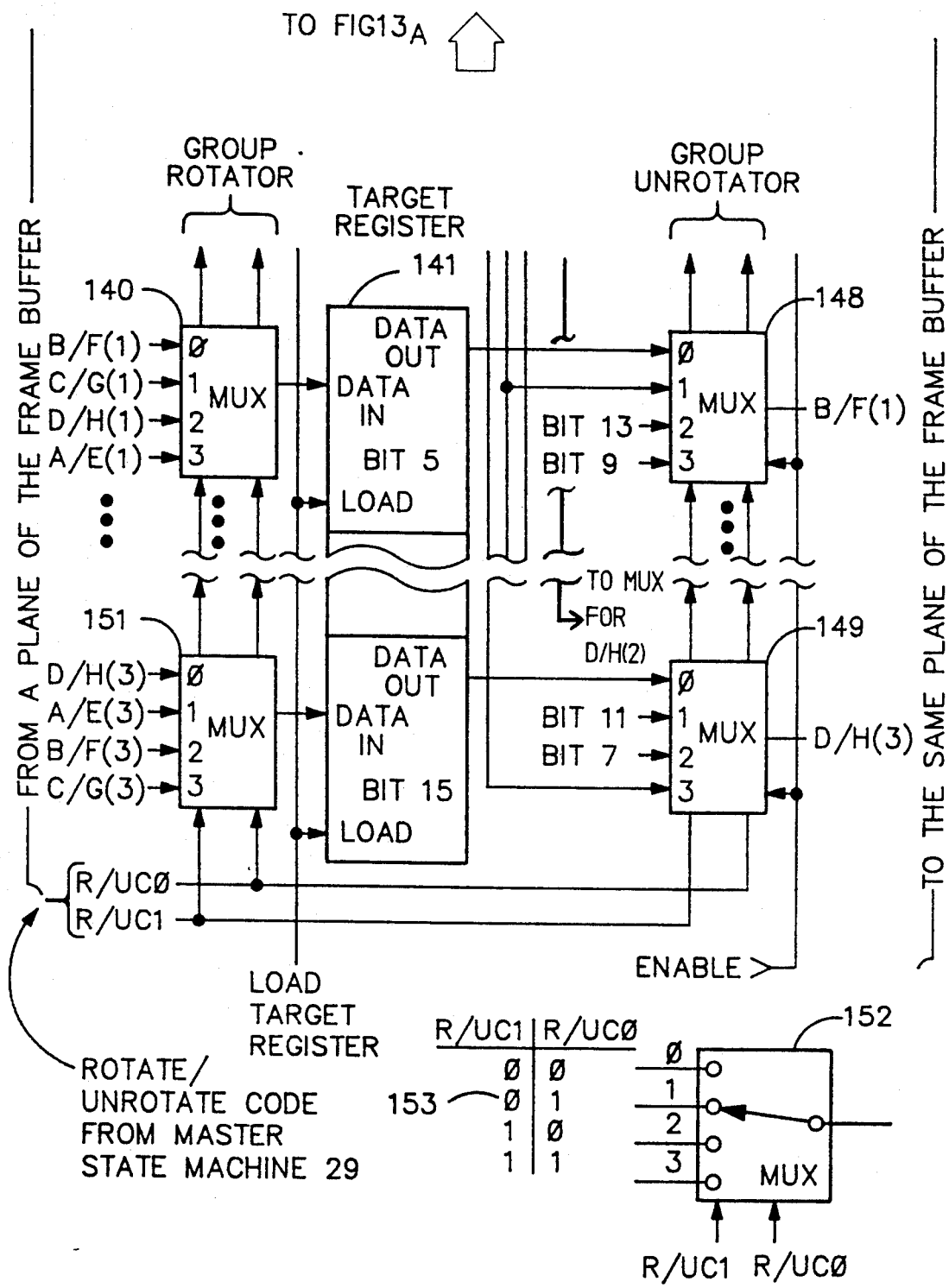

The nature of the group rotator 133 is shown in FIG. 13. Note that it comprises sixteen MUX's, of which 136-140 are illustrative. The output of each MUX is connected to an associated input of the target register 141 that is to load the rotated data. (Group rotator 133 has three target registers. It is connected to the inputs of the SOURCE register 129, the PATTERN register 128 and the DESTINATION register 130; their load signals are separate and the master state machine 29 controls the rotation and which register gets the rotated data.)

Consider bit 0 of the register 128/133 to receive the rotated data. It can only come from bit 0 of exactly one of groups A/E, B/F, C/G or D/H. The bank selection mechanism discussed earlier fixes it so that whether it is A or E, B or F, etc., cannot be discerned at the level of capturing the sixteen bits output by the frame buffer plane 119 (i.e., one of 119i-viii). So, exactly one of the signals we show as A/E(0), B/F(0), C/G(0) and D/H(0) is the one that corresponds to bit 0 of the target register. MUX 139 selects which, based upon a two-bit rotate code (shown in FIG. 13 as R/UC0 and R/UC1) applied to all sixteen MUX's and determined by master state machine 29 based on the type of tile access and the row/col address for that access.

Bit 1 of the target register 141 can likewise only come from certain places in the frame buffer plane 119. In particular, if bit 0 came from, say, C/G(0), then bit 1 must come from C/G(1). That follows from the fact that each group in the frame buffer 119 outputs four bits as a unit. Thus in our example, all of the first four bits of the target register come from C/G, (0) through (3), respectively. This means that the MUX's supplying those first four bits into the target register each select their output from their inputs in a similar fashion; that is, they each receive the same rotate code 142 by virtue of being connected to it in identical fashions.

The selection of the next four bits for the target register 141 is performed in a similar fashion, but with a slight difference. Consider MUX 139 and the fifth bit of the target register 141, bit 4. As before, it can only come from certain places. To continue the example begun above, if C/G provided the least significant four bits to the target register 141, then it must be the case that D/H is to provide the next four bits. That is because of the way the groups are arranged to respond to pixel addresses; see FIGS. 5A-B. Accordingly, MUX 139 will select the signal D/H(0) to drive the fifth bit of the target register 141. The other possibilities must also be present at the MUX 139, and indeed they are. But notice how they are shifted relative to the inputs of that MUX, as compared to any of the first group of four MUX's. Thus, if MUX 139 gets the same rotate code as MUX 136, whenever MUX 136 passes C/G(0) then MUX 139 passes D/H(0).

FIG. 13 also shows the nature of a group unrotator; e.g., group unrotators 134 and 135 of FIG. 12. Now is a good time to discuss their operation, as it is related to that of the rotator, and because the group unrotators 134 and 135 will figure in our concluding remarks below about FIG. 12.

A group unrotator is also comprised of sixteen MUX's, of which MUX's 143-149 are representative. Each of those MUX's has four inputs connected to the outputs of four cells of the target register 141. The output of each MUX is connected to the bus that carries input data to the random port of the plane of frame buffer memory 119i-viii that is associated with the plane of the RGB cache under conderation. The MUX's 143-149 make their selections based upon a rotate code, just as do the MUX's for the rotator. In FIG. 13 the rotator and unrotator are shown as receiving the same codes on R/UC0 and R/UC1. This is a convenience for illustrating the operation of those circuits, to better emphasize how the operation of one is the inverse of the other. It is generally true that group rotations and unrotations tend to come in pairs, although they are separated in time. The group rotators and unrotators themselves are not necessarily paired, but instead are simply programmable resources to be used as needed by the controlling mechanisms. Hence, the reader will understand that the convenience of a commonly applied Rotate/Unrotate Code in FIG. 13 does not mean that the rotate and unrotate codes of FIG. 12 are all lashed together. Instead, the properly corresponding codes will occur separated in time, but very possibly amid the presence of intervening operations.

Note the illustrative MUX 152 and the accompanying table at the bottom of FIG. 13. MUX 152 is not part of the circuit; it appears in the figure simply to assist in the explanation. With the aid of MUX 152 and table 153, note the following inverse relationship between rotation and unrotation. Pick an R/UC code, such as one-one (three). Imagine that all thirty-two MUX's in FIG. 13 are set to the "3" position. Observe that MUX 150 will put D/H(3) into bit 3 of the target register 141. Now observe that MUX 149 will take bit 3 and put it (back) onto D/H(3). It is as simple as that, and for any given R/UC code the same mapping/inverse mapping obtains for all sixteen bits of the target register 141.

Let's return now to FIG. 12 and conclude its explanation. When we left to discuss FIG. 13 the inputs to the replacement rule circuit 132 had been applied, and the contents of the WE cache 122 had been transferred to the WE Hold register 131. Group unrotators 134 and 135 shift the data bits so that they line up with their associated groups A-H in the plane of frame buffer memory 119i-viii that is under consideration. In general, the pixel address and type of tile access of the preceding frame buffer memory access are what determine the rotate/unrotate code used. At this point there begins a memory cycle to the random port of the frame buffer memory plane 119i-viii. What remains is to explain how the unrotated WE bits serve as a mask in writing the unrotated data bits from the replacement rule circuit 132.

A special property of the video RAM's allows the masking by the WE bits of the data bits to be written. Here is how that is done. A RAM control line (not previously mentioned, and not shown) is exerted to cause the type of random port memory cycle now being described. During the application of the row address the unrotated WE masking bits of the group unrotator 134 are enabled and thus applied to the data inputs of the video RAM's. It is a property of the RAM's that they understand that these bits are to be taken as the mask. Then, during the application of the col address group unrotator 134 is again disabled while group unrotator 135 for the data bits is enabled. The RAM's capture these bits and proceed to mask them internally before storing them.

Figure 14:
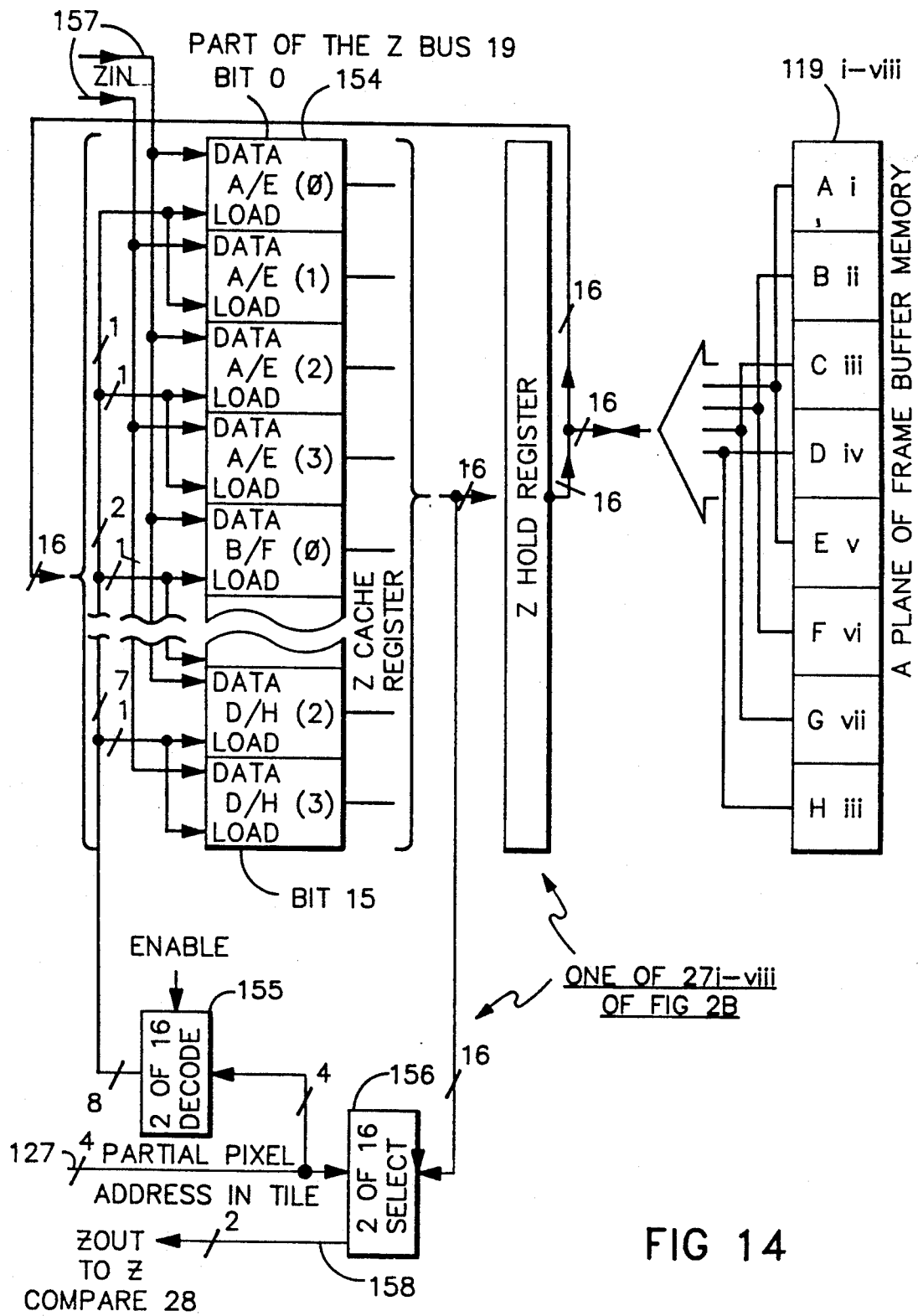
FIG. 14 is a simplified block diagram of the Z cache of FIG. 2B.

We turn now to a description of the operation of the Z cache 27i-viii, which is shown in FIG. 14. Refer also to FIG. 2B, for although the Z cache 27 is, when considered by itself, internally less complicated than the RGB cache, as a unit it is connected to a greater number of things. Note that Z data input to the Z cache 27i-viii comes from two places; the Z bus 19 and the associated plane of frame buffer memory 25i–viii (same as 119i–viii). What arrives from the Z bus 19 is two bits of a sixteen-bit Z value. What arrives from the frame buffer plane is an entire sixteen by one tile whose bits are to be understood as grouped in pairs. We are interested in two bits from the Z bus 19 and one of the pairs of bits fetched into the Z cache register 154. Which pair of bits is of interest is determined by the partial pixel address 127, which is the same as that supplied to the RGB cache 26i–viii. We have not described that part of the address manipulator 32 yet, but it knows when a Z access is underway, and programmatically maps the row/col address for the Z buffer's memory cycle into the right location in the Z buffer portion of the frame buffer. The whereabouts of that "right location" is selectable. We shall have a great deal to say about this under heading #4, but for now simply understand that, in general, the row/col address for an RGB access to the frame buffer for a particular (X, Y) pixel address is not the same for the corresponding Z buffer access (i.e., a Z buffer access with the same pixel address). The difference is a function of the programmatic mapping mentioned above.

A Z buffer mode access to a memory location in the frame buffer is used for a particular purpose: to write a Z value, and to compare Z values for the purpose of hidden surface removal. Whether or not to use the result of the comparison to condition the write is programmable; one could condition the write and do hidden surface removal, or one might overwrite no matter what. Either way, no replacement rule mechanism such as that for the RGB cache is involved. With some similarity to a conventional CPU cache, when a Z access occurs, a read memory cycle to the frame buffer occurs and the Z cache is initially loaded with the accessed tile. The unconditional initial load means that no Z cache clear is required.

Here is a description of a sequence of operations performed while the Z buffer mode is in effect. Assume that the scan converter 12 is creating pixel addresses and RGB values that are in the early part of a tile, either four by four or sixteen by one, and that the next few writes to the RGB cache cause no misses. Along with each RGB value the scan converter 12 also generates a Z value. For each new partial pixel address at which a Z write is to occur, a two-of-sixteen line decoder 155 enables an associated two bits in the Z cache register 154. These then are loaded with the data ZIN. That input data is a particular two-bit portion of the sixteen-bit Z bus 19. Which particular two-bit portion it is depends upon which plane of frame buffer memory is under consideration. Recall from FIG. 2B and earlier discussions that a comparison of old and new Z values is involved. The partial pixel address 127 is also applied to a two-of-sixteen selector 156 coupled to the output of the Z cache register 154. This selected the bits of the old Z value that are to be compared with the new one. The selected two bits of old value are called ZOUT 158, and are sent to the Z compare circuit 28 of the host frame buffer assembly 14 (one of 14i–iv). If hidden surface removal is in effect, then it was on the basis of this comparison that the two-of-sixteen decoder 155 was enabled to exert the load signals for the addressed cells of the Z cache register 154. Had the comparison been unfavorable, then no new bits would have been written, and the old two bits would have been left undisturbed. (Likewise, the corresponding RGB values would not have been written, either, as previously described in connection with the RGB cache.)

To continue the explanation, let the next pixel address cross a tile boundary. The signal NEW TILE 86 causes the master state machine 29 in the frame buffer controller 13 to supervise the following sequence of events. The contents of the Z cache register 154 are transferred to the Z Hold register 159. Next, there is an immediate read memory cycle to get the next Z tile into the Z cache register 154. The RGB and WE cache registers 121/122 transfer their contents to the Source and WE Hold registers 129/131, and the RGB cache and Z cache continue to operate as previously described. The master state machine 29 will first write to the frame buffer memory the Z tile that is in the Z Hold registers (one register per plane of frame buffen memory that is being used for the Z buffer, which might not be all planes). Then it will write the RGB tile to the frame buffer memory. With any luck all this is completed while successful new pixel generation operations are being carried out (i.e., no misses in the new tile). If there should be a miss before all the memory write operations are completed for the old tile, then the master state machine 29 issues a WAIT signal (not shown) to temporarily suspend the operation of the scan converter 12.

We have two loose ends to discuss before our discussion of the Z cache 27i–viii is finished. First, there is this business of bits coming in pairs for the Z values. Now, as far as a read memory cycle to the frame buffer is concerned, a fetch into the Z cache register is simply a (programmatically offset) sixteen by one tile. But the two-at-time property for the meaning of the bits in the Z cache register means that the pixel addresses will use up those sixteen bits in the Z cache register 154 twice as fast as the bits in the RGB cache. Now, to this point we have relied upon the pixel address crossing the RGB tile boundaries to generate NEW TILE. Clearly, if things are as just described, we can't wait that long; after halfway through the RGB tile we would have a cache miss for Z and not know it. What to do?

There are at least three choices. First, we could leave the controlling software and the scan converter 12 under the impression that its selected tile size is in effect, but arrange for the tile address and data MUX circuit 22 to generate NEW TILE twice as often as would otherwise be necessary. That is, for sixteen by one tiles generate NEW TILE every next eight by one tile that is a half-tile of the actual tile, and for four by four tiles generate NEW TILE every four by two tile that is a half-tile of the actual tile. Second, the Z cache could be made twice as big as the RGB cache. That is an attractive solution, but clearly wasn't done in the actual preferred embodiment. Instead, the first solution was used. A third possiblity would be to use altogether separate tile mechanisms for RGB and Z tiles. A pixel address would map into separate RGB and Z tiles, each accessed through separate cache and memory control mechanisms. The Z data could be in a separate frame buffer or be a portion of the RGB frame buffer, as desired. The point is that the individual misses into each cache would cause individual tile accesses independently of what was going on in the other cache.

The second loose end concerns the absence of any group rotators and group unrotators in the Z cache mechanism. The Z values are subject to the same permutations on the groups A–H as RGB values are, yet there are there no rotators and no unrotators. Why not? In brief, the answer is that in the actual preferred embodiment Z tile size and shape never changes. If whenever a Z value is stored with a Z mode access it gets read back the same way with a later access, then it won't matter if the bits are rearranged while they are in storage, so to speak. It is as simple as that, and this means that the Z compare circuit always gets a Z values whose bits are in the right order, regardless of the pixel address associated with that Z value. In a more general system where the Z tile size or shape might change, so that data stored in one tile access mode could retrieved under another, then rotators and unrotators would be needed in the Z cache.

Operation Of The Z Buffer Mapping

As has previously been stated, the frame buffer memory is divisible into portions. One of those portions is always displayed, which we may refer to as the displayed, or visible, portion. The frame buffer has the same number of Y pixel addresses as the raster has scan lines, but it has an excess number of X pixel addresses that correspond to the non-displayed portion. Thus, and with reference to FIG. 15, any pixel address with an X value in the range of 0-1279 is located in the visible portion, while any pixel address with an X value in the range of 1280-2047 is in the non-displayed region, or excess portion, of the frame buffer. A number of uses can be made of the non-displayed region of the frame buffer; the excess portion is not automatically used as a Z buffer. For example, images might be rendered into a part of the non-displayed region so that they might later be quickly swapped in and out of the displayed portion. Conversely, it is not the case that the Z buffer must be located in a non-displayed portion. None of it might be, part of it might be, or all of it might be; it depends upon the Z mapping and upon what the frame buffer assemblies are used for. An entire frame buffer assembly might be used as a Z buffer, and would not contribute bits to RGB pixel values at all. It would not respond to the memory cycles for RGB data. It would respond to Z mode accesses. So, even though there were Z values in the "displayed portion" of the pixel address space, they don't get "displayed."

Before we get to the mapping we need to mention one further aspect about where the Z buffer can be located. It will be recalled from our earlier discussions that Z values are sixteen-bit values grouped as eight pairs kept in a single frame buffer assembly 14i-iv. A tile of Z values is eight such entities. We do not mean that whatever Z values are kept must be found on just that one frame buffer assembly 14i-iv! Not at all; parts of the Z buffer can be located on as many different frame buffer assemblies as are installed. But the bits of a given Z value are stored on only one eight-plane frame buffer assembly. Thus, it will be appreciated that the Z buffer mapping involves a two-part destination; the frame buffer assembly # and where in that assembly the Z value is to go.

Figure 15:
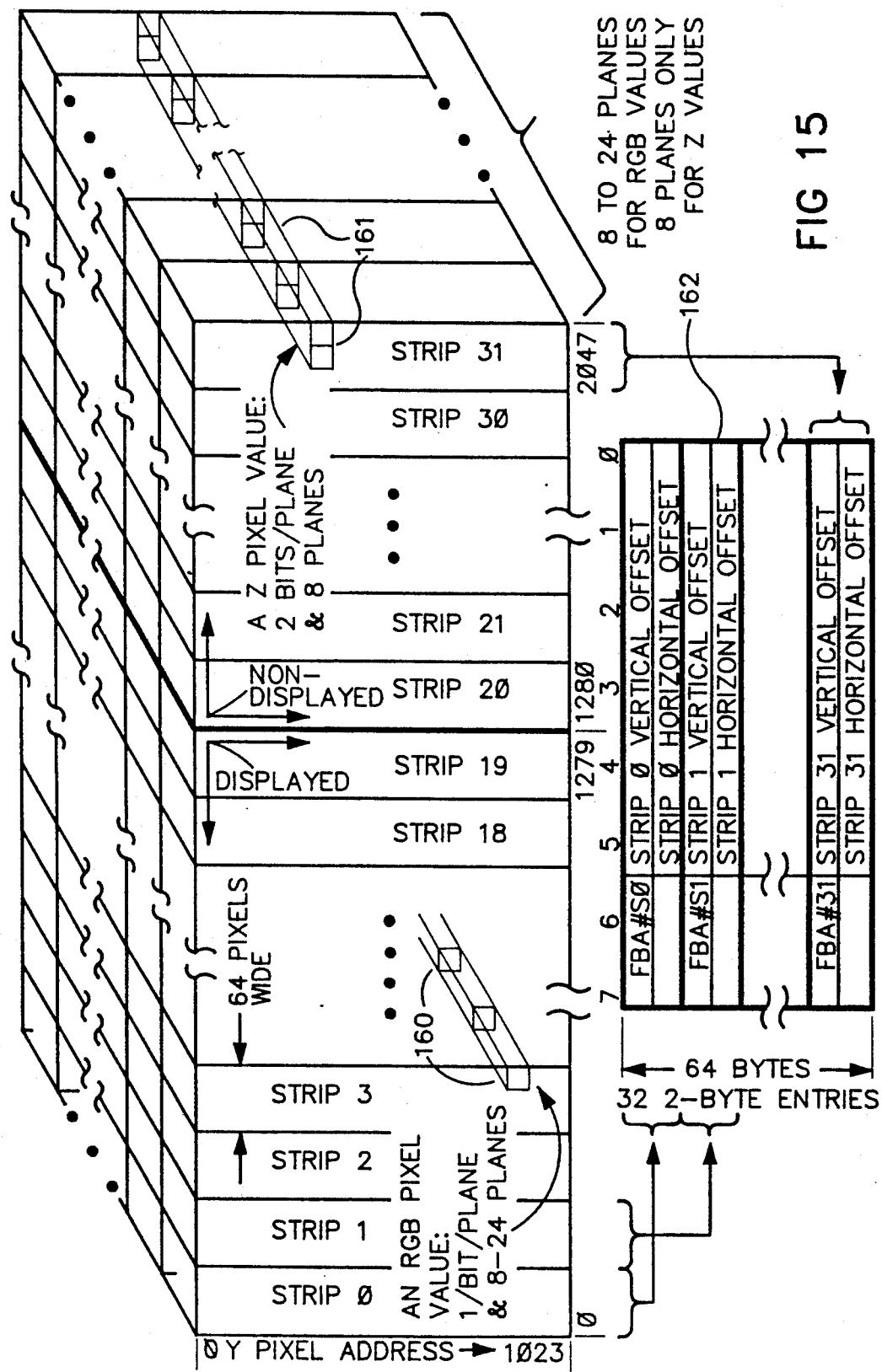
FIG. 15 is an illustration of how a Z buffer is mapped into the frame buffer memory assembly of FIG. 2B.

Referring to FIG. 15, it may be seen that the (X, Y) pixel address space for the frame buffer has been divided into thirty-two vertical strips each sixty-four pixels wide. They are labelled as strips zero through thirty-one. As we proceed it will become clear that it is the strips that are mapped (and by implication, all the (X, Y) pixel address they contain). For example, reference character 160 represents an arbitrary RGB pixel value (much exaggerated in size). It would have between eight and twenty-four bits each located at the same (X, Y) pixel address in an equal number of between eight and twenty-four planes. Assuming that the corresponding Z value location has been mapped into the non-displayed region of the same initial eight planes of the pixel value 160, reference character 161 represents a Z value that might correspond to pixel value 160. Whatever the mapping is that mapped the pixel address for RGB pixel value 160 into the location of Z value 161, that same mapping would be applied for all other pixel addresses in strip three. We have not shown it in the figure, but the reader can well imagine that we could illustrate the mapping of an entire strip.

There are a number of things we need to say about the mapping before proceeding to a discussion of how the address manipulator 32 actually does it. We have talked about the mapping as though it were a function whose independent variable is the pixel address. While that is conceptually adequate, we know that the pixel address never makes it to the frame buffer; all that the frame buffer sees are row/col addresses. So the mapping mechanism we are about to describe maps a row/-col address into another row/col address. It is also clear that Z values consume the address space of their destination at a rate twice that of the RGB pixel values initiating the mapping. This is because of the pairing of bits in Z values to get sixteen bits in one address of eight planes. Assuming, for example, that a sequence of consecutive RGB addresses is to be mapped over into the Z buffer, then they must somehow be "spread out" lest the mapping of each RGB address overlap the mapping of every adjacent RGB address.

Thus, a simple one-to-one mapping won't do, since the domain of the mapping would step by one unit, while the consumption of the range is two units, one of which is also part of another instance of the mapping for an adjacent value in the domain. The mapping would clobber itself. We need to map pairs into pairs, and then arrange to simply skip every other item in the domain. Conceptually, instead of mapping (X, Y) into the Z buffer, we will map (2*X, Y). What is actually, done, however, is to map (2*col, row) And what is the mapping? Simply the addition of offsets to the values of (2*col, row), to produce ((2*col)+j, row+k). The offset k is in units of scan lines. The value row+k is treated as a positive modulo number that when incremented at a value of 1023 "rolls over" to zero. This allows vertical offsets that are both above and below the starting pixel location. The interpretation of 2*col and j are a bit more complicated. All of row, col, j and k are binary integers. The representations for 2*col and j are two's complement binary integers. This says that the X dimension offset does not "wrap around" when too big, but instead is simply a signed offset from a signed starting location. For implementation reasons, only six bits are available for j, so that it ranges over minus thirty-one to plus thirty-two. Thus, the unit for j is one thirty-second of the col address range; 256/32 = 32 col's, or one hundred and twenty-eight bits. With more bits in the horizontal offset entry of table 162 and wider adders, the resolution of the X dimension offset can be increased. The values stated, however, do not pose practical difficulties.

We have one additional preliminary to dispose of. We know that a row/col address accesses eight groups. Recall that a row/col address uses up, as it were, sixteen of the twenty-one pixel address bits. Of the remaining five, one can be used for bank select down to four groups of four output lines, leaving four bits to address the resulting sixteen bits. In the case of Z mode accesses those four bits are the four LSB's of the unmapped X pixel address that were applied to the Z cache register 154 via selector and decoder 155/156. Unit steps in pixel address here will, unless something is done to prevent it, split the pairs. We need to address eight pairs of bits, not sixteen half-pairs. In other words, the partial pixel address ought to be "spread out" (multiplied by two), also. But there is no need for such a drastic action; the same effect can be achieved by properly connecting the selector 155 and decoder 156 to the partial pixel address 127. After all, a multiplication of a positive integer by two in binary is simply a bit left shift of one bit.

Referring again to FIG. 15, note the table 162 at the bottom of the figure, and the correspondence of its entries to the thirty-two strips. The table 162 is an offset table implemented in RAM in the address manipulator 32. The table is actually sixty-four bytes, with two bytes per entry. One byte of an entry holds a vertical offset, while the other holds a horizontal offset. These offsets are applied to the row and col addresses generated by the address manipulator during Z accesses. These addresses are given separately in time to the frame buffer RAM's anyway, so there is no need to get both bytes from the table at once. Instead, they are pulled out separately as needed. Their outputs are wire OR'ed and applied to the adders that create the offset for that part of the address being generated.

Before leaving the table 162, note that the byte containing the vertical offset also contains another entry: FBA#S0-FBA#S31. The mnemonics stand for "Frame Buffer Assembly # (for) Strip (#)" and indicate which of the four frame buffer assemblies 14i-iv the mapping is directed into. Also, it is to be expressly pointed out that the mapping described above is from a location that happens to be in some strip (so that which strip it is selects the mapping) into, in principle, almost anywhere else. Suppose the value j for the col offset had enough bits to offset in units of single col's. The only limitation still present is that since the mapping is done on the row/col address only, the partial pixel address of the unmapped and mapped locations will correspond. The partial pixel address is effectively multiplied by two before it is used, but this keeps things in correspondence by preventing overlap. There is no offset added to the partial pixel address. Therefore, the ultimate achievable resolution of this mapping mechanism is determined by the size of the partial pixel address, which in the case of the actual preferred embodiment is four bits, or sixteen X pixel address increments.

Now return briefly to FIG. 10D. This is the portion of the address manipulator 32 that does the Z buffer mapping. Gate 69 and inverter 70 produce a signal READ/WRITE that is low whenever a Z mode access in not in progress. This causes the buffers 67 and 68 to put all zeros onto the ZOFF lines going to adders that form the row/col addresses. Buffers 67 and 68 have tri-state outputs, so that when a Z mode access is in progress the buffers 68/68 do not disturb the ZOFF lines, which are now driven by the output of RAM's 72 and 73. The ZOFF lines are coupled to the various adders and their associated latches 55-66 of FIGS. 10E-F. Placing binary values onto the ZOFF lines is what actually creates the offset in whatever part of the row/col address currently being generated.

Recall that the address manipulator 32 first forms row address, followed by col addresses. During row address generation of a Z mode access MUX's 74 and 75 couple the ROW* and PA[6-10] lines as the address to RAM's 72 and 73. This is caused by the output of gate 69 going low. PA[6-10] are the five bits of the X pixel address that pick which of the thirty-two strips of RGB pixel address is to be mapped. (PA[5-0] are the six LSB's of the X pixel address, and they address sixty-four bits; i.e., someplace in a strip.) The signal ROW* is low during row addressing, and high during col addressing. It is also the LSB of the address applied to RAM's 72/73. That is how the vertical and horizontal offset table entries are selected amid the addressing of the RAM's by strip number. The RAM's 72/73 themselves are actually 1024×4; we put them side by side to get 1024×8, and then use only the first sixty-four addresses. RAM 72 provides the least significant bits of the entries of table 162, and RAM 73 provides the most significant bits.

Somewhere up above it was said that the col address needed to be multiplied by two before the horizontal offset was added. We have just described the mechanism that adds the proper vertical offset during row address generation time, and adds the proper horizontal offset during col address generation time. But where does the col address get multiplied by two before the addition? The answer lies back at the MUX's in FIGS. 10A-B, in the table in FIG. 10C, and in the operation of the PAL 50 in response to control by the master state machine 29. When it is time to create a Z mode col address the MUX's operate in the Z access mode of the table in FIG. 10C, and implement a bit left shift of one bit on the incoming pixel address bits that are to correspond to the col address. Thus, at the other end of the address manipulator 32 (FIG.'S 10E-F) the adders add a horizontal offset to a col address already multiplied by two.

Finally, note that the two most significant bits O3 and O4 of RAM 73 are latched and decoded to cause exactly one of the signals ZDRIVE0-ZDRIVE3 to become active. This is the mechanism that allows the FBA#S0-31 fields in the vertical entries of table 162 to select the frame buffer assembly to be mapped into. The ZDRIVE0-3 signals are enable signals for the frame buffer assemblies 14i-iv, respectively.

Pixel Color Data Formatting

The pixel interpolation mechanisms that produce RGB color intensities generate sixteen-bit values. The DAC's that produce the analog color signals respond to eight bits. In order for the least significant bit of the eight to be accurate, it must be the result of rounding on less significant bits that were originally produced by the interpolator. Unless the values sent to the DAC's are originally computed to resolutions approximately twice that used by the DAC's, significant errors in color values as a function of spatial position can occur. Since the numbers of bits describing color intensities is going to be reduced anyway, and since the number of pins provided for output from the interpolation IC (i.e., the scan converter 12 of FIG. 2A) is of some concern, it makes sense to incorporate a truncation mechanism in the interpolator ahead of its output.

If the truncation mechanism were adjustable and the results steerable within an output field, a further advantage could be obtained. That advantage would be the ability to dynamically change the way the color map is addressed. In one sense, there is always a mapping between the output of the interpolators and the input to the color map; traditionally the mapping is simply a hard-wired connection between the two. A pixel color data formatter with programmable formatting provides a flexible mapping that enhances the utility of the color map.

Figure 16:
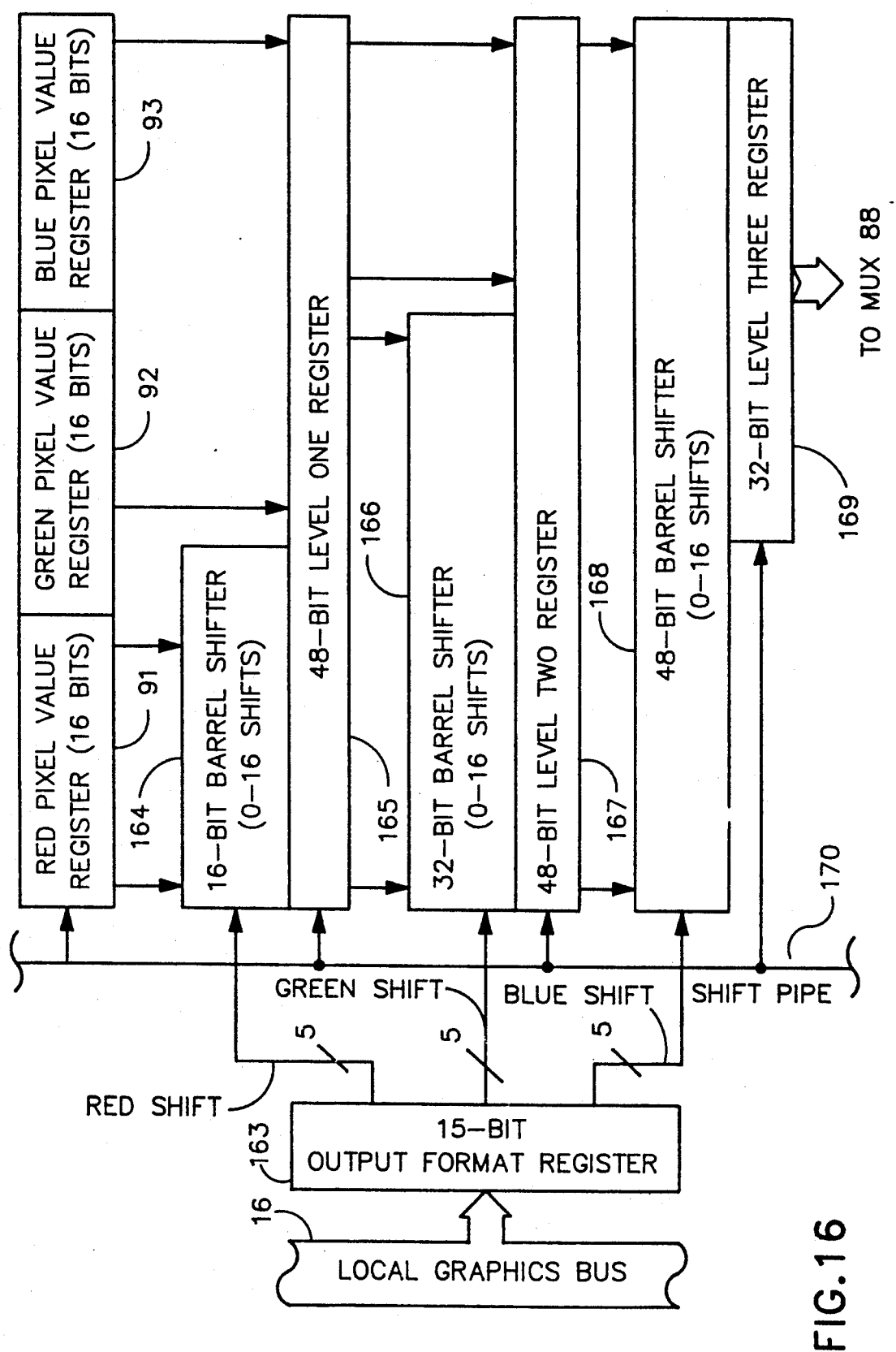
FIG. 16 is a simplified block diagram of a three level pipelined shifter used to programmably truncate and steer pixel data fields from a pixel interpolator into a combined format to be stored in the frame buffer of FIG. 2B.

FIG. 16 is a block diagram of the pixel color data formatter 89 of FIG. 3. The red pixel value register 91, green pixel value register 92 and blue pixel value register 93 are at once at the end of a pipeline in the interpolators and at the beginning of a pipeline in the color data formatter 89. Data flows through the pipeline according to cycles of a SHIFT PIPE signal 170 generated by a controlling state machine in the scan converter 12. In this way, data that is the output of the interpolators is also the input to the color data formatter.

The color data formatter itself consists of a three-stage pipeline advanced by SHIFT PIPE 170. The first stage in the pipeline comprises a sixteen-bit barrel shifter 164 whose data inputs are coupled to the data outputs of the red pixel value register 91, and a forty-eight-bit level one register 165 whose data inputs are coupled to the data outputs of the barrel shifter 164 and the outputs of the green and blue pixel value registers 92/93. The second stage of the pipeline comprises a thirty-two-bit barrel shifter 166 whose inputs are coupled to the thirty-two most significant bits of the level one register 165 and also comprises a forty-eight-bit level two register 167. The most significant input bits to register 167 are coupled to the output of the shifter 164, and the least significant input bits of register 167 are coupled to the corresponding least significant bits of register 165. The third stage of the pipeline comprises a forty-eight-bit shifter 168 coupled to receive the data in the level two register 167, and a thirty-two-bit level three register 169. The thirty-two least significant bits of shifter 168 are coupled into register 169, which then become the output from the color data formatter 89.

A fifteen-bit output format register 163 is coupled to the local graphics bus 16 for receiving the information that programs the operation of the color data formatter. The output format register 163 is partitioned into three fields, each of which indicates the number of shifts that an associated shifter is to perform. To this end, groups of bits in the output register 163 are coupled to the various shifters 164, 166 and 168.

The pixel color data formatter 89 operates as follows. Initially there are three sixteen-bit values in the three RGB pixel value registers 91-93. The red pixel color value is shifted to the right (i.e., in the direction of MSB toward the LSB) by some number of times that is between zero and sixteen. The five lines labelled as RED SHIFT in the figure encode the desired number of shifts. The effect of this shifting is to truncate the number of bits for the red intensity value, and to contribute to the final position of the truncated red field in the final output. When the next cycle of SHIFT PIPE occurs the shifted and truncated red value is clocked into the upper sixteen bits of the level one register 165, while the lower thirty-two bits receive the unmodified contents of the green and blue pixel value register 92 and 93. The level one register must be a full forty-eight bits wide, as the red value might not have been shifted at all, if such were desired, leaving the result at this stage still as wide as the original input. (If this happens it merely means that the entire size reduction in the number of bits must come from the green and blue values.)

The shifted red input value and unshifted green and blue input values clocked into the level one register 165 immediately become the input to the second stage of the pipeline. What goes into the left side of the thirty-two-bit barrel shifter 166 is the truncated red value while the entire sixteen-bit green value goes into the right side. This concatenates the two into one logical unit, which is then shifted to the right by zero to sixteen shifts, as specified by the encoded value for GREEN SHIFT. This truncates away that same number of bits (i.e., whatever GREEN SHIFT is) from the lower significant portion of the concatenated red/green combination. Upon the next cycle of SHIFT PIPE this shifted and truncated combination of red/green values is clocked into the most significant thirty-two bits of the level two register 167, while at the same time the unmodified blue pixel value is clocked into the least significant sixteen bits.

The output of the level two register 167 is immediately available as input to the third stage of the pipeline. At this point the logical unit to be shifted consists of the concatenation of the truncated red and green values, itself concatenated onto the left of the unmodified blue value. Shifting this quantity by the amount encoded by BLUE SHIFT truncates away that many bits from the right of the blue value. That shifting is performed by the shifter 168. At the next cycle of SHIFT PIPE the thirty-two bits of formatted and truncated red/green/blue values are available to MUX 88 from the level three register 169. After the pipeline is full a new formatted value is available upon each cycle of SHIFT PIPE.

Consider some examples of how the color data formatter can be used. Suppose that the graphics accelerator is equipped with a full twenty-four planes of frame buffer memory. Let's assume that no double buffering is desired, and that each of red, green and blue is to be represented by eight bits in the frame buffer. This is easily achieved by programming each of the RED GREEN and BLUE SHIFTS to have a value of eight. This produces a twenty-four-bit output right justified in the thirty-two-bit level three register 169. (In the actual preferred embodiment this is truly what happens; no use is made of the upper eight bits of formatted color intensity, since a maximum of twenty-four planes of RGB frame buffer are allowed.)

As a second example, suppose that double buffering were desired with twenty-four planes of frame buffer memory. The first buffer is formatted exactly as in the preceding example, although only twelve of the planes of frame buffer memory will actually be written to. Control of the write enable functions for the individual planes of frame buffer memory is used with the first buffer's format to write-enable only the four most significant bits for each color value. The format for the second buffer will align the most significant bits for the color values with the planes that are part of the second buffer. The format for the second buffer is produced by programming the values of RED, GREEN and BLUE SHIFT to be eight, eight and twelve, respectively.

Now suppose that a monochrome image were desired. Let the monochrome intensities be calculated as though they were to be red values. The idea will be to use the color data formatter to position an eight-bit red value in the far right side of the output field with both green and blue truncated away, and then store that into eight planes of the frame buffer. The color map assembly 15 then receives simply one eight-bit value, which it can map into shades of any selected color.

As a final example, suppose that the frame buffer contained only eight planes. Further suppose that it were desired to allocate three planes for red, three for green, and two for blue. To accomplish that the values of RED, GREEN and BLUE SHIFT would be programmed to be thirteen, thirteen and fourteen, respectively.

Shadow RAM Operation

Figure 17:
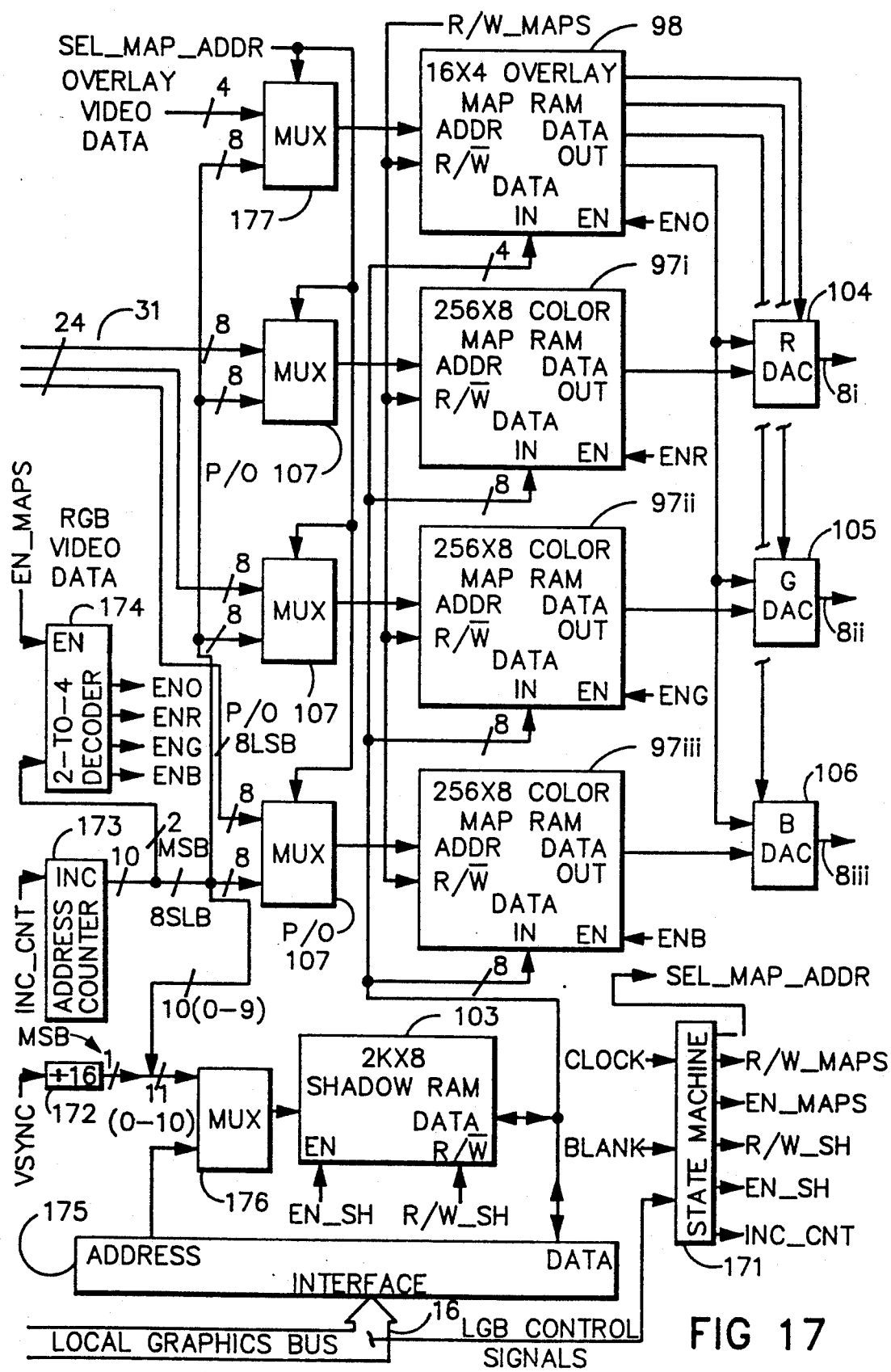
FIG. 17 is a block diagram of a portion of the color map assembly of FIG. 2C, and illustrates the operation of a shadow RAM for updating the contents of the color map and overlay map RAM's.

Refer now to FIG. 17. FIG. 17 is an expansion of a portion of the color map assembly 15 of FIG. 2C, and is useful in understanding the operation of the shadow RAM 103 in updating the contents of the color map RAM's 97i–iii and the overlay map RAM 98.

The shadow RAM 103 is a 2K by 8 RAM whose data lines are coupled by an interface 175 to the local graphics bus 16. The address lines of shadow RAM 103 arrive from a MUX 176, which allows the shadow RAM's address to originate either with the LGB 16 or with a counter 173. The CPU accesses the shadow RAM 103 to alter its contents, so that the color map or overlay map will subsequently change. The counter 173 addresses the shadow RAM 103 during vertical retrace to transfer (half of) its contents to the color map and overlay map RAM's.

To conserve processing resources, the CPU is allowed to access the shadow RAM 103 at will, even when MUX 103 attempts to address the shadow RAM by the counter 173. A state machine 171 controls the operation of the color map assembly 15. If it detects that there is a conflict between the counter 173 and the LGB it simply briefly suspends the activity of the counter, even if that means that the transfer cannot be completed before the end of vertical retrace. There is a very slight possibility that this choice of priorities can produce an artifact in the display, owing to a frame being displayed with inconsistencies in the color and overlay maps. If this were to become a problem (which seems rather unlikely, but then who is to say), then it could be avoided in a number of ways. First, the CPU could be prevented from writing to the shadow RAM 103 unless no vertical retrace was in progress. This ties the CPU somewhat, but is still not as bad as the other way around without a shadow RAM. To avoid artifacts in a conventional system one would have to hold the CPU off until vertical retrace, which is very different. Next, the CPU could be locked out only during the period of time the counter 173 was using the shadow RAM, which presumably would be somewhat less than during all of vertical retrace. Next, the shadow RAM 103 itself could be buffered. That is, the CPU would always be able to get into the buffer, which, after being written to would then be transferred to the shadow RAM during a period of time when there was known to be no interference from the counter 173.

Our main interest in FIG. 17 is in examining the way that the color map and overlay map RAM's are updated from the shadow RAM 103. When the signal BLANK for a vertical retrace arrives at the state machine 171, MUX 176 is set to address the shadow RAM 103 with counter 173, whose output is ten bits. There is an 11th bit that is supplied from another counter 172. It functions as a divide by sixteen counter, and it is driven by the signal VSYNC (Vertical Sync). Thus, the most significant bit of address applied to the shadow RAM changes every eight frames, while during the vertical retrace between frames counter 173 addresses the shadow RAM 103 through half of its address space. It is this half that is used to update (completely) the color and overlay maps. Which half is used will alternate every eight frames. Of course, if the top and bottom halves of the shadow RAM 103 are identical, it would make no difference which half were used. But if they are different, then a blinking effect can be created.

The transfer of the selected half of the shadow RAM to the RAM's 97i–iii and 98 is quite straight-forward. As counter 173 cycles through its count the two MSB's of that count are picked off and sent to a two-to-four decoder 174, whose outputs are used to enable one of the overlay map RAM, or one of the red, green and blue color map RAM's. These are the signals ENO, ENR, ENG and ENB. These signals are asserted by decoder 174 only when EN_MAPS is true, which is during the transfer. The effect of this is to partition the shadow RAM half being addressed into four regions, the contents of each of which correspond to one of the destination RAM's 97i–iii and 98. In this way the inputs to the various destination RAM's can be connected in common to the outputs of the shadow RAM 103. The state machine also sets the MUX's shown as part of 107 and MUX 177 to convey to the destination RAM's the address generated by counter 173. It does this with the line called SEL_MAP_ADDR. Next, the proper sense of R/W_MAPS is asserted. Finally, the actual write memory cycle of the individual destination RAM's is initiated by issuing the proper enable signal (ENO, ENR, ENG or ENB). These enable signals are for write operations and do not interfere with the reading of data from the RAM's. Thus, they are not involved in the process of applying values read from the RAM's 97i–iv and 98 to the DAC's 104–106.

We claim:
1. A graphics display system comprising:
    rendering means for generating, at a digital video data output, signals representing pixel intensities;
    means, coupled to the rendering means, for generating at a retrace output a retrace signal;
    a mapping RAM having an addressing input coupled to the digital video data output and having a data input and a data output;
    a digital to analog converter having an input coupled to the data output of the mapping RAM and having an analog output coupled to a display device that periodically experiences retrace in response to the retrace signal;
    a buffer RAM having at least two portions each having a capacity at least equal to that of the mapping RAM, having address and data inputs coupled to store into a selected portion of the buffer RAM information to be placed into the mapping RAM, and having a data output coupled to the data input of the mapping RAM; and
    control means, coupled to the mapping and buffer RAM's and to the retrace output, for transferring during retrace one portion of the buffer RAM to the mapping RAM, during successive instances of retrace respectively different portions being transferred one at a time and in a repeated sequence of one after another, the contents of the portions being identical except for selected locations therein that each correspond to a selected address of the mapping RAM, those selected locations containing dissimilar contents, whereby a blinking effect is produced upon the display device as the different portions are transferred to the mapping RAM.

* * * * *